United States Patent
Song et al.

(10) Patent No.: US 10,223,916 B2
(45) Date of Patent: Mar. 5, 2019

(54) AUTOMATED GUIDED VEHICLE SYSTEM BASED ON AUTONOMOUS MOBILE TECHNIQUE AND A METHOD FOR CONTROLLING THE SAME

(71) Applicant: KOREA UNIVERSITY RESEARCH AND BUSINESS FOUNDATION, Seoul (KR)

(72) Inventors: Jae Bok Song, Seoul (KR); Jung Ho Son, Seoul (KR); Min Kuk Jung, Seoul (KR); Chan Soo Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 190 days.

(21) Appl. No.: 15/211,215

(22) Filed: Jul. 15, 2016

(65) Prior Publication Data
US 2017/0017236 A1 Jan. 19, 2017

(30) Foreign Application Priority Data
Jul. 17, 2015 (KR) ........................ 10-2015-0101530

(51) Int. Cl.
*G08G 1/16* (2006.01)
*G05D 1/02* (2006.01)
(52) U.S. Cl.
CPC ............ *G08G 1/164* (2013.01); *G05D 1/024* (2013.01); *G05D 1/0274* (2013.01); *G08G 1/165* (2013.01); *G05D 2201/0216* (2013.01)

(58) Field of Classification Search
CPC ........ G08G 1/164; G08G 1/165; G05D 1/024; G05D 1/0274
(Continued)

(56) References Cited

U.S. PATENT DOCUMENTS 7,647,180 B2 * 1/2010 Breed .................... G08G 1/161
340/436
9,216,745 B2 * 12/2015 Beardsley ............. B60W 50/10
(Continued)

FOREIGN PATENT DOCUMENTS

JP H07-191723 A 7/1995
JP 2008-140159 A 6/2008
(Continued)

OTHER PUBLICATIONS

Jung Ho Son, "Multi-AGV Control System based on Pathblocks in Factory Environments", Master's thesis, Korea University Graduate School, Jul. 2, 2015, English abstract.

*Primary Examiner* — Muhammad Shafi
(74) *Attorney, Agent, or Firm* — Rabin & Berdo, P.C.

(57) ABSTRACT

The present invention provides an autonomous mobile-based automated guided vehicle system comprising a system input unit configured to set and input a mobile path between a departure point and an end point of the autonomous mobile-based automated guided vehicle as one or more mobile path blocks in the unit of a block, a system control unit configured to apply a control signal to a corresponding autonomous mobile-based automated guided vehicle based on one or more mobile paths in the unit of a block and a system storage unit configured to store the mobile paths in the unit of a block, which are inputted by a user through the system input unit, and a method for controlling the autonomous mobile-based automated guided vehicle system.

15 Claims, 64 Drawing Sheets

(58) Field of Classification Search
USPC .......................................................... 701/23
See application file for complete search history.

(56) References Cited

U.S. PATENT DOCUMENTS

| | | | |
|---|---|---|---|
| 9,523,984 B1* | 12/2016 | Herbach | B62D 15/025 |
| 2008/0167821 A1* | 7/2008 | Breed | G08G 1/161 |
| | | | 701/301 |
| 2015/0284010 A1* | 10/2015 | Beardsley | B60W 50/10 |
| | | | 701/41 |

FOREIGN PATENT DOCUMENTS

| KR | 10-1998-0020780 A | 6/1998 |
|---|---|---|
| KR | 10-2004-0002312 A | 1/2004 |
| KR | 10-1063302 B1 | 9/2011 |
| KR | 10-1440569 B1 | 9/2014 |

\* cited by examiner (a)

(b)

<Work process of path block IDO>

A : Movement to worktable position

B : Movement to position suitable for the work

C : Picking up goods from worktable

D : Loading picked-up goods on bogie

E : Movement to path block position (a)

AUTOMATED GUIDED VEHICLE SYSTEM BASED ON AUTONOMOUS MOBILE TECHNIQUE AND A METHOD FOR CONTROLLING THE SAME

CROSS-REFERENCE TO RELATED APPLICATIONS

This application claims the benefit of Korean Patent Application No. 10-2015-0101530, filed on Jul. 17, 2015 in the Korean Intellectual Property Office, which is incorporated herein by reference in its entirety.

STATEMENT REGARDING PRIOR DISCLOSURES BY THE INVENTOR OR A JOINT INVENTOR

Applicant hereby states under 37 CFR 1.77(b)(6) that Jung Ho Son, *Multi -AGV control system based on path-blocks in factory environments*, Master's thesis, Korea University Graduate School, Jul. 2, 2015, is designated as a grace period inventor disclosure. The disclosure: (1) was made one year or less before the effective filing date of the claimed invention; (2) names the inventor or a joint inventor as an author; and (3) does not name additional persons as authors on a printed publication.

BACKGROUND OF THE INVENTION

1. Field of the Invention

The present invention relates to an apparatus and method for controlling an automated guided vehicle (AGV).

2. Description of Related Art

In general, an automated guided vehicle (AGV) is a caterpillar vehicle which automatically or manually carries goods or materials to a designated place in an industrial field such as a factory or the like.

The automated guided vehicle has been changed to an essential element which serves to transport components or goods in an automated product manufacturing field.

As an example of a conventional art, Korean Patent Application No. 10-1996-039379 discloses a method for finding a travel path of an AGV in which the travel path is controlled by being divided into nodes so that the shortest travel path from a departure position to a destination is determined while minimizing the blockage of the travel path.

In addition, another example of the conventional art, Korean Patent Application No. 10-2002-0037765 discloses an automated guided vehicle system in which a plurality of automated guided vehicles (AGVs) is integratedly controlled by using a single controller. This system performs an integrated control operation of the AGVs in which the position information of the respective AGVs is shared by interconnecting respective lines on which the AGVs travel as well as controls the AGVs while distributing the number of the AGVs so that the ratio of operation of a manufacturing line can be improved.

In addition, the AGV according to the prior art adopts a method in which a magnetic tape serving as a guideline is attached to a factory floor and the AGV guidably travels on the top of the magnetic tape. In other words, the AGV having the same track as that in the conventional tape guidance method includes a plurality of optical tapes or sensors mounted in a factory environment to control the operation of the AGV and check the state of the AGV.

However, the conventional AGVs entail a problem in that it costs highly to use the AGVs in an actual environment that changes frequently. Moreover, such a control method cannot efficiently a control operation of the AGVs since a higher control system does not take the current situation of each AGV into consideration. In addition, an additional device is needed to perform a specific operation or a velocity control in a specific section. Resultantly, there occurs a problem in that it is difficult to control the AGVs using the conventional tape guidance method in a place where a periodic change of a factory line occurs frequently, a place where the optical tape of a factory floor and the additional equipment are difficult to manage, or a place where the AGVs need to be safely controlled in consideration of the current situation of each AGV.

PRIOR ART LITERATURE

Patent Documents

Patent Document 1: Korean Patent Application No. 10-1996-0039379 A
Patent Document 2: Korean Patent Application No. 10-2002-0037765 A

SUMMARY OF THE INVENTION

Accordingly, an object of the present invention is to solve the above-mentioned problems occurring in the prior art. The present invention employs mobile path blocks (or "mobile pathblocks") including various features so that the AGV control that fits factory environments can be achieved. The travel velocity of AGVs can be controlled to a low or high level at a specific place, and another AGV performing another work is summoned to assign a new task to the other AGV so that the work efficiency can be increased, and thus AGVs can travel along the shortest path, which allows the present invention to be easily used in a rapid and accurate travel. In other words, the present invention is directed to a method for controlling AGVs based on the mobile path blocks, in which the travel path can be determined depending on user's convenience. In addition, AGVs can detour or standby by based on the state (i.e., velocity, position, or mobile path block outline) of each of AGVs, thereby improving the travel efficiency.

Further, the present invention defines a mobile path block (or a "mobile pathblock") referring to a group of paths along which AGVs can move toward a designated place and performs a travel using the mobile path block. The present invention forms a mobile path in the unit of a block so that a user can easily control the movement of AGVs along a desired path, and AGVs can select a path block by themselves and perform an efficient and safe travel through the control of the velocity thereof. In addition, a collision between multiple AGVs can be prevented and interference of a work between AGVs can be avoided by using information on the mobile path block. Moreover, the entire carriage time of AGVs can be reduced simultaneously, and each of the mobile path blocks includes various items of information so that a control suitable for the factory environments can be performed.

Besides, even in the case where a plurality of travel mobile paths are formed and these travel mobile paths intersect or overlap with each other, a collision control can be achieved in which a smooth travel is performed without any collision or deadlock.

To achieve the above object, in one aspect, the present invention provides an autonomous mobile-based automated guided vehicle system that controls at least one autonomous mobile-based automated guided vehicle comprising a vehicle sensor unit, a vehicle drive unit configured to drive a vehicle body having mounted thereon the vehicle sensor unit, and a vehicle control unit connected to the vehicle sensor unit and the vehicle drive unit and configured to control the drive of the drive unit, the autonomous mobile-based automated guided vehicle system comprising: a system input unit configured to set and input a mobile path between a departure point and an end point of the autonomous mobile-based automated guided vehicle as one or more mobile path blocks in the unit of a block; a system control unit configured to apply a control signal to a corresponding autonomous mobile-based automated guided vehicle based on one or more mobile paths in the unit of a block, which are inputted through the system input unit and a sensing signal detected by the vehicle sensor unit to control the path movement of the corresponding autonomous mobile-based automated guided vehicle; and a system storage unit configured to store the mobile paths in the unit of a block, which are inputted by a user through the system input unit.

In the autonomous mobile-based automated guided vehicle system, the mobile path block may include a mobile path block outline indicating a space occupied by the autonomous mobile-based automated guided vehicle, a mobile path way arranged within the mobile path block outline and indicates a mobile pattern of the autonomous mobile-based automated guided vehicle.

In the autonomous mobile-based automated guided vehicle system, the mobile path block may include a mobile path block way point that is arranged in the mobile path block surface and indicates the presence of a point through which the autonomous mobile-based automated guided vehicle passes.

In the autonomous mobile-based automated guided vehicle system, the mobile path block may include a mobile path block task marker that is marked in the mobile path block way point and indicates whether or not the autonomous mobile-based automated guided vehicle performs a corresponding work at a position of the mobile path block outline of.

In another aspect, the present invention provides a method for controlling an autonomous mobile-based automated guided vehicle system that controls at least one autonomous mobile-based automated guided vehicle comprising a vehicle sensor unit, a vehicle drive unit configured to drive a vehicle body having mounted thereon the vehicle sensor unit, and a vehicle control unit connected to the vehicle sensor unit and the vehicle drive unit and configured to control the drive of the drive unit, the autonomous mobile-based automated guided vehicle system comprising a system input unit configured to set and input a mobile path between a departure point and an end point of the autonomous mobile-based automated guided vehicle as one or more mobile path blocks in the unit of a block, a system control unit configured to apply a control signal to a corresponding autonomous mobile-based automated guided vehicle based on one or more mobile paths in the unit of a block, which are inputted through the system input unit and a sensing signal detected by the vehicle sensor unit to control the path movement of the corresponding autonomous mobile-based automated guided vehicle, and a system storage unit configured to store the mobile paths in the unit of a block, which are inputted by a user through the system input unit, the method comprising: a system provision step of providing the autonomous mobile-based automated guided vehicle system; a mobile path setting step of setting the mobile path of the at least one autonomous mobile-based automated guided vehicle as one or more mobile paths in the unit of a block through the system input unit; and a travel control step of allowing the system control unit to apply an autonomous travel control signal to the autonomous mobile-based automated guided vehicle to control the travel of the automated guided vehicle, wherein the autonomous mobile-based automated guided vehicle further comprises a vehicle communication unit configured to transmit and receive travel information of the autonomous mobile-based automated guided vehicle through a communication with a system communication unit connected to the vehicle control unit and the system control unit, wherein the autonomous mobile-based automated guided vehicle is provided in plural numbers, wherein the travel information comprises mobile path information and an actual travel velocity of the autonomous mobile-based automated guided vehicle, and wherein the travel control step further comprises a collision control step of controlling a vehicle collision between the autonomous mobile-based automated guided vehicles to prevent the vehicle collision therebetween using the travel information of the autonomous mobile-based automated guided vehicle, which is received through a communication between the system control unit and the autonomous mobile-based automated guided vehicle.

In the method for controlling an autonomous mobile-based automated guided vehicle system, the mobile path setting step may include a mobile path block selection step of selecting the mobile path blocks in the unit of a block, which are stored in the system storage unit, and a mobile path block arrangement setting step of arranging the mobile path block selected in the mobile path block selection step.

In the method for controlling an autonomous mobile-based automated guided vehicle system, the mobile path block may include a mobile path block outline indicating a space occupied by the autonomous mobile-based automated guided vehicle, and a mobile path block surface indicating a mobile velocity of the mobile path block. The mobile path block arrangement setting step may include a mobile path block outline arrangement step of arranging the mobile path block outline, and a mobile path block surface setting step of selecting the mobile path block surface to set a mobile velocity for the mobile path block outline.

In the method for controlling an autonomous mobile-based automated guided vehicle system, the mobile path block surface setting step may include selecting a plurality of preset reduction ratios with respect to a basic mobile velocity for the mobile path block outline.

In the method for controlling an autonomous mobile-based automated guided vehicle system, the mobile path block may include a mobile path block way point that is arranged in the mobile path block surface and indicates the presence of a point through which the autonomous mobile-based automated guided vehicle passes. The mobile path block way point includes a mobile path outline position characteristics indicating a start point, an end point, and a way point of the mobile path block outline of a corresponding mobile path block. The mobile path block arrangement setting step may further include a block position characteristics setting step of setting the mobile path outline position characteristics.

In the method for controlling an autonomous mobile-based automated guided vehicle system, the mobile path block may include a mobile path block task marker that is marked in the mobile path block way point and indicates whether or not the autonomous mobile-based automated guided vehicle performs a corresponding work at a position of the mobile path block outline. The mobile path block arrangement setting step may include a task setting step of selecting and setting the mobile path block task marker for the mobile path block outline.

In the method for controlling an autonomous mobile-based automated guided vehicle system, the task setting step may include: a stabilization step setting step of stabilizing the transport of the autonomous mobile-based automated guided vehicle; a task template setting step of selecting and setting a template task corresponding to a task template stored in the system storage unit after the stabilization step setting step has been performed; and a movement restart step setting step of instructing the autonomous mobile-based automated guided vehicle to restart the movement along the mobile path block when the autonomous mobile-based automated guided vehicle completes the selected and set corresponding task after the task template setting step has been performed.

In the method for controlling an autonomous mobile-based automated guided vehicle system, the travel control step may include a travel basic control step of applying a travel control signal to the autonomous mobile-based automated guided vehicle to allow the autonomous mobile-based automated guided vehicle to move along the mobile path block that is set in the mobile path setting step.

In the method for controlling an autonomous mobile-based automated guided vehicle system, the travel control step: may further include an obstacle detection control step of detecting an obstacle that is present within the mobile path block during the travel of the autonomous mobile-based automated guided vehicle.

In the method for controlling an autonomous mobile-based automated guided vehicle system, the obstacle detection control step may include a path obstacle detection step of transmitting an obstacle detection signal of the vehicle sensor unit to the vehicle control unit, an obstacle position information conversion step of allowing the vehicle control unit to convert the position of a corresponding obstacle into global position information in response to the obstacle detection signal, and a path obstacle determination step of allowing the vehicle control unit to determine whether or not the global position information of the obstacle is present within the mobile path block of the autonomous mobile-based automated guided vehicle.

In the method for controlling an autonomous mobile-based automated guided vehicle system, the autonomous mobile-based automated guided vehicle may further include a vehicle communication unit configured to transmit and receive travel information of the autonomous mobile-based automated guided vehicle through a system communication unit connected to the vehicle control unit and the system control unit. The autonomous mobile-based automated guided vehicle maybe provided in plural numbers. The travel information may include mobile path information and an actual travel speed of the autonomous mobile-based automated guided vehicle. The travel control step may further include a collision control step of controlling a vehicle collision between the autonomous mobile-based automated guided vehicles to prevent the vehicle collision therebetween using the travel information of the autonomous mobile-based automated guided vehicle, which is received through a communication between the system control unit and the autonomous mobile-based automated guided vehicle.

In the method for controlling an autonomous mobile-based automated guided vehicle system, the collision control step may include: a travel information collection step S351 of collecting the travel information of the autonomous mobile-based automated guided vehicle through the communication between the system control unit and the autonomous mobile-based automated guided vehicle; a collision determination step S353 of allowing the system control unit to determine whether or not a collision between the autonomous mobile-based automated guided vehicles is predicted at a collision prediction block as an intersection point of mobile path blocks of the autonomous mobile-based automated guided vehicles based on the travel information; a detour path presence confirmation step S355 of allowing the system control unit to confirm whether or not there is a detour path of the autonomous mobile-based automated guided vehicles based on the travel information if it is determined in the collision determination step that the collision between the autonomous mobile-based automated guided vehicles is predicted; a detouring determination step S357 of determining whether or not to perform a detouring operation if it is confirmed at the detour path presence confirmation step that there is the detour path of the autonomous mobile-based automated guided vehicles; and a collision mode execution step S359 of selecting and controlling an corresponding mode of a detouring mode in which the autonomous mobile-based automated guided vehicles travel along the detour path and a velocity control mode in which the travel velocity of the autonomous mobile-based automated guided vehicles is controlled based on a result of the determination at the detouring determination step S357.

In the method for controlling an autonomous mobile-based automated guided vehicle system, the detouring determination step S357 may include: a detour path presence determination step S3571 of determining whether or not a detour path is present based on a result of the execution at the detour path presence confirmation step; a virtual travel time confirmation step S3573 of, if it is determined in the detour path presence determination step S3571 that the detour path is present, confirming a virtual velocity control travel time $TP_t$ spent for the autonomous mobile-based automated guided vehicle to travel through the reduction of the travel velocity at a preset reduction ratio on a scheduled path of the autonomous mobile-based automated guided vehicle, and a virtual detour control travel time $DP_t$ spent for the autonomous mobile-based automated guided vehicle to travel on a detour path of the autonomous mobile-based automated guided vehicle; and a detouring decision step S3575 of deciding whether or not the autonomous mobile-based automated guided vehicle 10 detours through a comparison between the virtual velocity control travel time $TP_t$ and the virtual detour control travel time $DP_t$.

In the method for controlling an autonomous mobile-based automated guided vehicle system, the collision mode execution step may include: a detouring mode execution step S3593 performed if it is determined in the detouring decision step S3575 that the autonomous mobile-based automated guided vehicle detours along the confirmed detour path; and a velocity control mode execution step S3591 performed if it is determined in the detouring decision step S3575 that the autonomous mobile-based automated guided vehicle does not detour along the confirmed detour path.

In the method for controlling an autonomous mobile-based automated guided vehicle system, if it is determined in the detour path presence determination step S3571 that the detour is not present, the velocity control mode execution step S3591 is performed in which the system control unit 20 may control the travel velocity of the autonomous mobile-based automated guided vehicle using deceleration reference order data and a reduction ratio, which are stored in the system storage unit.

In the method for controlling an autonomous mobile-based automated guided vehicle system, the collision determination step may include: a prediction arrival time calculation step of calculating a prediction arrival time difference ($Col_{t1}$–$Col_{t2}$) from a prediction arrival time ($Col_{t1}$, $Col_{t2}$) of the autonomous mobile-based automated guided vehicle to a collision prediction block; a collision prediction reference time calculation step of calculating a collision prediction reference time $SP_{th}$ for determining that the autonomous mobile-based automated guided vehicles are predicted to collide with each other at the collision prediction block; and a collision prediction determination step of determining whether or not a collision between the autonomous mobile-based automated guided vehicles is predicted at the collision prediction block using the prediction arrival time difference and the collision prediction reference time.

In the method for controlling an autonomous mobile-based automated guided vehicle system, the velocity control mode execution step S3591 may include: a velocity control priority confirmation step S35911 of allowing the system control unit 20 to confirm the travel priorities of the autonomous mobile-based automated guided vehicles, which are included in preset data that is previously stored in the system storage unit 30, and confirming and selecting the velocity reduction for an autonomous mobile-based automated guided vehicle having a lower travel priority; and a velocity reduction coefficient assignment step S35913 of assigning a velocity reduction coefficient for a mobile path block on a current mobile path of the autonomous mobile-based automated guided vehicle for which the velocity reduction is confirmed and selected in the velocity control priority confirmation step S35911, and reducing the travel velocity of the autonomous mobile-based automated guided vehicle.

In the method for controlling an autonomous mobile-based automated guided vehicle system, a plurality of mobile paths may be formed on the mobile path blocks, and the system storage unit 30 may have stored therein information of a switch block where the number of the entry and exit directions of the autonomous mobile-based automated guided vehicle is less than twice the number of the plurality of mobile paths among the mobile path blocks. The collision mode execution step S359 may further include a switch block control step S3595 of allowing the system control unit 20 to confirm whether or not the autonomous mobile-based automated guided vehicle approaches a preset distance with respect to the switch block and control the travel of the autonomous mobile-based automated guided vehicle at the switch block.

In the method for controlling an autonomous mobile-based automated guided vehicle system, the switch block control step S3595 may include: a switch block preset distance approach confirmation step S35950 of allowing the system control unit to confirm whether or not the autonomous mobile-based automated guided vehicles enter a preset number of mobile path block distances with respect to the switch block; and a switch block distance entry determination step S35951 of allowing the system control unit to determine whether or not a distance between the autonomous mobile-based automated guided vehicle and the switch block is within the preset distance using a confirmation result in the switch block preset distance approach confirmation step S35950.

In the method for controlling an autonomous mobile-based automated guided vehicle system, the switch block control step S3595 may further include: a switch block entry standby step S35953 of, if it is determined in the switch block distance entry determination step S35951 that autonomous mobile-based automated guided vehicle enters the preset distance with respect to the switch block, applying an entry standby signal to the autonomous mobile-based automated guided vehicle; and a travel directionality and travel priority confirmation step S35955 of confirming the travel directionality of the autonomous mobile-based automated guided vehicle and the travel priority of the autonomous mobile-based automated guided vehicle, which is included in the preset data.

In the method for controlling an autonomous mobile-based automated guided vehicle system, the travel directionality and travel priority confirmation step S35955 may include performing a switch block ON mode S35957 of, if the travel directionalities of the autonomous mobile-based automated guided vehicles that stand by at both ends of the switch block are different from each other, allowing an autonomous mobile-based automated guided vehicle having a higher travel priority of the autonomous mobile-based automated guided vehicles to travel in a prior order so that an autonomous mobile-based automated guided vehicle having a lower travel priority enters the switch block after escaping from the switch block or a region formed by the switch block.

In the method for controlling an autonomous mobile-based automated guided vehicle system, the switch block ON mode S35957 may include: a higher-priority vehicle travel and passage step S359571 of allowing the autonomous mobile-based automated guided vehicle having a higher travel priority of the autonomous mobile-based automated guided vehicles to travel in a prior order and pass through the region formed by the switch block; a corresponding path travel directionality switching step S359573 of switching the travel directionality at the switch block for a mobile path along which the autonomous mobile-based automated guided vehicle having a higher travel priority travels; a lower-priority vehicle travel and passage step S359575 of allowing the autonomous mobile-based automated guided vehicle having a lower travel priority to enter the switch block and pass through the region formed by the switch block; and a corresponding path travel directionality switching step S359577 of switching the travel directionality at the switch block for a mobile path along which the autonomous mobile-based automated guided vehicle having a lower travel priority travels.

In the method for controlling an autonomous mobile-based automated guided vehicle system, the travel directionality and travel priority confirmation step S35955 may include performing a switch block OFF mode S35959 of, if it is determined that the travel directionalities of the autonomous mobile-based automated guided vehicles that stand by at both ends of the switch block are identical to each other, allowing an autonomous mobile-based automated guided vehicle having a higher travel priority of the autonomous mobile-based automated guided vehicles to travel in a prior order so that the autonomous mobile-based automated guided vehicle enters a region formed by the switch block, and an autonomous mobile-based automated guided vehicle having a lower travel priority also enters the region formed by the switch block after a preset time has been lapsed.

In the method for controlling an autonomous mobile-based automated guided vehicle system, the switch block OFF mode 35959 may include: a higher-priority vehicle prior travel step S359591) of allowing the autonomous mobile-based automated guided vehicle having a higher travel priority to travels in a prior order so that the autonomous mobile-based automated guided vehicle enters the region formed by the switch block; a lower-priority vehicle posterior travel step S359593 of allowing the autonomous mobile-based automated guided vehicle having a lower travel priority to also enter the region formed by the switch block after the preset time has been lapsed; a corresponding path travel directionality switching step S359595 of, if the autonomous mobile-based automated guided vehicle having a lower travel priority deviates from the region formed by the switch block, switching the travel directionalities at the switch blocks for the mobile paths of the autonomous mobile-based automated guided vehicle having a higher travel priority and the autonomous mobile-based automated guided vehicle having a lower travel priority.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENTS

Figure 1:
FIGS. 1 and 2 show an example of an AGV designed to travel along a conventional tape guideline'
Figure 1:
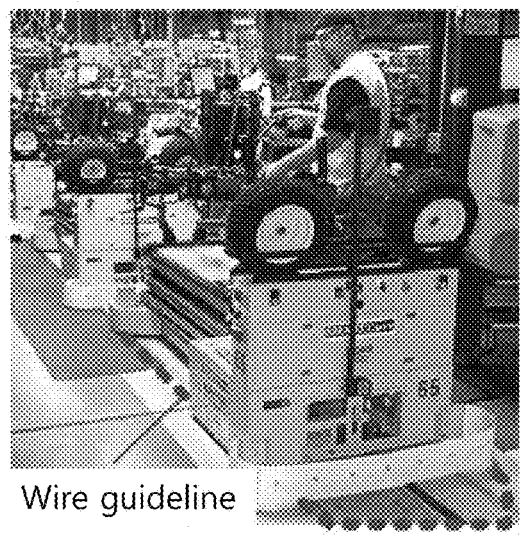
Figure 2:
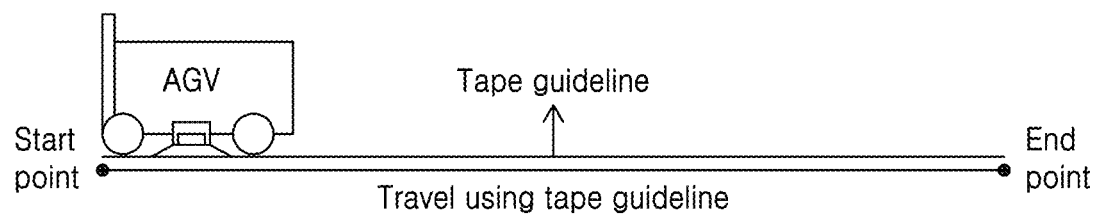
Figure 3:
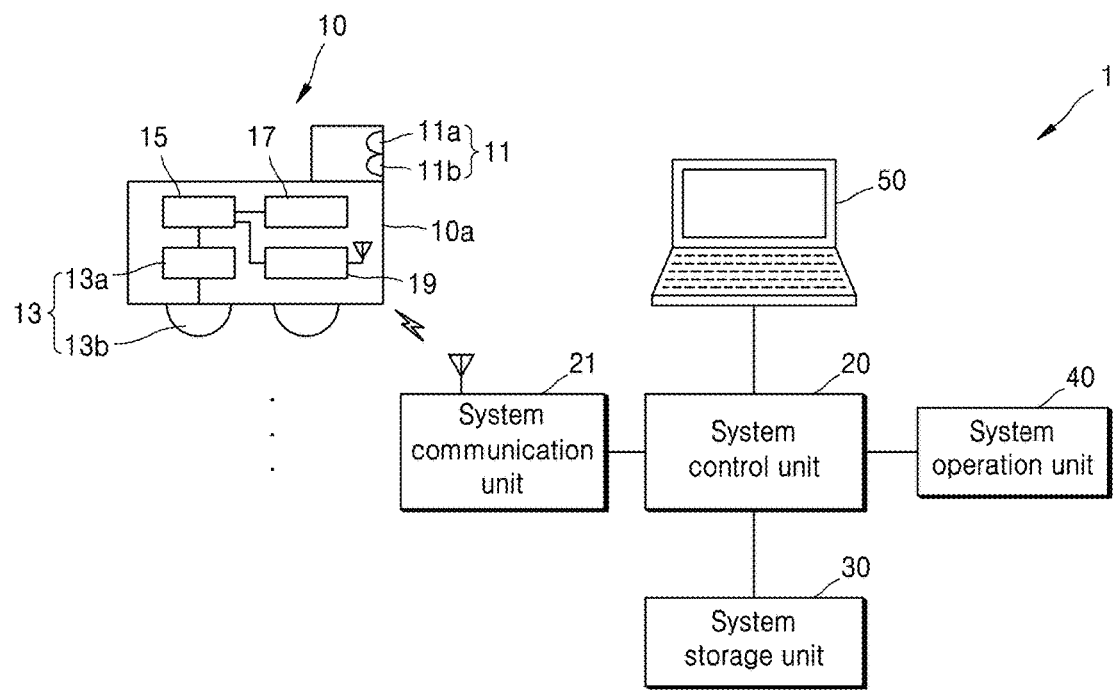
FIG. 3 is a block diagram illustrating an autonomous mobile-based automated guided vehicle system according to an embodiment of the present invention.
Figure 4:
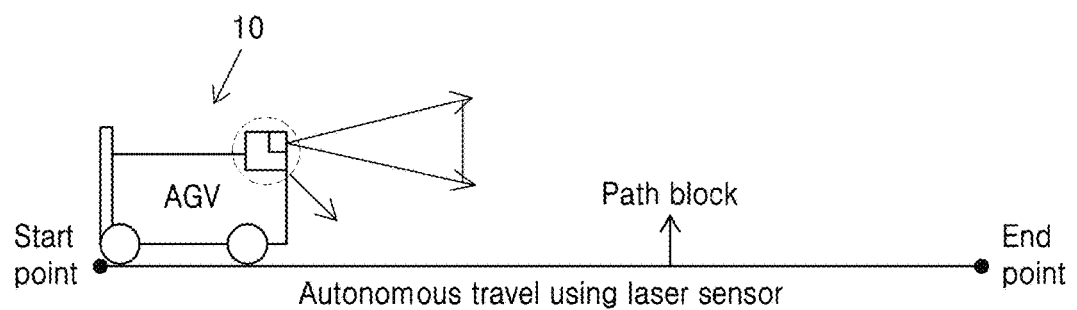
FIGS. 4 and 5 are diagrammatic views illustrating a travel state and an actual travel environment of an automated guided vehicle of an autonomous mobile-based automated guided vehicle system according to an embodiment of the present invention.

Now, preferred embodiments of an autonomous mobile-based automated guided vehicle system according to the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

The autonomous mobile-based automated guided vehicle system of the present invention is implemented in the form of a robot arm, but this is merely an example for describing the present invention, and the automated guided vehicle system of the present invention may be constructed in various manners, such as taking a mechanical structure which does not require an additional driving force as well as a structure in which a single link is arranged and a structure in which a plurality of consecutive links is arranged. The autonomous mobile-based automated guided vehicle system of the present invention will be described centering on the case where it is implemented as a robot arm having the structure in which the plurality of consecutive links is arranged.

In addition, the autonomous mobile-based automated guided vehicle system of the present invention includes a counterbalance and/or a curved parallelogram unit by each link, which will be described later, or can be constructed in various manners through an alternative or combination method.

An autonomous mobile-based automated guided vehicle system 1 of this embodiment includes a system input unit 50, a system control unit 20, and a system storage unit 30. In this embodiment, the system control unit 20 has been implemented as a processor in which operational functions are integrated, it may further include a separate system operation unit (not shown), if necessary.

First, an autonomous mobile-based automated guided vehicle 10 includes a vehicle body 10a. The vehicle body 10a can be constructed in various manners depending on design specifications, such as including a tray placement table (not shown) for carrying a tray such as a given component or a robot arm for loading/unloading a given tray or performing a preset task The automated guided vehicle 10 includes a vehicle sensor unit 11 mounted on the vehicle body 10a, a vehicle drive unit 13 including a vehicle drive motor 13a, a vehicle control unit 15. The vehicle sensor unit 11 includes an image detection sensor 11a such as a camera and a distance sensor 11b. The image detection sensor 11a may be implemented as a single-eye camera or a stero camera. The distance sensor 11b may be implemented as a laser sensor or an ultrasonic sensor. The distance sensor 11b can be modified in various manners within a range of sensing a distance between the automated guided vehicle 10 and another object such as an obstacle other than an appropriate autonomous mobile-based automated guided vehicle 10, but is implemented as a laser distance sensor to ensure an accurate sensing range in this embodiment.

The vehicle drive motor 13a is implemented as an electric motor according to a predetermined specification, and is supplied with electric power through a battery (not shown) mounted on the vehicle body 10a to generate a travel driving force. The power output range of the electric motor can be selected depending on the use of the autonomous mobile-based automated guided vehicle.

The vehicle control unit 15 can receive a detection signal detected by the vehicle sensor unit 11 and preset data from a vehicle storage unit 17 connected to the vehicle control unit 15 to control the autonomous travel of the automated guided vehicle, and can form a structure in which the vehicle control unit 15 transmits and receives data, i.e., travel information including a travel state of the autonomous mobile-based automated guided vehicle 10 with the system control unit 20 through the vehicle communication unit 19. In this case, the travel information includes a mobile path forming the movement of the autonomous mobile-based automated guided vehicle 10 and mobile path information including the position information on the current position of the autonomous mobile-based automated guided vehicle. According to the circumstances, the travel information may further include an actual travel velocity of the autonomous mobile-based automated guided vehicle 10.

As such, in the case where an abnormal state, i.e., an obstacle due to an external object is present on one or more mobile paths in the unit of a block that are set by a user, which will be described later, the vehicle control unit 15 performs an urgent braking operation so that the automated guided vehicle can be prevented from being collided with the obstacle.

The autonomous mobile-based automated guided vehicle system according to this embodiment can be constructed in various manners depending on design specifications, such as including a single autonomous mobile-based automated guided vehicle or plural automated guided vehicles based on an autonomous mobile technology, if necessary.

The system input unit 50 of the autonomous mobile-based automated guided vehicle system 1 is used to input a mobile path. In other words, an operator sets and inputs a mobile path between a departure point and an end point of the autonomous mobile-based automated guided vehicle 10 as one or more mobile path blocks in the unit of a block through the system input unit 50. That is, the system input unit 50 is implemented as a computer device and arranges mobile path blocks templated on a background screen indicating a set work space in a drag-and-drop manner so that a mobile path of the autonomous mobile-based automated guided vehicle 10 from a way point to an arrival point can be constructed. Various templated mobile path block types for the mobile path block which will be described later are shown in the drawings. A necessary mobile path block is selected from the template, and is dragged and dropped on the background screen so that a predetermined completed mobile path can be formed by extension. It is obvious from the foregoing that a way point may further be arranged on a path between a departure point and an arrival point.

The system control unit 20 can receive a certain input signal or mobile path information through the system input unit 50, and perform a wireless transmission and reception with the vehicle communication unit 19 of the autonomous mobile-based automated guided vehicle through the system communication unit 21 to apply a travel control signal to allow the autonomous mobile-based automated guided vehicle 10 to perform a predetermined autonomous travel operation on a mobile path from a departure point to an end point. In addition, the system control unit 20 may receive a detection signal sensed from the autonomous mobile-based automated guided vehicle 10 and process the received detection signal, and then apply a collision control signal to the autonomous mobile-based automated guided vehicle 10 so that a countermeasure against a collision between the autonomous mobile-based automated guided vehicles 10 can be taken.

The system storage unit 30 is connected to the system control unit 20, and can store the mobile paths in the unit of a block, which are inputted by a user through the system input unit 50 in response to a storage control signal of the system control unit 20 and store travel information including position information of the autonomous mobile-based automated guided vehicle 10, which is transmitted from the autonomous mobile-based automated guided vehicle 10.

In the meantime, in the autonomous mobile-based automated guided vehicle system 1 that controls the autonomous mobile-based automated guided vehicle 10, the mobile paths inputted through system input unit 50 can be formed in the form of a block.

Hereinafter, the block type mobile paths and a mobile path input process using the same will be described.

The mobile path block Bi (see FIG. 9) includes a mobile path block outline $B_{OL}$, a mobile path block way Bw, a mobile path block surface Bs, and a mobile path block way point Bp.

The mobile path block outline $B_{OL}$ indicates a space occupied by the autonomous mobile-based automated guided vehicle. The mobile path block outline $B_{OL}$ is formed as a square block in this embodiment, but can be constructed in various manners if a change is made to a user interface. The mobile path block outline $B_{OL}$ is preferably formed as a square block structure in that it corresponds to a space that is actually occupied by the autonomous mobile-based automated guided vehicle 10 or a space that is expected to be occupied by the autonomous mobile-based automated guided vehicle 10 when the autonomous mobile-based automated guided vehicle 10 travels on the mobile path.

The mobile path block way Bw is arranged within the mobile path block outline Bi and indicates the movement pattern of the autonomous mobile-based automated guided vehicle 10. The mobile path block way Bw includes various shapes such as a straight line, a 90 degree-bent line, an inclined line, a diagonal line, etc., and a mobile path block way Bw having a plurality of ways such as a cross line, a T-shaped line and the like may be selected. Here, preferably, the mobile path block way Bw having the plurality of ways is connected with a progress direction at previous mobile path block by means of a subsequent mobile path block and proceeds along a way proceeding according to an ID order of a preset and assigned mobile path block The mobile path block surface Bs is an inner region of the mobile path block outline $B_{OL}$ and is compartmented by the mobile path block outline $B_{OL}$. The mobile path block surface Bs indicates the mobile velocity of the autonomous mobile-based automated guided vehicle 10 within the region compartmented by the mobile path block outline $B_{OL}$. In this embodiment, the mobile path block surface Bs is formed as a color according to the mobile velocity of the autonomous mobile-based automated guided vehicle 10 to make an operator's visibility clear in terms of the characteristics of the user interface. This is merely an example of mobile path block surface Bs. The mobile path block surface Bs may be modified in various manners, such as taking an user interface (UI) structure which is patterned according to the mobile velocity of the autonomous mobile-based automated guided vehicle 10, being formed as a bright and dark contrast structure, and being formed as a combination thereof. In this embodiment, the mobile path block surface Bs is classified into the speed types of white, red, yellow, green, blue and purple colors. In other words, the mobile path block surface Bs is classified into a total of six stages at a speed reduction ratio where white is 100%, red is 84%, yellow is 66, green 50%, blue is 33%, and purple is 16% compared to white. As such, as the number of the speed ratio sections increases, the autonomous mobile-based automated guided vehicle 10 moves slowly to reduce a collision risk with an obstacle at a specific section or the speed thereof is controlled depending on the weight of target goods carried by the autonomous mobile-based automated guided vehicle 10 in order to take a proper countermeasure through a change in the speed ratio to enable a safe travel so that the autonomous mobile-based automated guided vehicle 10 can travel safely. For example, if the autonomous mobile-based automated guided vehicle 10 passes through a blue mobile path block (Bi, blue) having a speed ratio of 33%, it is considered that the autonomous mobile-based automated guided vehicle 10 passes through on the mobile path block at a speed of 33% compared to the original reference speed, which is reduced by four stages from the current speed of the autonomous mobile-based automated guided vehicle 10. If the current travel velocity of the autonomous mobile-based automated guided vehicle 10 is 900 mm/s, the autonomous mobile-based automated guided vehicle 10 has a speed of 300 mm/s on the blue mobile path block (Bi, blue) having a corresponding speed ratio of 33%.

In addition, the mobile path block Bi includes the mobile path block way point Bp. The mobile path block way point Bp is positioned within the mobile path block surface Bs that is the inner region of the mobile path block outline $B_{OL}$, which is compartmented by the mobile path block outline $B_{OL}$. The mobile path block way point Bp indicates a transit point of the autonomous mobile-based automated guided vehicle 10. In other words, the mobile path block way point Bp may take a configuration in which it is positioned on a mobile path indicating a departure point and an arrival point of the mobile path such that it is positioned on a mobile path line formed by the departure point and the arrival point and is positioned on a mobile path block arranged at a distal end like the departure point and the arrival point. In addition, the mobile path block Bi of the present invention may be implemented as a predetermined hollow circle or a filled circle. In other words, the mobile path block Bi takes a structure in which a marking can be made in the mobile path block way point Bp to enable the selection of whether or not there exists a predetermined allocation task by the autonomous mobile-based automated guided vehicle 10 at the mobile path block outline so that if a mark is made to fill the mobile path block way point Bp within the mobile path block outline on the mobile path, it can be visually confirmed that a predetermined task to be executed at a corresponding position exists. Here, the task can include all the works performed by a typical AGV, including unloading a given component tray loaded on a vehicle or loading the component tray from a specific platform.

Hereinafter, a method for controlling the autonomous mobile-based automated guided vehicle system using the mobile path block will be described with reference to FIGS. 35 to 41.

First, the autonomous mobile-based automated guided vehicle system 1 is provided at a system provision step S10. At step S10, the description of the autonomous mobile-based automated guided vehicle system 1 is replaced with the above-description to avoid redundancy.

Thereafter, a mobile path setting step S20 and a travel control step S30 are performed. The mobile path setting step and the travel control step may be performed simultaneously and separately through a thread control.

At the mobile path setting step S20, the system control unit 20 sets the mobile path of at least one autonomous mobile-based automated guided vehicle 10 as one or more mobile paths in the unit of a block.

As described above, the mobile path of the autonomous mobile-based automated guided vehicle 10 is formed by the arrangement of one or more mobile paths in the unit of a block through the user interface through the system input unit 50 such as a display and a computer. The mobile path blocks Bi (where i=1, 2, 3, . . . ) function as a passage through which the autonomous mobile-based automated guided vehicle 10 as an AGV moves, and each mobile path block may be assigned with an inherent feature ID such as B1, B2, B3 or the like. The mobile path block Bi template through the user interface may take a configuration in which it includes various items of information such as the mobile path block way, the mobile path block surface, and the mobile path block way point as shown in the drawings.

Figure 5:
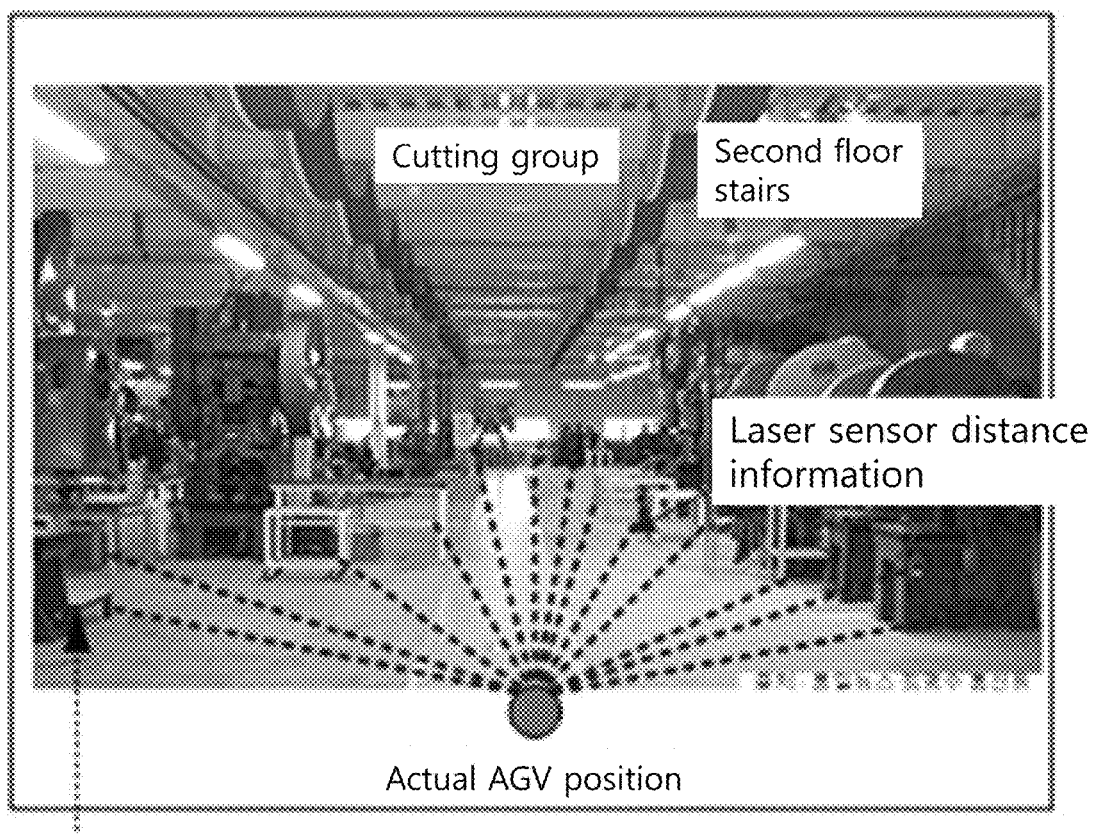
Figure 6:
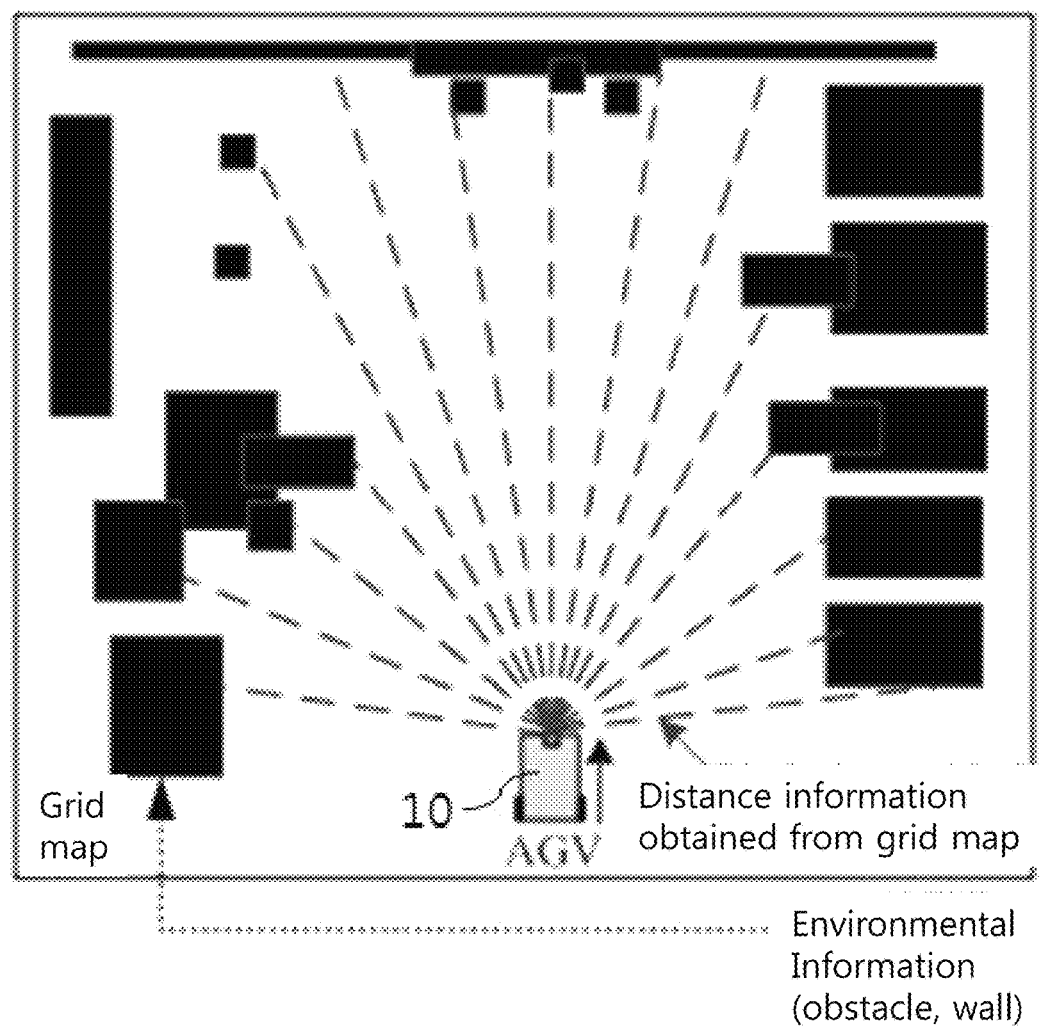
FIG. 6 is a feature map as an environmental map for an actual environment in which an actual travel of an automated guided vehicle of an autonomous mobile-based automated guided vehicle system according to an embodiment of the present invention is carried out.
Figure 7:
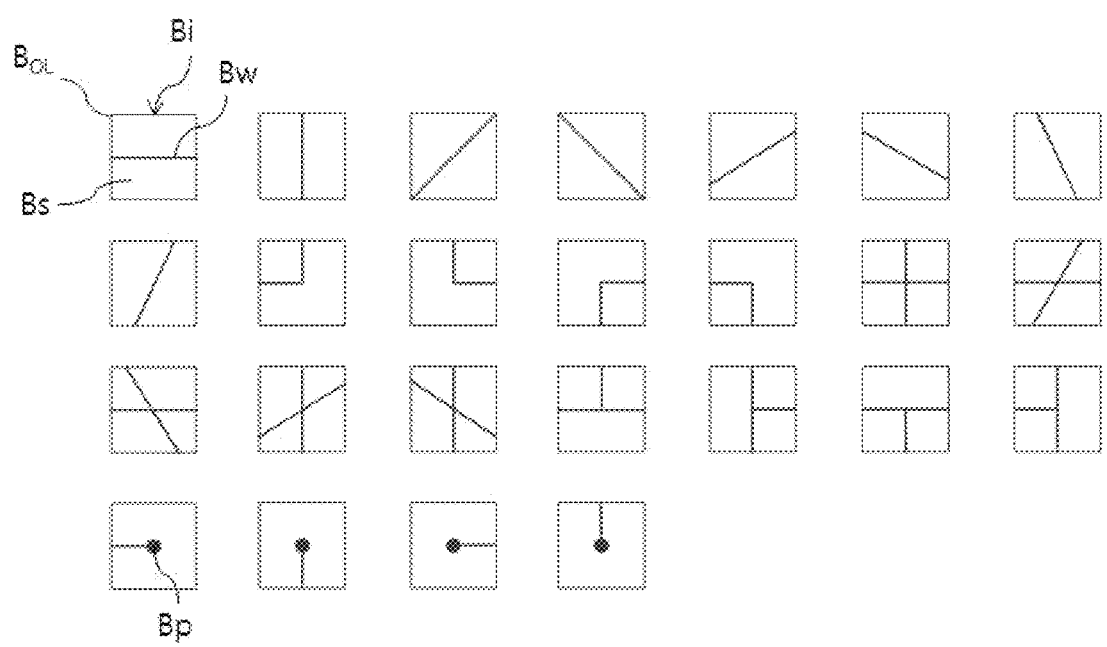
FIG. 7 is a configuration diagram illustrating an example of a template of a mobile path block Bi.

As shown in FIG. 7, the templated mobile path block Bi is arranged on a background so that an operator can set and input the mobile path of the automated guided vehicle. Herein, the background is formed as an environmental map indicative of an environment in which the autonomous mobile-based automated guided vehicle 10 travels. In other words, a feature map as an environmental map for an actual environment in which an actual travel is performed as shown in FIG. 5 is formed, and is previously stored in the system storage unit 30. In this case, the feature map may be stored in the system storage unit 30 in the form of a grid map in which an environmental region is rasterized, if necessary, in order to optimize the amount of data of the feature map. In case of such a feature map, only the presence and absence of an obstacle on the environment is stored simply as shown in FIG. 6, and the space where the autonomous mobile-based automated guided vehicle 10 travels is formed in the form of a margin. The feature map as such an environmental map is stored in the system storage unit 30 and the vehicle storage unit 17 connected to the vehicle control unit 15 so that the relative position of the autonomous mobile-based automated guided vehicle 10 can be presumed using the feature map and the sensor information detected by the vehicle sensor unit 13a, and the travel state of the at least one autonomous mobile-based automated guided vehicle 10 can be controlled under the control of the system control unit 20 based on information of the mobile path block on the mobile path at the presumed position.

Figure 8:
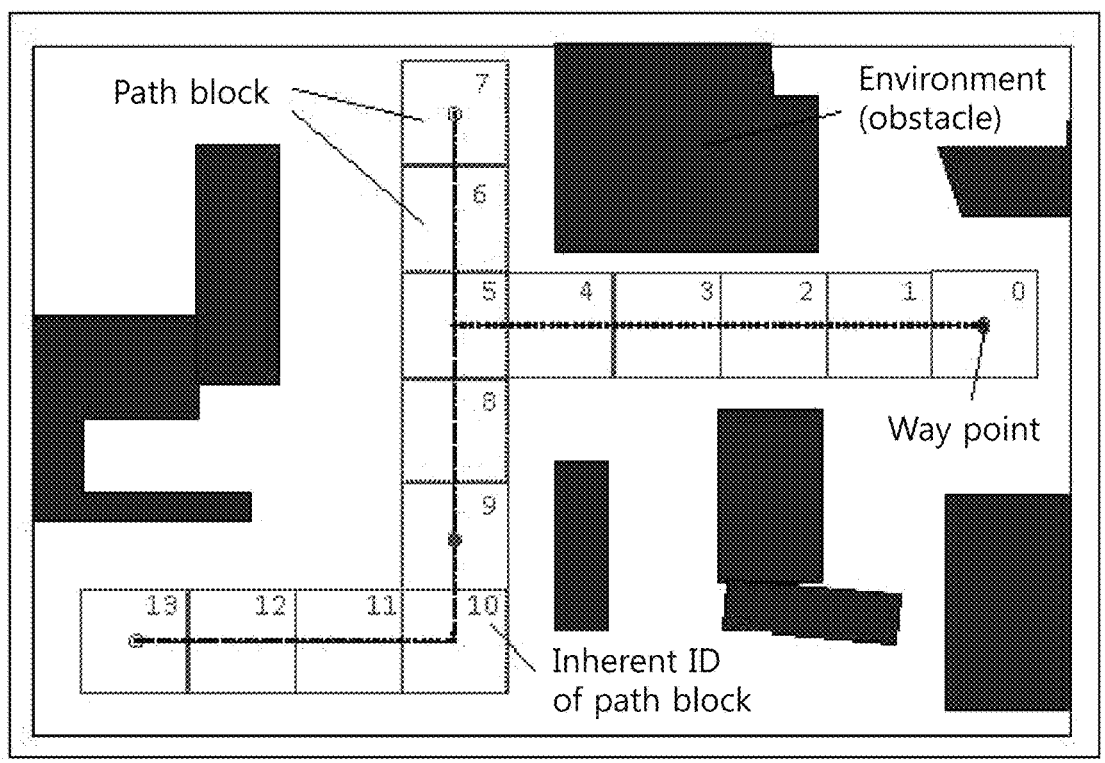
FIG. 8 is a state diagram illustrating a mobile path input process using a mobile path block of an automated guided vehicle of an autonomous mobile-based automated guided vehicle system according to an embodiment of the present invention.

The mobile path setting step S20 can be performed in which a mobile path formed by the mobile path block selected and arranged on the background as the feature map is set. FIG. 8 shows a mobile path formed by a plurality of mobile path blocks Bi (where i=1, 2, 3, . . . ) formed on the background. In FIG. 8, the numerals shown in the mobile path blocks Bi denotes inherent IDs assigned to the mobile path blocks Bi, and can be used to make a distinction between the respective mobile path blocks and form an actual mobile path order. The inherent IDs 0, 7 and 13 of the mobile path blocks Bi correspond to destinations. The autonomous mobile-based automated guided vehicle 10 travels between the mobile path blocks that are set as destinations. The characteristics of the mobile path block is divided into a speed and a work that are respectively indicative of the mobile path block surface and the mobile path block way point. The work of the mobile path block is determined by whether or not there is a way point where work registration can be made. Although not a destination, ID 9 can be set as a way point. Examples of the kind of a work as a task can include various works such as delivery and loading of goods, arrangement of a bogie, specific motion control, current state transfer of the autonomous mobile-based automated guided vehicle 10, reception standby of higher-rank information, specific signal standby, etc. Information on a specific work is included in the mobile path block, but not in the autonomous mobile-based automated guided vehicle 10. In other words, information on the specific work is stored in the system storage unit 30 that stores the mobile path block.

Thus, the specific work is not performed by a specific autonomous mobile-based automated guided vehicle, but is performed by an autonomous mobile-based automated guided vehicle 10 arrived at a mobile path block Bi assigned with a corresponding task that is set depending on whether or not the mobile path block way point is marked. In addition, if the autonomous mobile-based automated guided vehicle 10 being operated on a current mobile path block is falied or a specific work needs to be performed, another autonomous mobile-based automated guided vehicle 10 which is in a standby state is called out by the system control unit 20 so that the other autonomous mobile-based automated guided vehicle 10 can be controlled in the traveling operation, and thus can perform a corresponding work instead of the autonomous mobile-based automated guided vehicle 10 being operated. Thus, by virtue of this work configuration in the unit of the mobile path block, the efficiency of the factory operation can be maximized. As described above, in the path planning in the path setting step using the mobile path block, a path can be generated by moving each mobile path block through a mouse drag in the system input unit 10 connected to the system control unit 20, i.e., a superordinate system to increase convenience of a user. In addition, the work scheduling can also be easily added and deleted through a mouse click.

Figure 9:
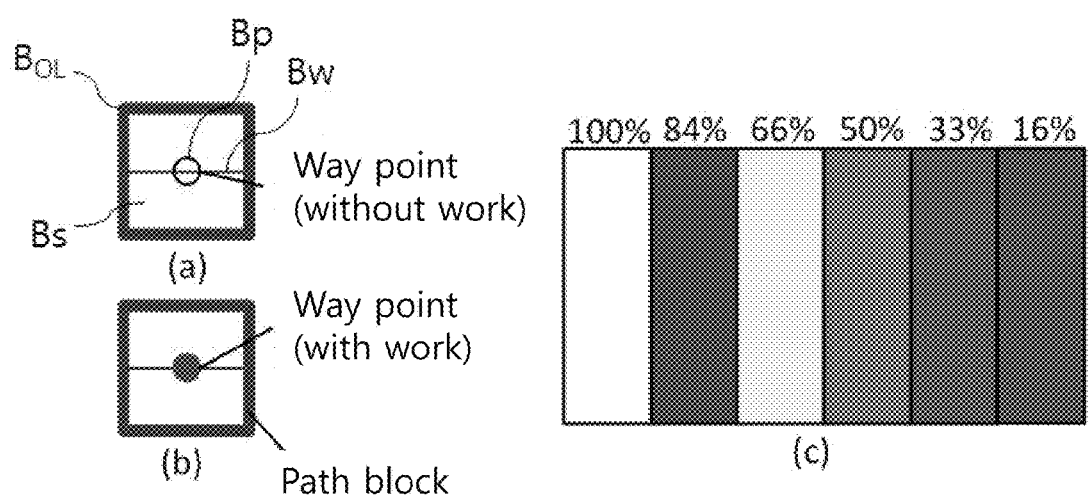
FIG. 9 is a configuration diagram illustrating an attribute of a mobile path block of an automated guided vehicle of an autonomous mobile-based automated guided vehicle system according to an embodiment of the present invention.

As shown in FIG. 8, in the case where the mobile path block way points that are present in the mobile path blocks are formed as hollow circles and are marked, determination of the marking depending on the presence and absence of a set specific task as shown in FIG. 9 is the same as in the above description. In this embodiment, if there is no task, the mobile path block way point is indicated by a white color, and if there is a task, the mobile path block way point is indicated by a white color. Various works can also be registered in a single mobile path block way point. A configuration can be implemented in which a work order of a plurality of tasks is set easily by a change of the user interface.

Figure 10:
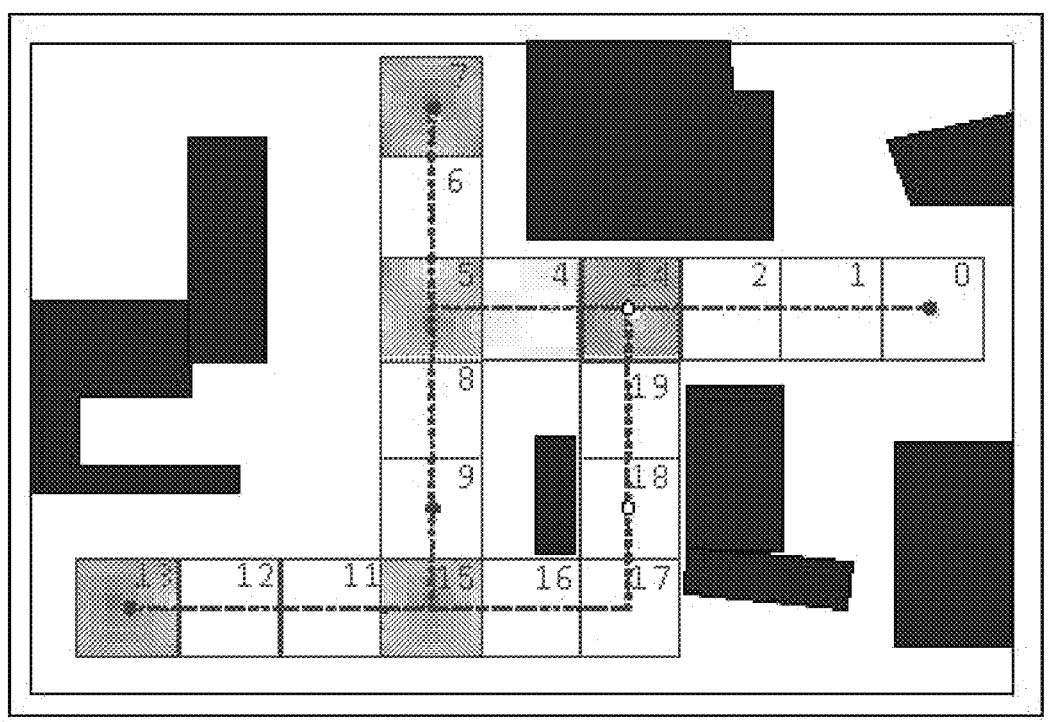
FIG. 10 is a state diagram illustrating a mobile path input process using a mobile path block of an automated guided vehicle of an autonomous mobile-based automated guided vehicle system according to an embodiment of the present invention.

In addition, the velocity control on the mobile path block of the autonomous mobile-based automated guided vehicle 10 is the same as in the above description. A mobile path map can be derived on the feature map as shown in FIG. 10 through the mobile path setting step. In this case, it can be seen that marked mobile path block way points are set in the mobile path block IDs 0, 7, 9 and 13, and thus specific works are performed. In addition, a case can be set in which only mobile path block way points are added and no marking is made thereon so that there is no task as in mobile path block IDs 14 and 18. In this case, the autonomous mobile-based automated guided vehicle 10 passes through the mobile path blocks assigned with IDs 14 and 18 without performing any work, but any work may be added through a subsequent given change. Under circumstances, the mobile path block way points set in the mobile path block IDs 14 and 18 may be used as start points or end points of the mobile path, but not as simple way points.

The mobile path blocks assigned with IDs 4, 5, 7, 13, 14 and 15 have colors assigned to respective mobile path block surfaces Bs thereof, and the autonomous mobile-based automated guided vehicle 10 passes through corresponding mobile path blocks while reducing the travel velocity thereof by each stage. In a corner section, velocity information forming deceleration of the autonomous mobile-based automated guided vehicle 10 is allocated to the mobile path blocks so that cargoes loaded on the autonomous mobile-based automated guided vehicle 10 can be prevented from falling through deceleration. Further, in a straight section, the autonomous mobile-based automated guided vehicle 10 can travel at high speed so that the travel efficiency of the autonomous mobile-based automated guided vehicle 10 can be increased.

Figure 11:
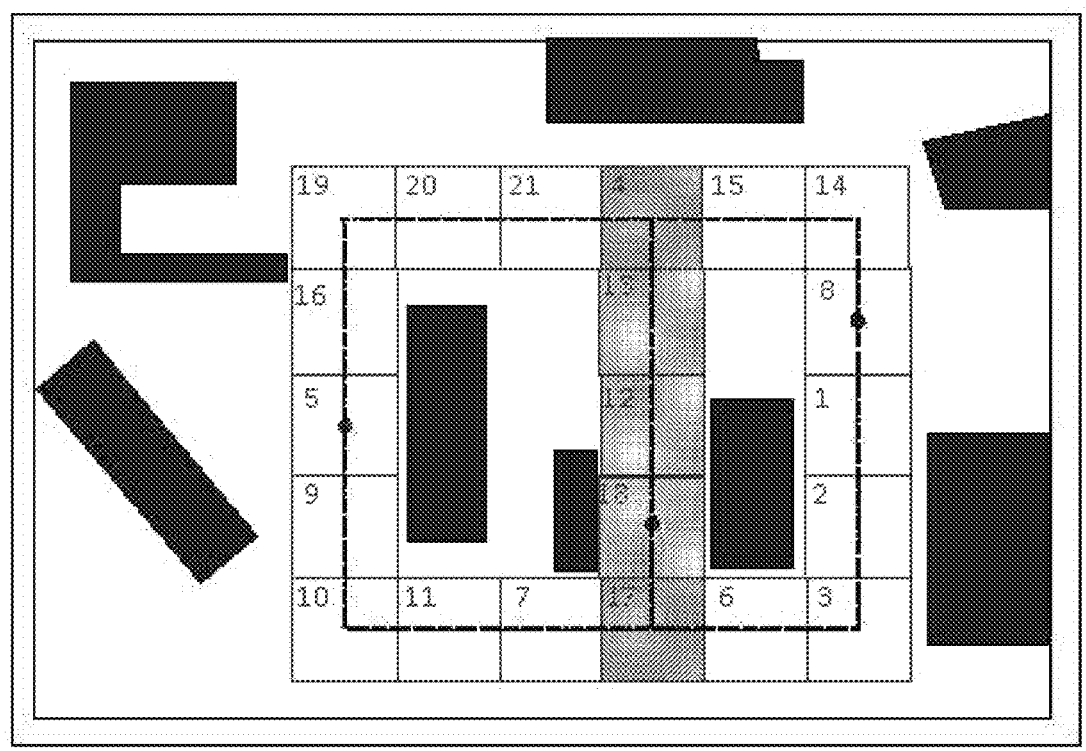
FIGS. 11 and 12 are state diagrams illustrating another example of a mobile path using a mobile path block of an automated guided vehicle of an autonomous mobile-based automated guided vehicle system according to an embodiment of the present invention.

FIG. 11 shows an example of another mobile path map that is finally completed. Mobile path block IDs 5, 8 and 18 of the mobile path blocks B5, B8 and B10 are set as way points, and become end points and simultaneously become start points. Goods can be loaded on the autonomous mobile-based automated guided vehicle 10 at the mobile path block ID 18, and can be unloaded from the autonomous mobile-based automated guided vehicle 10 at the mobile path block ID 8. When the work is completed, the autonomous mobile-based automated guided vehicle 10 moves to mobile path block ID 5 to perform a new work so that a flow of the work and a change of the work order of at the mobile path blocks are facilitated, thereby maximizing the factory efficiency. The mobile path block ID 4, 13, 12, 18 and 17 has a relatively narrow space compared to other regions, and thus the autonomous mobile-based automated guided vehicle 10 moves at a reduced speed so that stability of the work can be increased.

Figure 12:
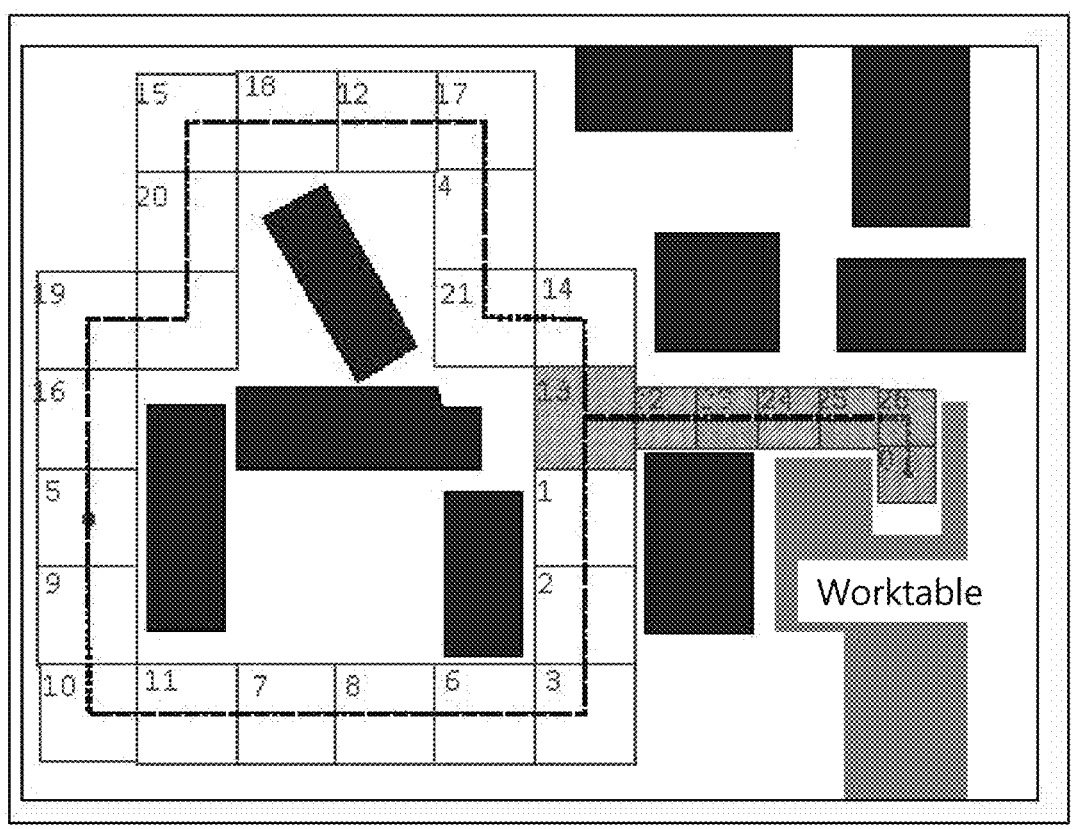

FIG. 12 shows an example of another mobile path map that is finally completed. Mobile path blocks IDs 0 and 5 of the mobile path blocks B0 and B5 are set as way points, and become end points and simultaneously become start points. Since a path extending from the mobile path block ID 5 to the mobile path block ID 0 is considerably narrow, existing mobile path blocks are not used as it is, but are used in a state in which the size thereof is changed. In other words, the mobile path map can be implemented as a user interface enabling a change of the size of the mobile path block. In addition, the free mobile space of the autonomous mobile-based automated guided vehicle 10 becomes narrow, and thus it is preferable to reduce the speed of the autonomous mobile-based automated guided vehicle 10. In this case, the use of the small-sized mobile path blocks enables a precise travel plan design under a dense work space. When the autonomous mobile-based automated guided vehicle 10 arrives at the mobile path block ID 0, it performs a work allocated to the mobile path block B0.

Figure 13:
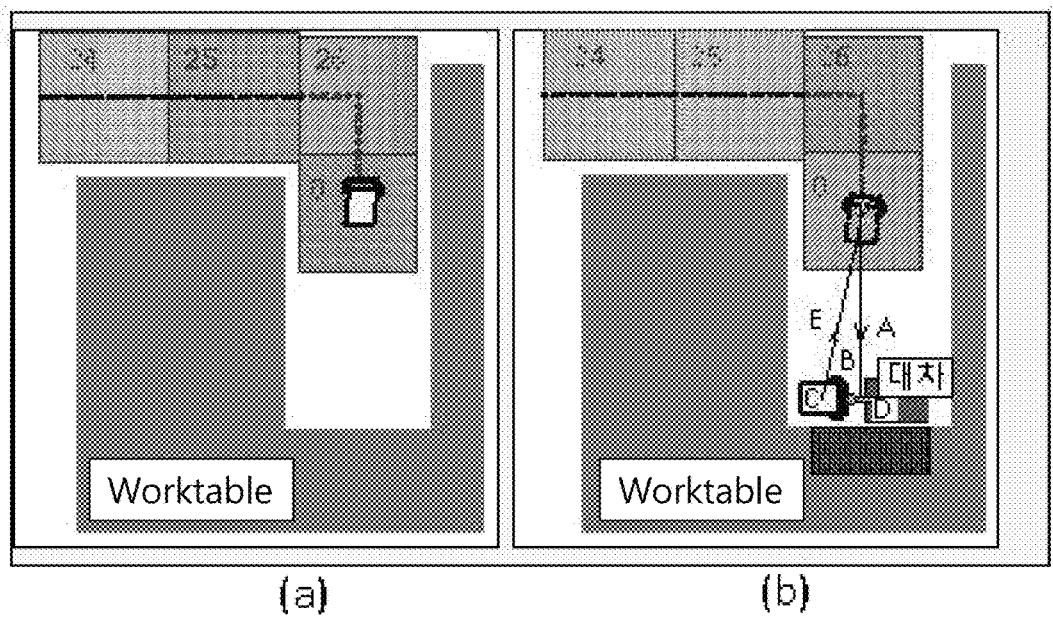
FIG. 13 is a state diagram illustrating a process of utilizing a task marker that is set in a mobile path block in a travel basic control step using a mobile path block of an automated guided vehicle of an autonomous mobile-based automated guided vehicle system according to an embodiment of the present invention.

In addition, the kind of the task as described above is various depending on the factory environments. A task performed by the autonomous mobile-based automated guided vehicle on a mobile path set as mobile path block of the present invention enables a simple work such as loading used generally, and has a structure in which the kind and order of the task is stored in the path block so that more multilateral works can be performed. FIG. 13 shows an example of a task selected in the case where a mobile path block task marker is marked on a mobile path block way point. The kind and execution order of a task needed to be performed on a worktable can be registered in a mobile path block task marker at the mobile path block ID 0. FIG. 13(*a*) shows a state in which the autonomous mobile-based automated guided vehicle 10 arrives at the mobile path block. As shown in FIG. 13(*b*), the autonomous mobile-based automated guided vehicle 10 performs transmission and reception of data relating to the kind and order of a work stored in and assigned to a corresponding mobile path block with the system control unit 20 through the vehicle communication unit 19 of the autonomous mobile-based automated guided vehicle 10 arrived at the mobile path block. The vehicle control unit 15 performs a predetermined task operation in response to a control signal applied thereto. The AGV is assigned with a work from the path block to perform a work. The kind of the work to be performed includes loading, travel, alarming, data transmission and reception, cooperation with an operator, etc. The number and method of the works to be performed can be increased infinitely depending on the factory environment and the necessity.

Hereinafter, the substeps of the mobile path setting step will be described with reference to a drawing showing the type of a user interface implemented during the input operation through the system input unit 50. More specifically, the mobile path setting step S20 includes a mobile path block selection step S21 and a mobile path block arrangement setting step S23.

Figure 14:
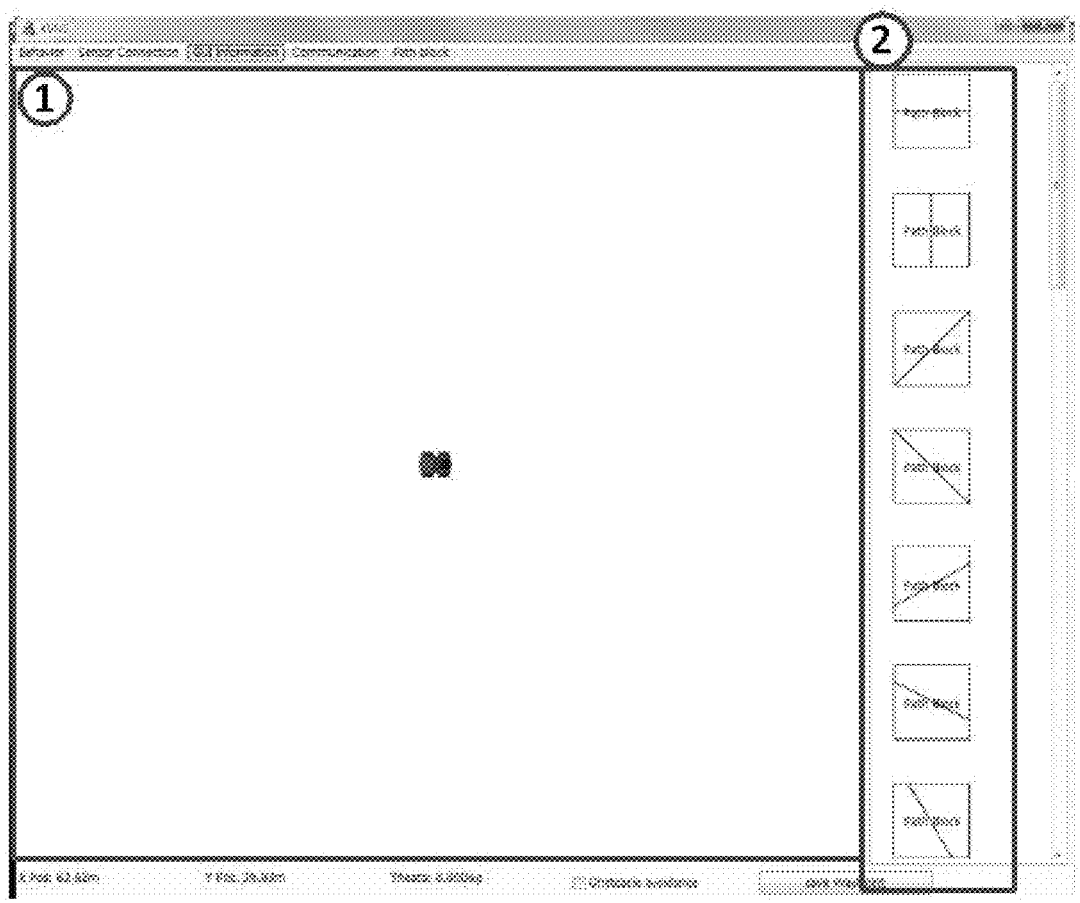
FIGS. 14 to 22 are state diagrams illustrating an execution process of a mobile path block of an automated guided vehicle of an autonomous mobile-based automated guided vehicle system according to an embodiment of the present invention.

The mobile path block is stored in the system storage unit 30 in a state of being templated. During the setting of the mobile path through the system input unit 50, the mobile path blocks in the unit of a block, which are inputted through the system input unit 50 in the mobile path block selection step S21, are selected, and information on the mobile path blocks is transferred to the system control unit 20. In other words, a system display 51 as one constituent element of the system input unit 50 is shown in FIG. 14. Matters that cooperate with a system device 53 such as a keyboard or a mouse are displayed on the system display 51. A region denoted by a reference numeral ① indicates a background, i.e., a UI region where a feature map which will be described later is arranged, and a region denoted by a reference numeral ② indicates a mobile path block template for the mobile path blocks Bi in the unit of a block, which are stored in the system storage unit 30. The mobile path blocks are selected from the mobile path block template.

Thereafter, in the mobile path block arrangement setting step S23, the mobile path blocks Bi selected in the mobile path block selection step S21 can be arranged. The mobile path block arrangement setting step S23 includes a mobile path block outline arrangement step S231 and a mobile path block surface setting step S233. In the mobile path block arrangement setting step S23, the mobile path blocks selected from the template are arranged on the background so that predetermined mobile paths can be stored through the system control unit 20 and the system storage unit 30.

Figure 15:
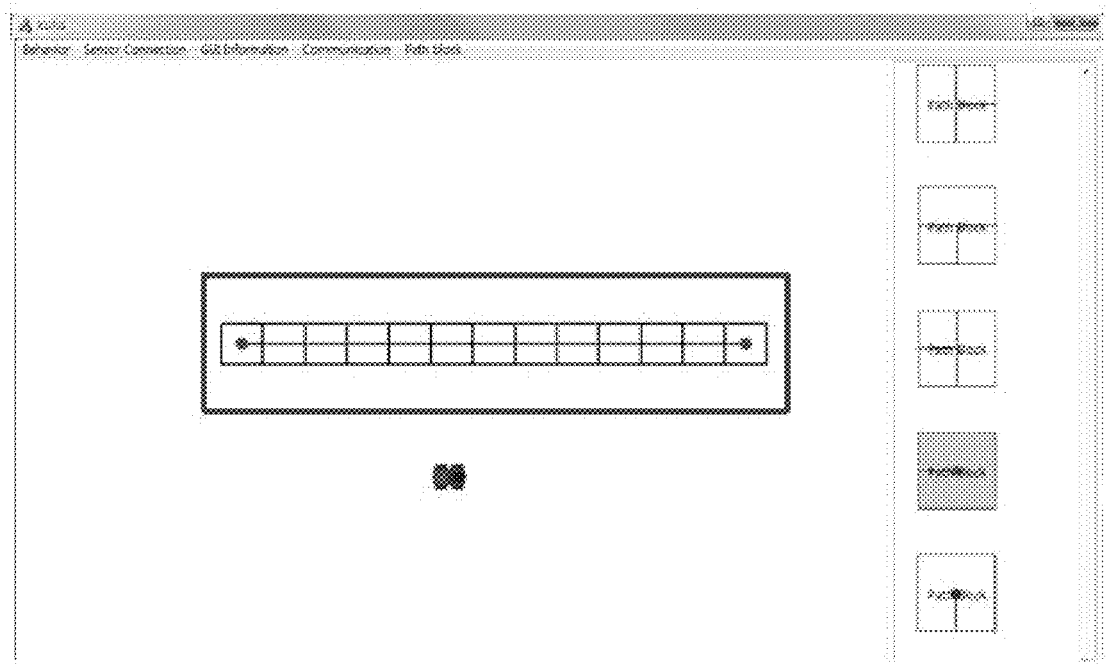
Figure 16:
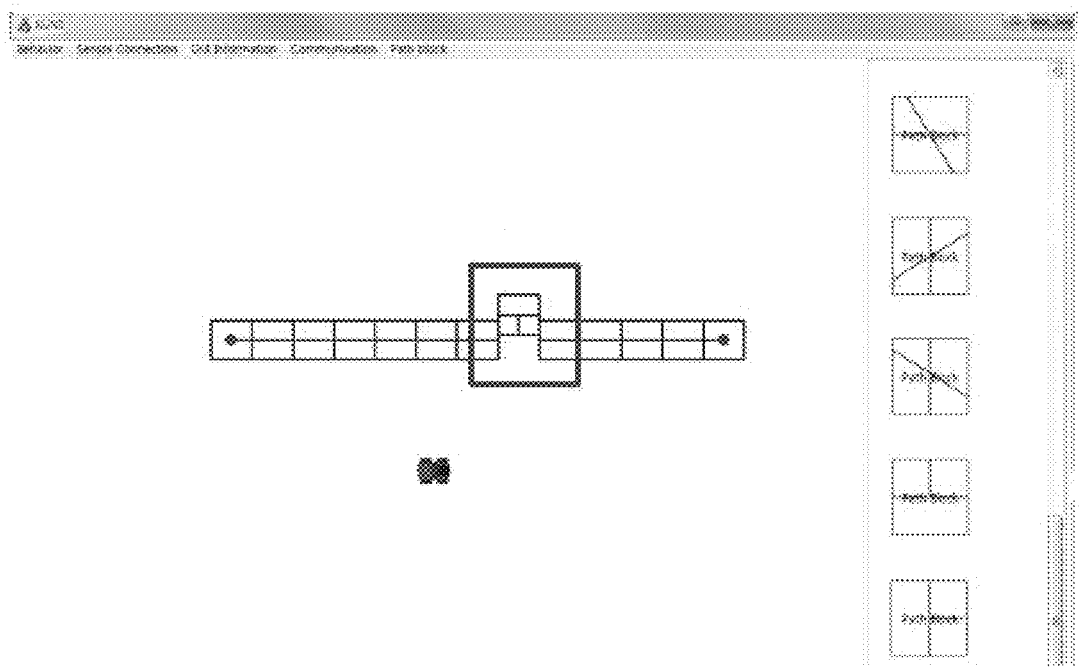

The system control unit 20 can implement such a mobile path block arrangement process in a drop-and-drop manner. In FIGS. 15 and 16, there is shown an example of a process of arranging the selected mobile path blocks. That is, a mobile path block outline selected in the mobile path block outline arrangement step S231 is arranged on the background in the drag-and-drop manner.

Thereafter, an individual attribute for a mobile path block is selected. The attribute of the mobile path block includes the mobile velocity at a corresponding mobile path blocks, the position characteristics of the corresponding mobile path block, and a task at the mobile path block. The mobile path block arrangement setting step S23 includes the mobile path block surface setting step S233, a block position characteristics setting step S235, and a task setting step S237. The execution order of the mobile path block surface setting step S233, the block position characteristics setting step S235, and the task setting step S237 may be selected sequentially or in an order different from the order described above, but may be selected in various manners within a range of performing the mobile path block arrangement setting operation through the selection of the mobile path block. In this embodiment, a description will be made centering on a configuration in which the block position characteristics setting step S235, the mobile path block surface setting step S233, and the task setting step S237 are performed in this order.

Figure 17:
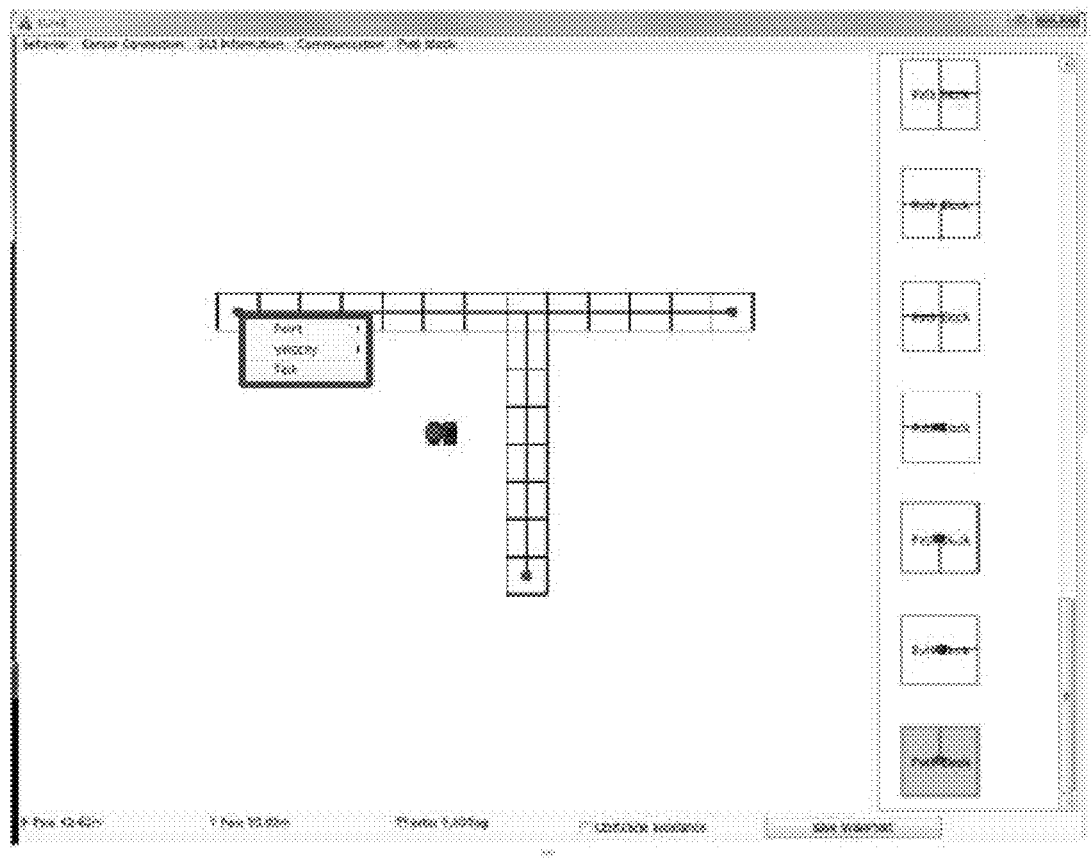
Figure 18:
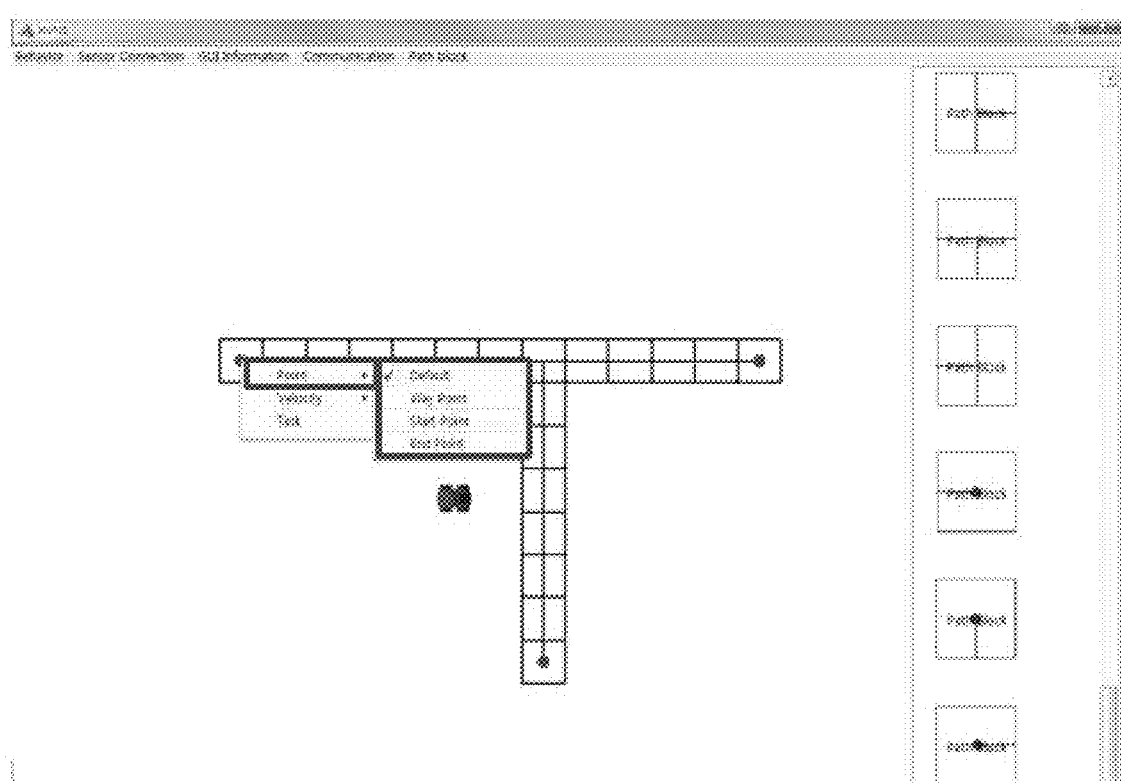

First, the block position characteristics setting step S235 is performed to set the position characteristics of the mobile path block outline $B_{OL}$. In other words, the position characteristics of a corresponding mobile path block indicate whether or not a current mobile path block is a start point as a departure point, an end point as an arrival point, or a way point as a transit point. The mobile path block outline of the corresponding mobile path block is arranged, and then, as shown in FIG. 17, when a user clicks on the corresponding mobile path block outline to pop up a menu bar, a submenu enabling the selection of position characteristics, speed characteristics, and work characteristics of the corresponding mobile path block is drawn. When the position characteristics of the corresponding mobile path block is selected, a submenu including a start point, an end point, and a way point for the position characteristics can be drawn to select corresponding position characteristics as shown in FIG. 18. In particular, in this embodiment, in the case where the position characteristics for the mobile path block outline is selected, the mobile path block way point Bp takes a configuration in which a marking represented by a hollow circle is displayed in the inner space of the corresponding mobile path block outline. The mobile path block way point Bp is displayed through a display to enable the user to rapidly recognize mobile path blocks that necessarily need to be passed through on a mobile path on which a work is in progress. In addition, a mobile path block task marker Bm which will be described later can be positioned within the mobile path block way point Bp. The mobile path block task marker Bm includes the presence of a task (work) which is required to be performed at the corresponding mobile path block and the content of the corresponding task. For this reason, the existence of the corresponding mobile path block task marker is premised on that the autonomous mobile-based automated guided vehicle 10 must pass necessarily through the corresponding mobile path block. An embodiment of the present invention has a configuration in which the mobile path block task marker is positioned within the mobile path block way point.

Figure 19:
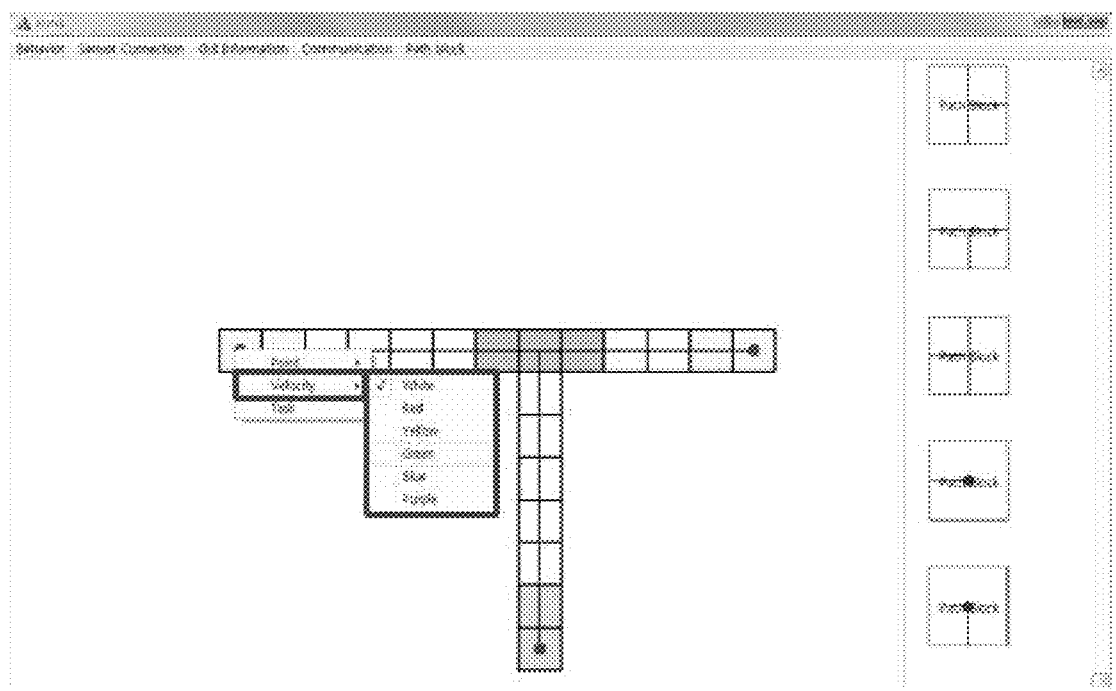

Thereafter, the mobile path block is arranged in the mobile path block surface so that a plurality of preset reduction ratios is selected with respect to a basic mobile velocity for the mobile path block outline for selection of a mobile velocity for the mobile path block outline by the autonomous mobile-based automated guided vehicle 10. As shown in FIG. 19, a velocity menu can be selected from the popup menu that appears by selecting the mobile path block outline $B_{OL}$. The mobile path block surface Bs of the mobile path block is formed as a submenu of a color having a preset reduction ratio by selecting the velocity menu. The reduction ratio for a corresponding color selected by a worker or an operator is set as the mobile path block surface of the corresponding mobile path block outline and is stored in the system storage unit 30. The velocity setting in the mobile path block surface setting step S233 may be configured as a direct velocity value input structure, but has a configuration in which a velocity attribute for a corresponding mobile path block is changed by selecting a preset reduction ratio by color of each mobile path block surface with respect to a basic mobile velocity in this embodiment.

In other words, as shown in FIG. 19, velocity information of the attribute of the mobile path block, which is popped up and displayed selectably by clicking on the mobile path block outline, can be controlled by being divided into six-color information at a lower end of a velocity button indicated by a square in a manner similar to that in the above description. When a mobile velocity is controlled at a mobile path block which it is desired to set, color information such as white, red, yellow, green, blue, or purple is assigned to the corresponding mobile path block so that the autonomous mobile-based automated guided vehicle 10 is decelerated at a reduction ratio assigned to each color, and thus the mobile velocity of the autonomous mobile-based automated guided vehicle 10 in a space occupied by the mobile path block outline of the corresponding mobile path block is controlled.

Thereafter, the task setting step S237 is performed which sets a task for a position where a corresponding mobile path block way point is set as described above. The mobile path block arrangement setting step S23 includes the task setting step S237 of selecting and setting the mobile path block task marker Bp for the mobile path block outline $B_{OL}$. In the task setting step S237, the presence and absence of a work that is in progress at the corresponding mobile path block, and the content of the corresponding work are set. In the case where the task setting step for the corresponding mobile path block is performed in an embodiment of the present invention, the present invention has a default configuration in which although a step is excluded which selects a transit point among the position characteristics of the corresponding mobile path block, the transit point setting is, of course, automatically performed.

Figure 21:
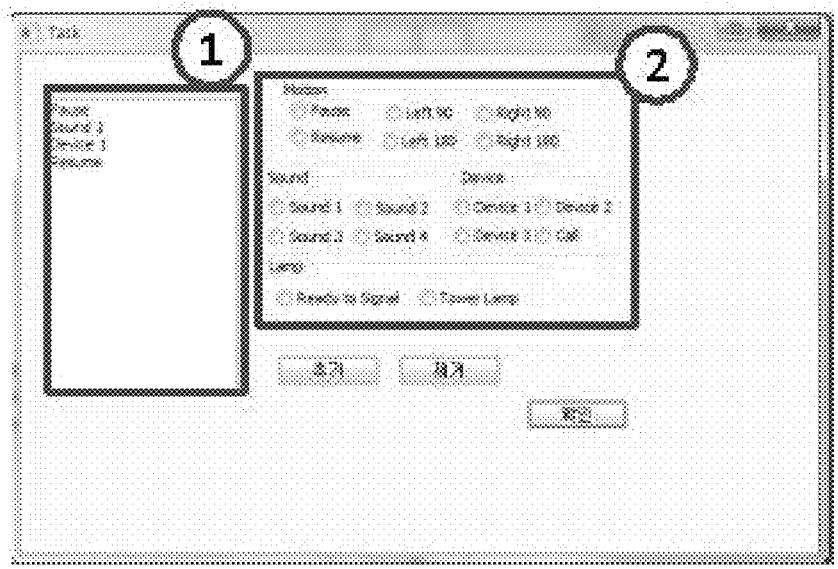

The task setting step S237 includes a stabilization step setting step S2371, a task template setting step S2373, and a movement restart step setting step S2375. These series of processes can be selected and set from new popup menu windows as shown in FIG. 21, which is outputted by selecting a square task item, as one of the block attribute menu popped up when clicking on the mobile path block outline as described above with reference to FIG. 19.

In the stabilization step setting step S2371, the system control unit 20 stabilizes the transport of the autonomous mobile-based automated guided vehicle 10. The stabilization step setting step S2371 may be implemented as a time delay that applies a control signal needed in order for the system control unit 20 to perform a subsequent step, and may include a process of selecting and setting a predetermined fine position movement process such as the movement of the autonomous mobile-based automated guided vehicle 10 to a worktable position, the movement of the autonomous mobile-based automated guided vehicle 10 to a position suitable for the work, and the like as shown in FIG. 13

In the task template setting step S2373, a template task corresponding to the task template stored in the system storage unit 30 may be selected. The template task may include a specific loading work such as picking up a loaded cargo such as a component tray and loading or unloading the picked-up cargo on or from a box truck as described above.

Thereafter, in the movement restart step setting step S2375, the autonomous mobile-based automated guided vehicle 10 completes a selected and set corresponding task such as a specific loading work, and then the system control unit 20 may instruct a preparation for the movement restart in which the autonomous mobile-based automated guided vehicle 10 is returned or rearranged to a position on the mobile path block.

Figure 20:
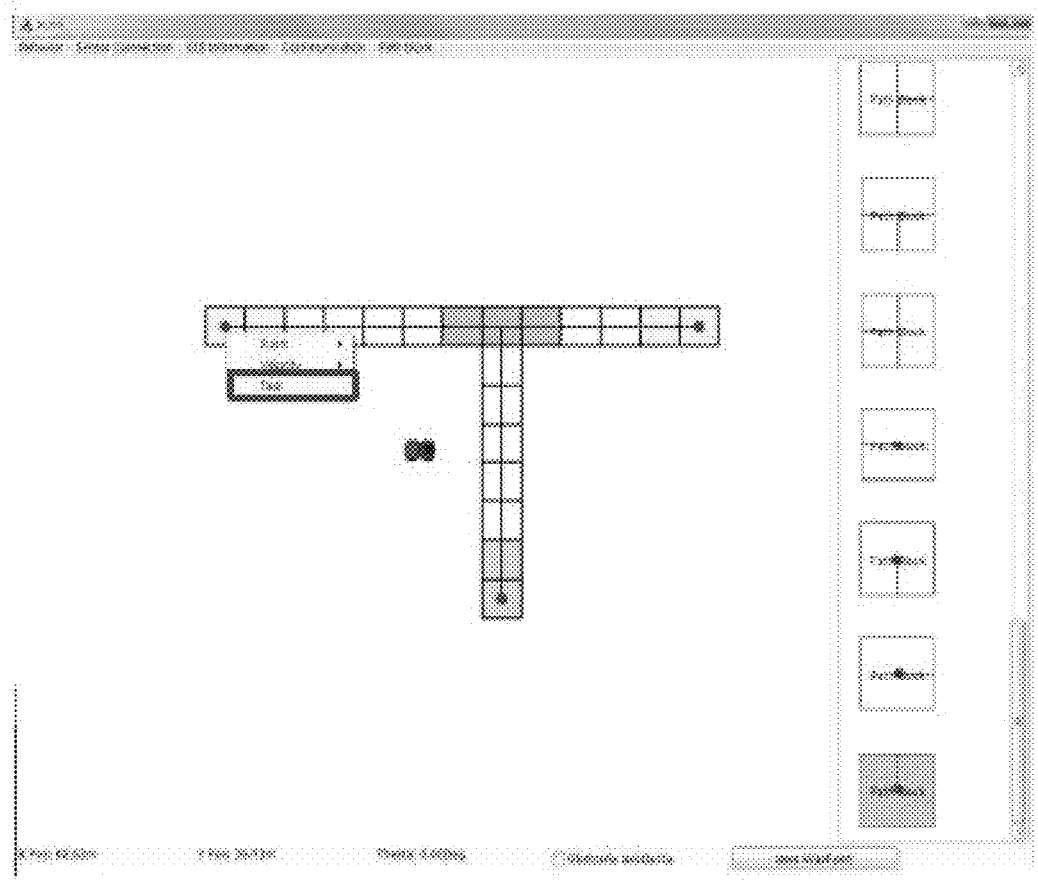

The respective substeps for actual implementation of the task setting step S237 are shown in FIGS. 19 to 21. Each task in the task setting step S237 takes a configuration in which it is stored in the system storage unit 30 and is selectable through a user interface.

Figure 22:
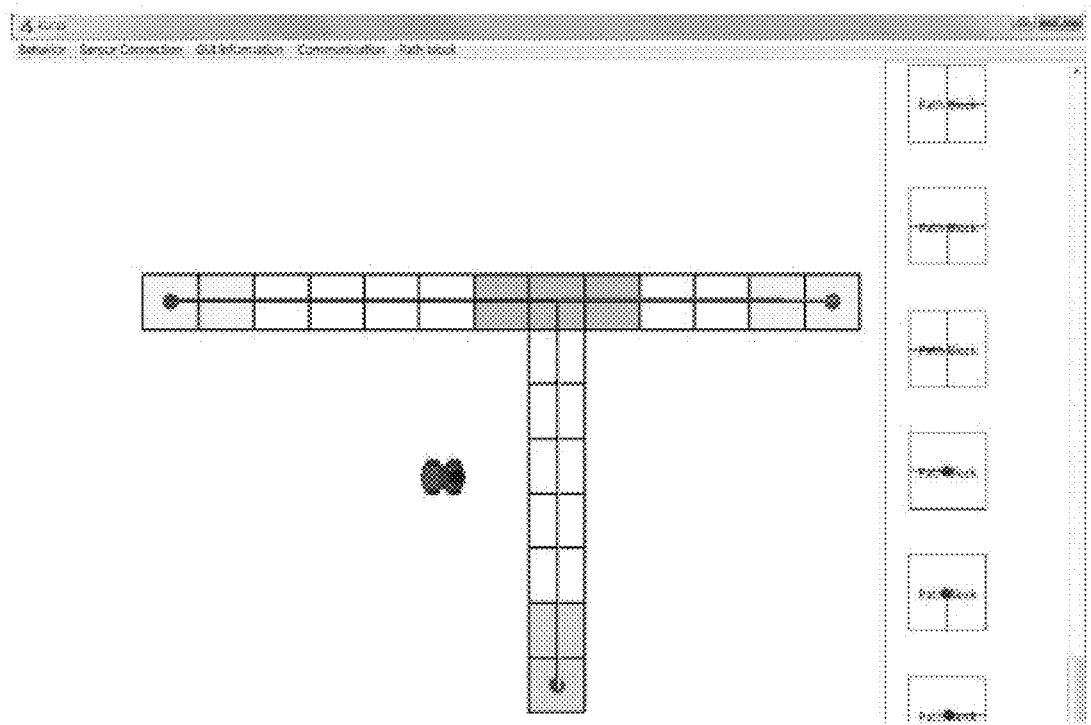
Figure 23:
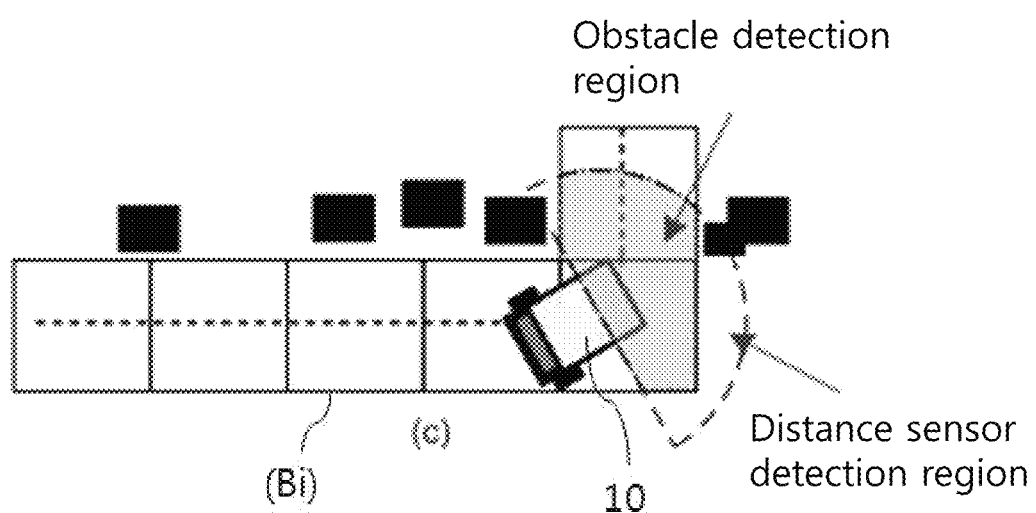
FIG. 23 is a state diagram illustrating an obstacle detection step of an automated guided vehicle of an autonomous mobile-based automated guided vehicle system according to an embodiment of the present invention

When a square task item is selected (see FIG. 20) as one of the block attribute menu popped up when clicking on the mobile path block outline as described above with reference to FIG. 19, new popup windows as shown in FIG. 21 are outputted. Herein, the window ① denotes an order of a task (or work) and the work is performed in this order. As shown in FIG. 21, the task can be set as Pause, Sound 1, Device 1, and Resume. Pause can accomplish the implementation of the stabilization step setting step, Device 1 can accomplish the implementation of the task template setting step, and Resume can accomplish the implementation of the movement restart step setting step. Sound 1 interposed between Pause and Device 1 denotes a set menu of a warning sound for allowing a surrounding worker to check the safe state, and may be included in the stabilization step setting step. According to the task setting step as set above, when arriving at a corresponding mobile path block, the autonomous mobile-based automated guided vehicle 10 takes a pause and then makes a sound corresponding to Sound 1 to allow the surrounding worker to ensure the safe state. The autonomous mobile-based automated guided vehicle 10 performs a work corresponding to Device 1 and then restarts traveling along the mobile path. Specific matters of each task item can be displayed on the window ② of FIG. 21, but may be modified in various manners depending on design specifications which the user desire. FIG. 22 shows a display screen of a mobile path formed through a series of substeps of the mobile path setting step S20.

As shown in FIG. 7, the templated mobile path block Bi is arranged on a background so that an operator can set and input the mobile path of the automated guided vehicle. Herein, the background is formed as an environmental map indicative of an environment in which the autonomous mobile-based automated guided vehicle 10 travels. In other words, a feature map as an environmental map for an actual environment in which an actual travel is performed as shown in FIG. 5 is formed, and is previously stored in the system storage unit 30. In this case, the feature map may be stored in the system storage unit 30 in the form of a grid map in which an environmental region is rasterized, if necessary, in order to optimize the amount of data of the feature map. In case of such a feature map, only the presence and absence of an obstacle on the environment is stored simply as shown in FIG. 6, and the space where the autonomous mobile-based automated guided vehicle 10 travels is formed in the form of a margin. The feature map as such an environmental map is stored in the system storage unit 30 and the vehicle storage unit 17 connected to the vehicle control unit 15 so that the relative position of the autonomous mobile-based automated guided vehicle 10 can be presumed using the feature map and the sensor information detected by the vehicle sensor unit 13a, and the travel state of the at least one autonomous mobile-based automated guided vehicle 10 can be controlled under the control of the system control unit 20 based on information of the mobile path block on the mobile path at the presumed position.

The mobile path setting step S20 can be performed in which a mobile path formed by the mobile path block selected and arranged on the background as the feature map is set. FIG. 8 shows a mobile path formed by a plurality of mobile path blocks Bi (where i=1, 2, 3, . . . ) formed on the background. In FIG. 8, the numerals shown in the mobile path blocks Bi denotes inherent IDs assigned to the mobile path blocks Bi, and can be used to make a distinction between the respective mobile path blocks and form an actual mobile path order. The inherent IDs 0, 7 and 13 of the mobile path blocks Bi correspond to destinations. The autonomous mobile-based automated guided vehicle 10 travels between the mobile path blocks that are set as destinations. The characteristics of the mobile path block are divided into a speed and a work that are respectively indicative of the mobile path block surface and the mobile path block way point. The work of the mobile path block is determined by whether or not there is a way point where work registration can be made. Although not a destination, ID 9 can be set as a way point. Examples of the kind of a work as a task can include various works such as delivery and loading of goods, arrangement of a bogie, specific motion control, current state transfer of the autonomous mobile-based automated guided vehicle 10, reception standby of higher-rank information, specific signal standby, etc. Information on a specific work is included in the mobile path block, but not in the autonomous mobile-based automated guided vehicle 10. In other words, information on the specific work is stored in the system storage unit 30 that stores the mobile path block.

Thus, the specific work is not performed by a specific autonomous mobile-based automated guided vehicle, but is performed by an autonomous mobile-based automated guided vehicle 10 arrived at a mobile path block Bi assigned with a corresponding task that is set depending on whether or not the mobile path block way point is marked. In addition, if the autonomous mobile-based automated guided vehicle 10 being operated on a current mobile path block is falied or a specific work needs to be performed, another autonomous mobile-based automated guided vehicle 10 which is in a standby state is called out by the system control unit 20 so that the other autonomous mobile-based automated guided vehicle 10 can be controlled in the traveling operation, and thus can perform a corresponding work instead of the autonomous mobile-based automated guided vehicle 10 being operated. Thus, by virtue of this work configuration in the unit of the mobile path block, the efficiency of the factory operation can be maximized. As described above, in the path planning in the path setting step using the mobile path block, a path can be generated by moving each mobile path block through a mouse drag in the system input unit 10 connected to the system control unit 20, i.e., a superordinate system to increase convenience of a user. In addition, the work scheduling can also be easily added and deleted through a mouse click.

As shown in FIG. 8, in the case where the mobile path block way points that are present in the mobile path blocks are formed as hollow circles and are marked, determination of the marking depending on the presence and absence of a set specific task as shown in FIG. 9 is the same as in the foregoing. In this embodiment, if there is no task, the mobile path block way point is indicated by a white color, and if there is a task, the mobile path block way point is indicated by a white color. Various works can also be registered in a single mobile path block way point. A configuration can be implemented in which a work order of a plurality of tasks is set easily by a change of the user interface.

In addition, the velocity control on the mobile path block of the autonomous mobile-based automated guided vehicle 10 is the same as in the above description. A mobile path map can be derived on the feature map as shown in FIG. 10 through the mobile path setting step. In this case, it can be seen that marked mobile path block way points are set in the mobile path block IDs 0, 7, 9 and 13, and thus specific works are performed. In addition, a case can be set in which only mobile path block way points are added and no marking is made thereon so that there is no task as in mobile path block IDs 14 and 18. In this case, the autonomous mobile-based automated guided vehicle 10 passes through the mobile path blocks assigned with IDs 14 and 18 without performing any work, but any work may be added through a subsequent given change. Under circumstances, the mobile path block way points set in the mobile path block IDs 14 and 18 may be used as start points or end points of the mobile path, but not as simple way points.

The mobile path blocks assigned with IDs 4, 5, 7, 13, 14 and 15 have colors assigned to respective mobile path block surfaces Bs thereof, and the autonomous mobile-based automated guided vehicle 10 passes through corresponding mobile path blocks while reducing the travel velocity thereof by each stage. In a corner section, velocity information forming deceleration of the autonomous mobile-based automated guided vehicle 10 is allocated to the mobile path blocks so that cargoes loaded on the autonomous mobile-based automated guided vehicle 10 can be prevented from falling through deceleration. Further, in a straight section, the autonomous mobile-based automated guided vehicle 10 can travel at high speed so that the travel efficiency of the autonomous mobile-based automated guided vehicle 10 can be increased.

FIG. 11 shows an example of another mobile path map that is finally completed. Mobile path block IDs 5, 8 and 18 of the mobile path blocks B5, B8 and B10 are set as way points, and become end points and simultaneously become start points. Goods can be loaded on the autonomous mobile-based automated guided vehicle 10 at the mobile path block ID 18, and can be unloaded from the autonomous mobile-based automated guided vehicle 10 at the mobile path block ID 8. When the work is completed, the autonomous mobile-based automated guided vehicle 10 moves to mobile path block ID 5 to perform a new work so that a flow of the work and a change of the work order of at the mobile path blocks are facilitated, thereby maximizing the factory efficiency. The mobile path block ID 4, 13, 12, 18 and 17 has a relatively narrow space compared to other regions, and thus the autonomous mobile-based automated guided vehicle 10 moves at a reduced speed so that stability of the work can be increased.

FIG. 12 shows an example of another mobile path map that is finally completed. Mobile path blocks IDs 0 and 5 of the mobile path blocks B0 and B5 are set as way points, and become end points and simultaneously become start points. Since a path extending from the mobile path block ID 5 to the mobile path block ID 0 is considerably narrow, existing mobile path blocks are not used as it is, but are used in a state in which the size thereof is changed. In other words, the mobile path map can be implemented as a user interface enabling a change of the size of the mobile path block. In addition, the free mobile space of the autonomous mobile-based automated guided vehicle 10 becomes narrow, and thus it is preferable to reduce the speed of the autonomous mobile-based automated guided vehicle 10. In this case, the use of the small-sized mobile path blocks enables a precise travel plan design under a dense work space. When the autonomous mobile-based automated guided vehicle 10 arrives at the mobile path block ID 0, it performs a work allocated to the mobile path block B0.

In addition, the kind of the task as described above is various depending on the factory environments. A task performed by the autonomous mobile-based automated guided vehicle on a mobile path set as mobile path block of the present invention enables a simple work such as loading used generally, and has a structure in which the kind and order of the task is stored in the path block so that more multilateral works can be performed. FIG. 13 shows an example of a task selected in the case where a mobile path block task marker is marked on a mobile path block way point. The kind and execution order of a task needed to be performed on a worktable can be registered in a mobile path block task marker at the mobile path block ID 0. FIG. 13(*a*) shows a state in which the autonomous mobile-based automated guided vehicle 10 arrives at the mobile path block. As shown in FIG. 13(*b*), the autonomous mobile-based automated guided vehicle 10 performs transmission and reception of data relating to the kind and order of a work stored in and assigned to a corresponding mobile path block with the system control unit 20 through the vehicle communication unit 19 of the autonomous mobile-based automated guided vehicle 10 arrived at the mobile path block. The vehicle control unit 15 performs a predetermined task operation in response to a control signal applied thereto. The AGV is assigned with a work from the path block to perform a work. The kind of the work to be performed includes loading, travel, alarming, data transmission and reception, cooperation with an operator, etc. The number and method of the works to be performed can be increased infinitely depending on the factory environment and the necessity.

After the mobile path setting step S20 is completed, the system control unit 20 applies an autonomous travel control signal to the autonomous mobile-based automated guided vehicle 10 to control the traveling of the autonomous mobile-based automated guided vehicle 10 along the mobile path. In other words, the system control unit 20 performs a travel basic control step S31 of applying a control signal to the autonomous mobile-based automated guided vehicle 10 to implement the operation of the autonomous mobile-based automated guided vehicle 10 at a mobile path block where the autonomous mobile-based automated guided vehicle 10 is currently positioned based on mobile path information inputted through system input unit 50 and a sensing signal detected by the autonomous mobile-based automated guided vehicle 10.

For example, when making an entry into a mobile path block of a mobile path block ID 8 in FIG. 10, the autonomous mobile-based automated guided vehicle 10 transmits corresponding position information, i.e., information on the mobile path block to the system control unit 20 which in turn applies a control signal for the operation at the corresponding mobile path block to the autonomous mobile-based automated guided vehicle 10 based on the mobile path information inputted from the system input unit 50. In this case, the mobile path block occupied by the autonomous mobile-based automated guided vehicle 10 is merely a simply mobile path block where a separate mobile path block way point Bp and a separate task marker Bm are not present, and thus the system control unit 20 transmits a travel control signal to the autonomous mobile-based automated guided vehicle 10 to allow the autonomous mobile-based automated guided vehicle 10 to travel at a mobile velocity corresponding to a corresponding mobile path block surface Bs. In addition, the vehicle control unit 15 of the autonomous mobile-based automated guided vehicle 10 applies a control signal for driving the automated guided vehicle 10 to the vehicle drive unit 13 to control the autonomous mobile-based automated guided vehicle 10 to travel at a reduced velocity corresponding to a corresponding reduction ratio.

In the meantime, the travel control step S30 may further include an obstacle detection control step S33 besides the travel basic control step S31. The obstacle detection control step S33 allows the vehicle sensor unit 11 to detect an obstacle that is present within the mobile path block Bi during the travel of the autonomous mobile-based automated guided vehicle and applies an obstacle control signal for responding to the obstacle. The obstacle detection control step S33 may be performed simultaneously and separately with the travel basic control step S31 through the thread control.

In the obstacle detection control step S33, the vehicle sensor unit 15 detects the obstacle within the mobile path block, applies an obstacle control signal for responding to the obstacle to the vehicle drive unit 13, and informs the autonomous mobile-based automated guided vehicle 10 of the current obstacle responding state of the autonomous mobile-based automated guided vehicle 10.

The obstacle detection control step S33 includes a path obstacle detection step S331, an obstacle position information conversion step S333, and a path obstacle determination step S335.

The path obstacle detection step S331 allows an obstacle detection signal of the vehicle sensor unit 11 to be transmitted to the vehicle control unit 15. More specifically, the vehicle sensor unit 11 establishes a communication with the system control unit 20 to transmit the current position of the mobile path block to the system control unit 20 and receive a travel control signal for controlling the travel state at the corresponding mobile path block from the system control unit 20 and simultaneously detect whether or not an obstacle is present around the mobile path of the autonomous mobile-based automated guided vehicle 10 at regular time intervals. The vehicle sensor unit 11 includes a distance sensor 11b. In this embodiment, the distance sensor 11b may be implemented as an ultrasonic sensor functioning to detect the inside of a predetermined region, a laser distance sensor for increasing the detection accuracy through the straightness of electromagnetic waves, or a combination thereof.

When predetermined detection information is acquired from the obstacle detection signal in the path obstacle detection step S331, i.e., a current obstacle is detected using the obstacle detection signal detected by the distance sensor 11b, the vehicle control unit 15 performs the obstacle position information conversion step S333 of converting the position information of the current obstacle based on a corresponding obstacle signal. The obstacle detection signal may include distance information and the orientation of the signal reflected and received from the obstacle. The current position information of the obstacle is calculated using the orientation and distance information obtained from the current position of the autonomous mobile-based automated guided vehicle 10 and the obstacle detection signal, and the system control unit 20 confirms whether or not the detected obstacle is present within the mobile path inputted and set through the system input unit 50.

After the obstacle position information conversion step S333 has been completed, the vehicle control unit 15 performs the path obstacle determination step S335. In the path obstacle determination step S335, the vehicle control unit 15 determines whether or not the obstacle position information calculated in the obstacle position information conversion step S333 is present within the mobile path where the mobile path block is formed. If the vehicle control unit 15 determines that the obstacle is present on the mobile path of the autonomous mobile-based automated guided vehicle 10, it applies a drive control signal to the vehicle drive unit 13 to stop the operation of the vehicle drive unit 13 or reduce the drive speed of the vehicle drive unit 13 so as to prevent a collision against the obstacle (S337), and transmits the execution state of the obstacle detection control step of the autonomous mobile-based automated guided vehicle 10 to the system control unit 20 through the vehicle communication unit 19 to apply the current state and the travel control signal to another autonomous mobile-based automated guided vehicle so that secondary rear-end collisions against the other autonomous mobile-based automated guided vehicle can be prevented.

In the above embodiments, the vehicle control unit 15 includes a structure in which an operation unit is integrated and takes an obstacle position conversion structure through the self-operation. Under circumstances, the vehicle control unit 15 may take a structure in which it transmits the obstacle detection signal to the system control unit 20 and the system control unit 20 transmits obstacle position conversion information to the vehicle control unit 15 after performing the obstacle position conversion by undergoing a predetermined operation procedure through the system operation unit 40. Preferably, the vehicle control unit 15 directly performs the obstacle position information conversion step in consideration of safety and response rapidity to the obstacle. As such, the obstacle position conversion information calculated directly by the vehicle control unit 15 is transmitted to the system control unit 20 so that the system control unit 20 can regulate the execution of the entire travel control process.

In the meantime, although a description has been made in the above embodiment centering on the mobile path setting and the travel control within the work environment of a single autonomous mobile-based automated guided vehicle, the present invention can be applied to the travel control during the travel of a plurality of autonomous mobile-based automated guided vehicle besides the single autonomous mobile-based automated guided vehicle.

Figure 24:
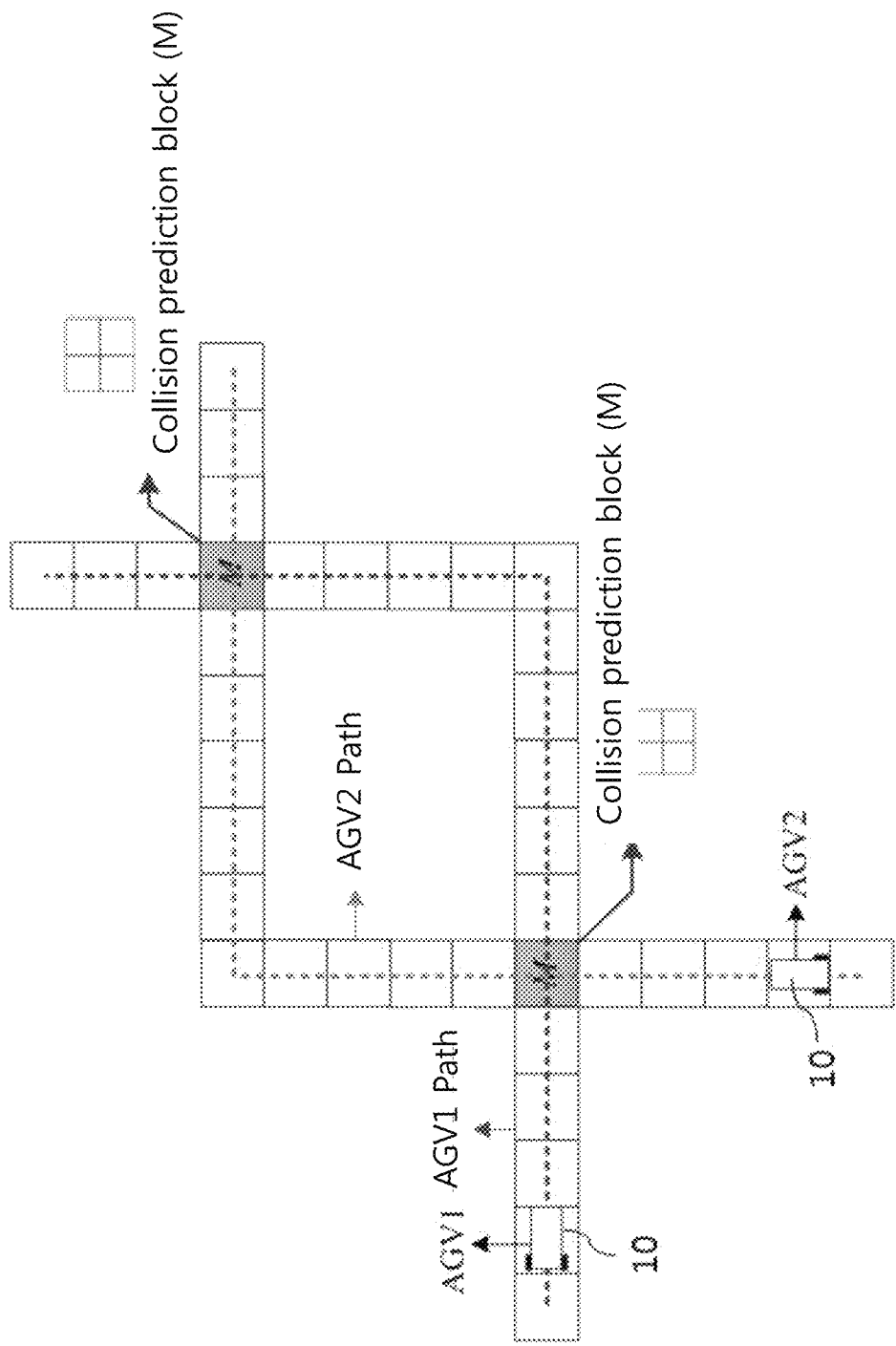
FIGS. 24 and 25 are state diagrams illustrating a collision prediction block on a mobile path block of an automated guided vehicle of an autonomous mobile-based automated guided vehicle system according to an embodiment of the present invention.
Figure 25:
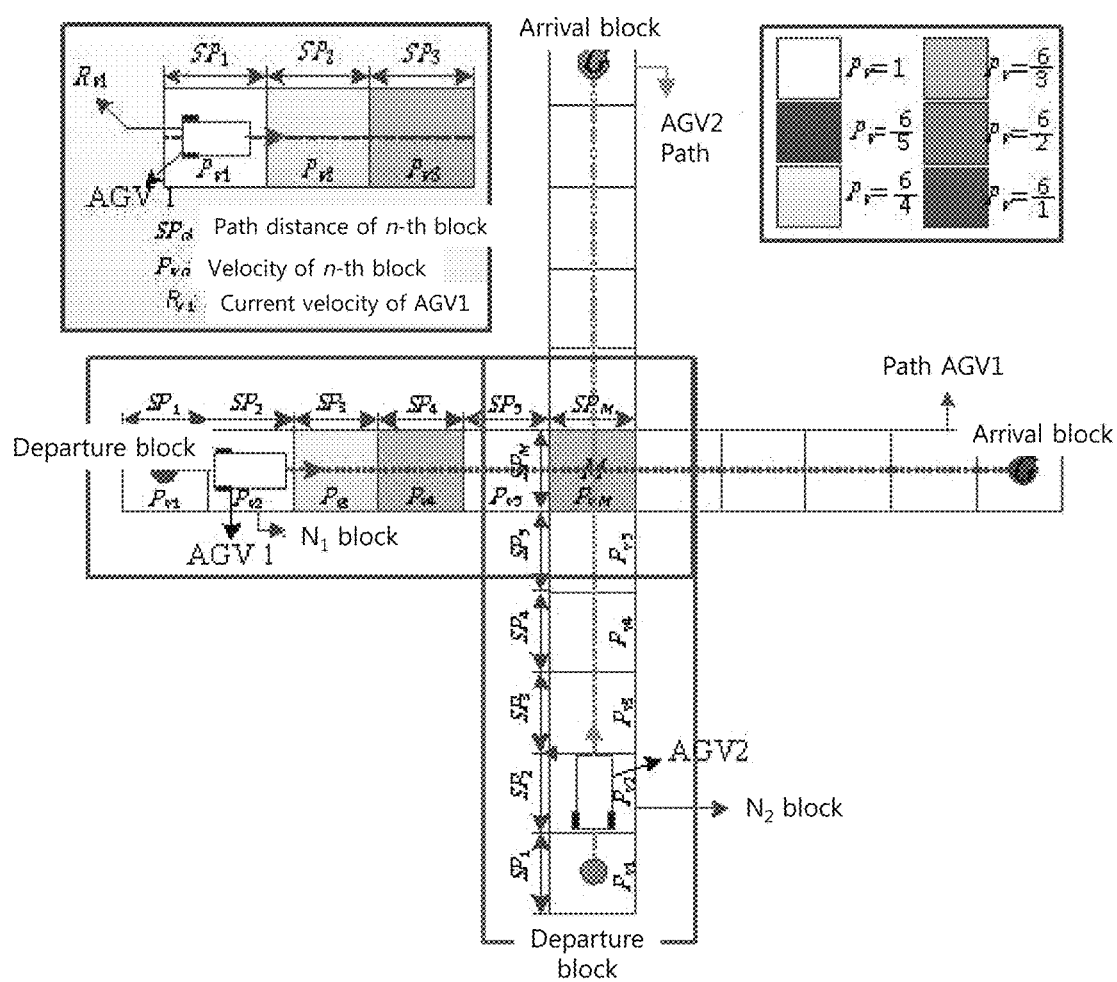

The plurality of autonomous mobile-based automated guided vehicles 10 transmits data including current position information to the system control unit 20 from the vehicle communication unit 19 through the system communication unit 21 and receives travel control information from the system control unit 20 so that travel information can be transmitted and received between the plurality of autonomous mobile-based automated guided vehicles and the system control unit. In this case, the transmitted and received travel information may include an actual travel velocity of each of the autonomous mobile-based automated guided vehicles 10. The plurality of autonomous mobile-based automated guided vehicles 10 includes two or more mobile paths that take a structure in which they intersect each other under a limited work environment. In such a structure, an intersection point of the path blocks of the mobile paths is formed, and a mobile path block forming the intersection point is defined as an intersection block, i.e., a collision prediction block M. In FIG. 24, there are diagrammatically shown two intersecting mobile paths and two autonomous mobile-based automated guided vehicles 10 that are movable on the respective mobile paths. Each mobile path has a "]" shape and thus includes two intersection points, and a mobile path block forming each of the intersection points is defined as a collision prediction block M for the mobile path.

In this embodiment, the intersection block, i.e., the collision prediction block M is configured in such a manner as to be formed as a mobile path block where a plurality of paths simply intersect each other, but the intersection block of the present invention is not limited thereto and may be configured in various manners. For example, in this embodiment, the intersection block, i.e., the collision prediction block M is configured to satisfy the relationship where the number of entry and exit directions of the autonomous mobile-based automated guided vehicle 10 at a corresponding mobile path block is equal to two multiplied by the number of the travel paths of the autonomous mobile-based automated guided vehicle, but another example of the intersection block of the present invention is configured to satisfy the relationship where the number of entry and exit directions of the autonomous mobile-based automated guided vehicle 10 at the corresponding mobile path block is less than twice the number of the travel paths of the autonomous mobile-based automated guided vehicle, i.e., the relationship where at least one of the entry and the exit equally overlaps with each other, and this intersection block is defined as a switch block in the present invention.

The switch block is a part of the intersection block, and whether a corresponding intersection block is maintained as a general mobile path block of a different non-intersection state or is formed as a mobile path block where a plurality of autonomous mobile-based automated guided vehicles travels in a preset switch block control manner for the entry or exit of the plurality of autonomous mobile-based automated guided vehicles can be switched by a switch-on mode/switch-off mode, depending on whether or not to permit the travel of the plurality of autonomous mobile-based automated guided vehicles in a preset mode switching control manner for the entry or exit of the plurality of autonomous mobile-based automated guided vehicles.

Figure 46:
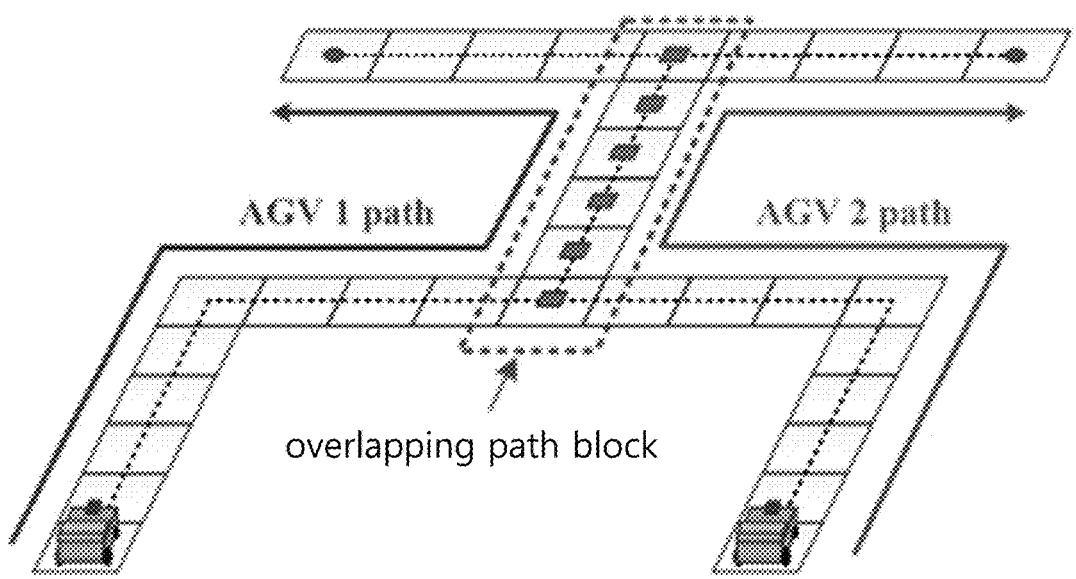
FIGS. 46 to 64 are state diagrams illustrating a process of examples of a switch block control in a control method of an autonomous mobile-based automated guided vehicle system according to an embodiment of the present invention.
Figure 47:
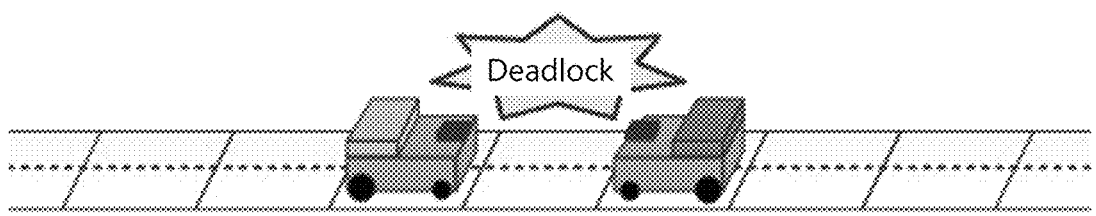

More specifically, when a plurality of autonomous mobile-based automated guided vehicles (AGVs) has one or more intersecting or overlapping mobile path blocks, the multiple AGV control can be performed. In the present invention, a switch block as a novel concept is adopted, and a deadlock is prevented and a stable and smooth travel is performed through the switch block control. The switch block is a method for overcoming a deadlock when two different autonomous mobile-based automated guided vehicles (AGVs) travel since two or more intersection blocks are present on a mobile path block to form an overlapping path block as shown in FIG. 46. As shown in FIG. 47, in the case where different departure blocks are formed as one arrival block, a situation is prevented in which two different autonomous mobile-based automated guided vehicles may be plunged into a deadlock on the overlapping mobile path block and an efficient control is possible. The switch block is not determined by the user depending on the situation, but the AGV changes the state by actively grasping the situation in consideration of the relationship between AGVs.

Figure 48:
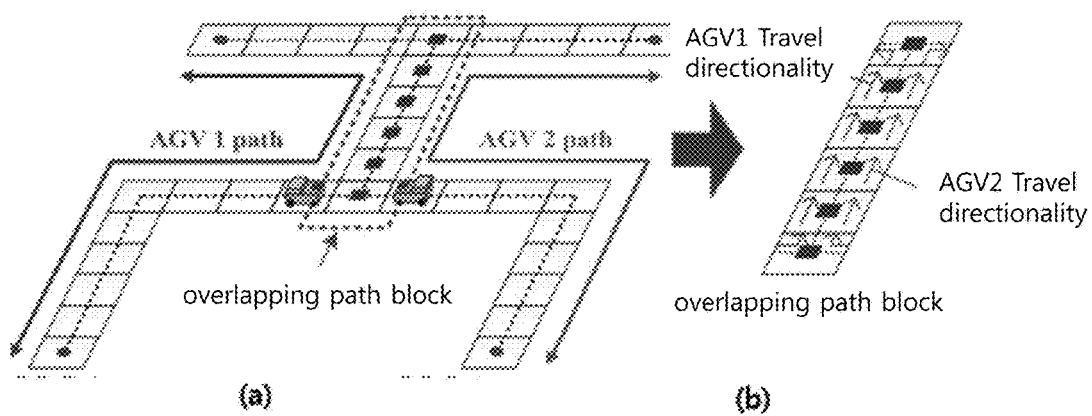
Figure 49:
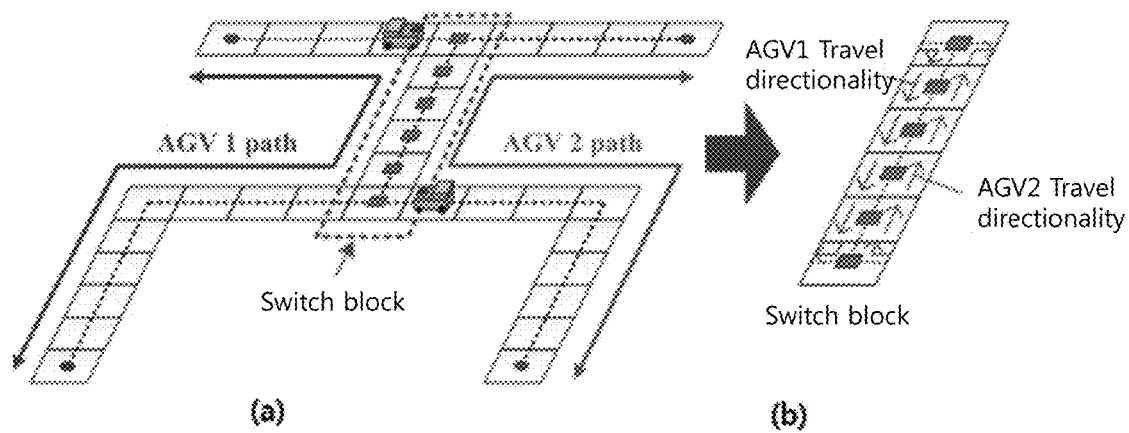
Figure 50:
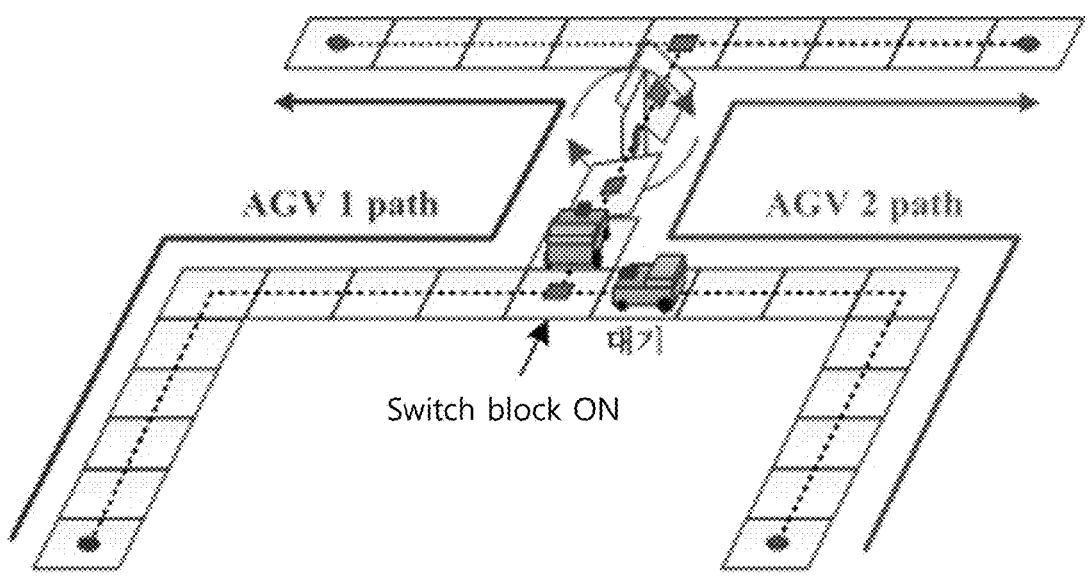

In other words, the switch block means two or more overlapping mobile path blocks, and is formed as information added to existing path blocks in the arrangement process of the mobile path blocks. That is, the switch block is information included in the path block and is used to prevent two AGVs on the travel path from being plunged into a deadlock. The switch block functions to determine the travel directionality of two AGVs on the switch block and turn ON/OFF the switch by making a distinction between the case where the travel directionalities of the two AGVs are opposite to each other and the case where the travel directionalities of the two AGVs are not opposite to each other. The travel of the autonomous mobile-based automated guided vehicle (AGV) is differently controlled depending on the ON/OFF of the switch block. In the case where the switch mode on the switch block is OFF, when two AGVs travel in the same direction on the switch block as shown in FIG. 48, either AGV can travel on the switch block. On the contrary, the case where the switch mode on the switch block is ON is the case where opposite travel directionalities of two AGVs are included in any one mobile path block in the switch block as shown in FIG. 49. In this case, only an AGV having a higher travel priority can travel on the switch block. In the case where the switch mode on the switch block is OFF, a multiple AGV control is performed through the time control-based deceleration control for prevention of vehicle collision as described above. In this manner, a travel for preventing a deadlock phenomenon is carried out while the ON/OF of the switch state of the switch block is repeated as shown in FIG. 49 after the determination of the travel directionalities of two AGVs. A switch block control process will be described hereinafter in detail.

The travel control step S30 of the present invention may further include a collision control step S35. The travel control step S30 allows the system control unit 20 to transmit a travel control signal to each of the autonomous mobile-based automated guided vehicle 10 to control the autonomous mobile-based automated guided vehicle 10 to prevent a vehicle collision between the autonomous mobile-based automated guided vehicles 10 using the travel information of the autonomous mobile-based automated guided vehicle 10, which is received through a communication between the system control unit 20 and the vehicle communication unit 19 of the autonomous mobile-based automated guided vehicle 10. The collision control step S35 may be performed simultaneously and separately with the travel basic control step S31 or the obstacle detection control step S33 through the thread control.

The collision control step S35 includes a travel information collection step S351, a collision determination step S353, a detour path presence confirmation step S355, a detouring determination step S357, and a collision mode execution step S359.

In the travel information collection step S351, the system control unit 20 collects travel information through a communication with the autonomous mobile-based automated guided vehicle 10.

The system control unit 20 collects the travel information including the current position and the actual travel velocity of a plurality of autonomous mobile-based automated guided vehicles 10 from the plurality of autonomous mobile-based automated guided vehicles 10 through the system communication unit 21, and stores the collected travel information in the system storage unit 30.

After the travel information collection step S351 has been completed, the system control unit 20 performs the collision determination step S353. In the collision determination step S353, the system control unit 20 performs the collision determination step S353. In the collision determination step S353, the system control unit 20 determines whether or not the autonomous mobile-based automated guided vehicles 10 collide with each other at the collision prediction block as an intersection point of the mobile path block based on the travel information and the mobile path information inputted through the system input unit 50.

More specifically, the collision determination step S353 includes a prediction arrival time calculation step S3531, a collision prediction reference time calculation step S3533, and a collision prediction determination step S3535. In the prediction arrival time calculation step S3531, the system control unit 20 calculates a prediction arrival time difference $(Col_{t1}-Col_{t2})$ from a prediction arrival time $(Col_{t1}, Col_{t2})$ of the autonomous mobile-based automated guided vehicle 10 to a collision prediction block M through the system operation unit 40. As shown in FIG. 24, when it is assumed that two autonomous mobile-based automated guided vehicles 10 move on a horizontally arranged mobile path (AGV 1 path) and a vertically arranged mobile path (AGV 2 path), respectively, and the prediction time spent for the autonomous mobile-based automated guided vehicles 10 to move to a collision prediction block M as an intersection point of the mobile paths from a mobile path block as the current position of each of the autonomous mobile-based automated guided vehicles 10 is a collision prediction time $(Col_t; Col_{t1}, Col_{t2})$, the collision prediction time $(Col_t; Col_{t1}, Col_{t2})$ can be calculated from the following equations:

$$Col_{t1} = \sum_{n=N_1}^{M} \frac{SP_n}{R_{v1}} \cdot P_{vn}$$

$$Col_{t2} = \sum_{n=N_2}^{M} \frac{SP_n}{R_{v2}} \cdot P_{vn}$$

where M denotes a collision prediction block shown in FIG. 24, $N_1$ denotes a mobile path block where an AGV 1 is positioned, and N2 denotes a mobile path block where an AGV 2 is positioned, $Col_{t1}$ means the time spent for the AGV 1 to travel from the mobile path block $N_1$ where it is positioned to the collision prediction block M, $Col_{t2}$ means the time spent for the AGV 2 to travel from the mobile path block $N_2$ where it is positioned to the collision prediction block M, $R_{v1}$ and $R_{v2}$ denote the current velocities of AGV 1 and AGV 2, respectively, $S_{Pn}$ denotes distance information of an $n^{th}$ mobile path block, i.e., the movement distance of the $n^{th}$ corresponding mobile path block, and $P_{vn}$ denotes a velocity factor which a mobile path block surface of a mobile path block represents, i.e., a reduction ratio.

Figure 26:
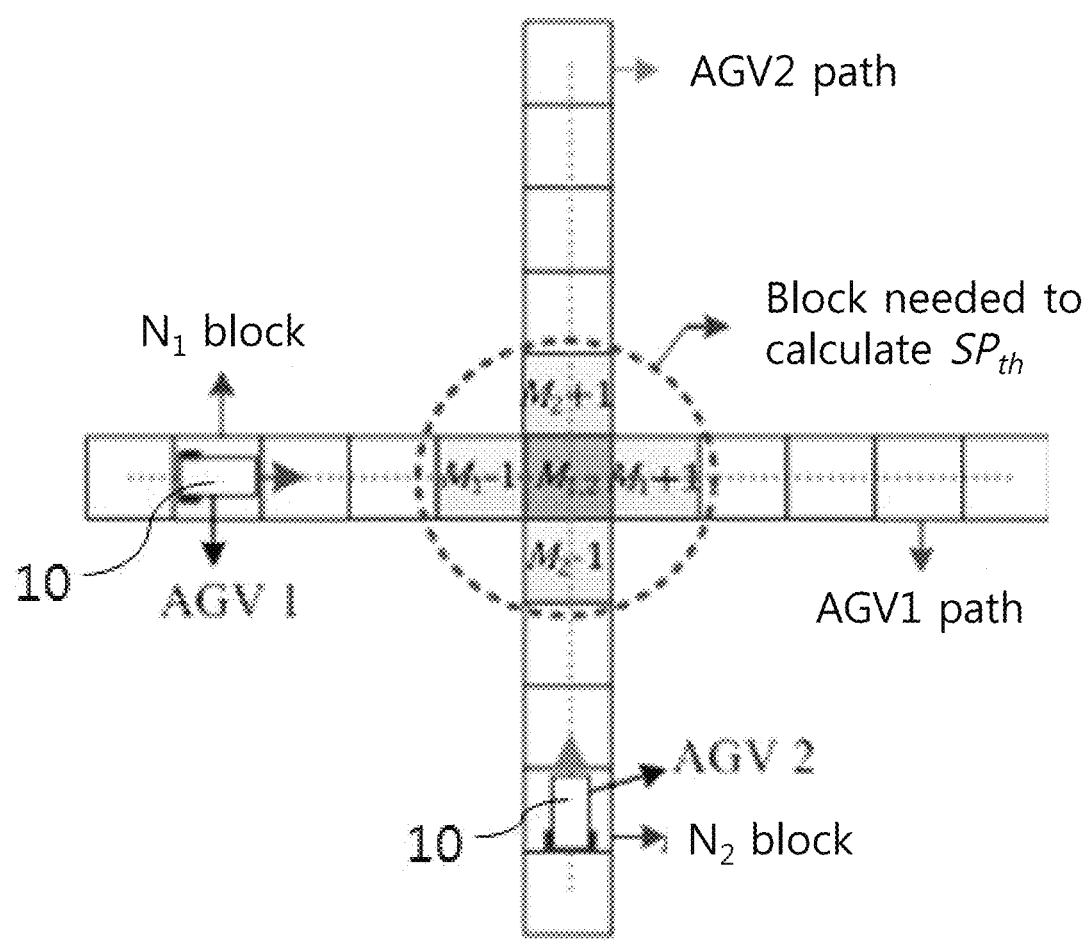
FIGS. 26 and 27 are state diagrams illustrating a mobile path input process using a mobile path block of an automated guided vehicle of an autonomous mobile-based automated guided vehicle system according to an embodiment of the present invention.
Figure 27:
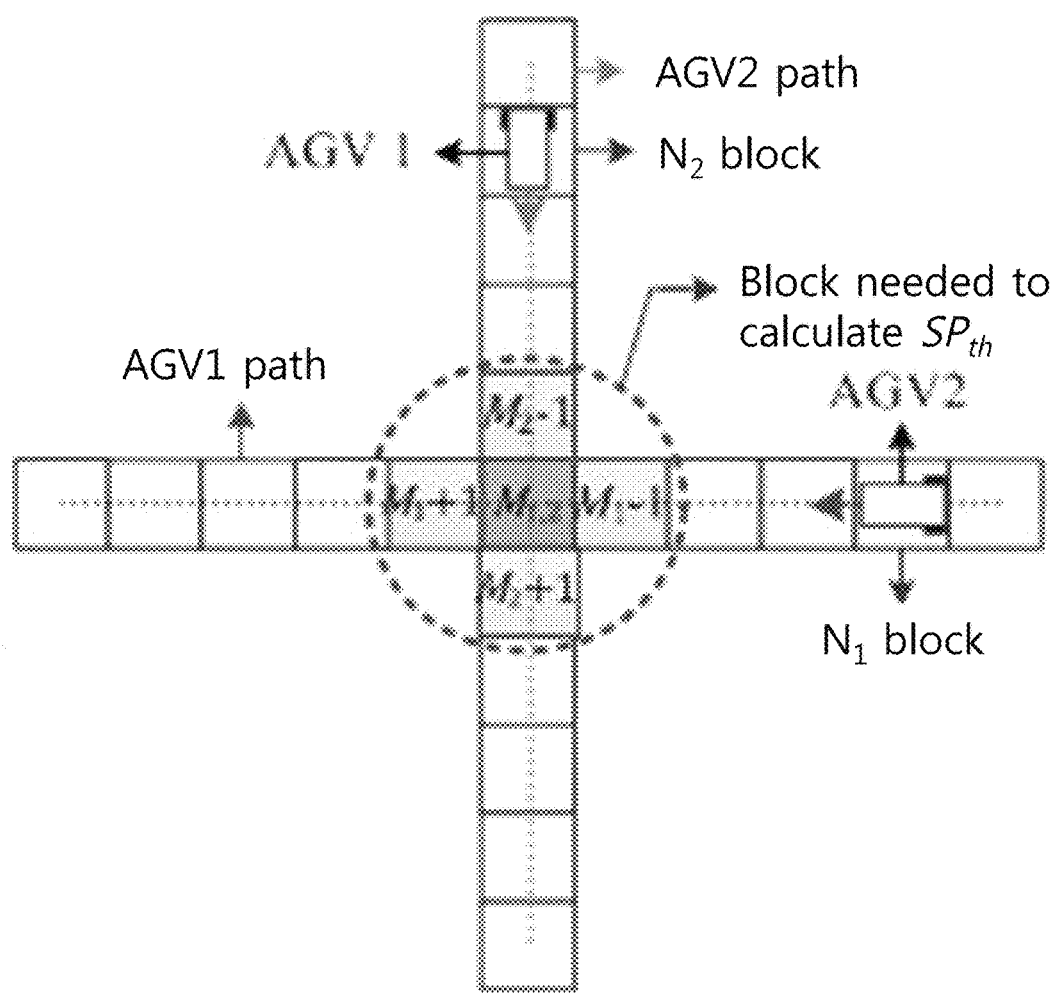

In the collision prediction reference time calculation step S3533, the system control unit 20 applies an operation control signal to the system operation unit 40 to allow the system operation unit 40 to calculate a collision prediction reference time $SP_{th}$ as a threshold value for determining that the autonomous mobile-based automated guided vehicles 10 are predicted to collide with each other at a collision prediction block M. In other words, the collision prediction reference time $SP_{th}$ represents a reference threshold value for determining whether or not there is a collision between the autonomous mobile-based automated guided vehicles 10 when considering two collision times spent for the autonomous mobile-based automated guided vehicles 10 to travel to the collision prediction block M from the mobile path blocks where the autonomous mobile-based automated guided vehicles 10 are currently positioned along the respective mobile paths (see FIGS. 26 and 27).

$$SP_{th} = \max \begin{pmatrix} \frac{SP_{M_{1,2}}}{R_{v1}} \cdot P_{vM_1} + \frac{SP_{(M_1-1)}}{R_{v1}} \cdot P_{v(M_1-1)} + \frac{SP_{(M_1+1)}}{R_{v1}} \cdot P_{v(M_1+1)} \\ \frac{SP_{M_{1,2}}}{R_{v2}} \cdot P_{vM_2} + \frac{SP_{(M_2-1)}}{R_{v2}} \cdot P_{v(M_2-1)} + \frac{SP_{(M_2+1)}}{R_{v2}} \cdot P_{v(M_2+1)} \end{pmatrix}$$

Thereafter, in the collision prediction determination step S3535, the system control unit 20 determines whether or not a collision between the autonomous mobile-based automated guided vehicles 10 is predicted at the collision prediction block M using the prediction arrival time difference ($Col_{t1}-Col_{t2}$) calculated in the prediction arrival time calculation step S3531 and the collision prediction reference time $SP_{th}$ calculated in the collision prediction reference time calculation step S3533.

In other words, the system control unit 20 compares the prediction arrival time difference ($Col_{t1}-Col_{t2}$) with the collision prediction reference time $SP_{th}$ as follows:

$$|Col_{t1}-Col_{t2}| < SP_{th}$$

The system control unit 20 determines that a collision will occur between the autonomous mobile-based automated guided vehicles 10 at the collision prediction block (M; M1, M2) if the prediction arrival time difference ($Col_{t1}-Col_{t2}$) is less than the collision prediction reference time $SP_{th}$, and the control program proceeds to step S355. On the contrary, the system control unit 20 determines that a collision will not occur between the autonomous mobile-based automated guided vehicles 10 at the collision prediction block (M; M1, M2) if the prediction arrival time difference ($Col_{t1}-Col_{t2}$) is greater than or equal to the collision prediction reference time $SP_{th}$, and the control program proceeds to a normal state control step, i.e., the travel basic control step S31.

If it is determined in the collision prediction determination step S3535 that a collision will occur between the autonomous mobile-based automated guided vehicles 10 at the collision prediction block (M; M1, M2), the system control unit 20 performs the detour path presence confirmation step S355 to confirm whether or not a detour path is present.

Figure 28:
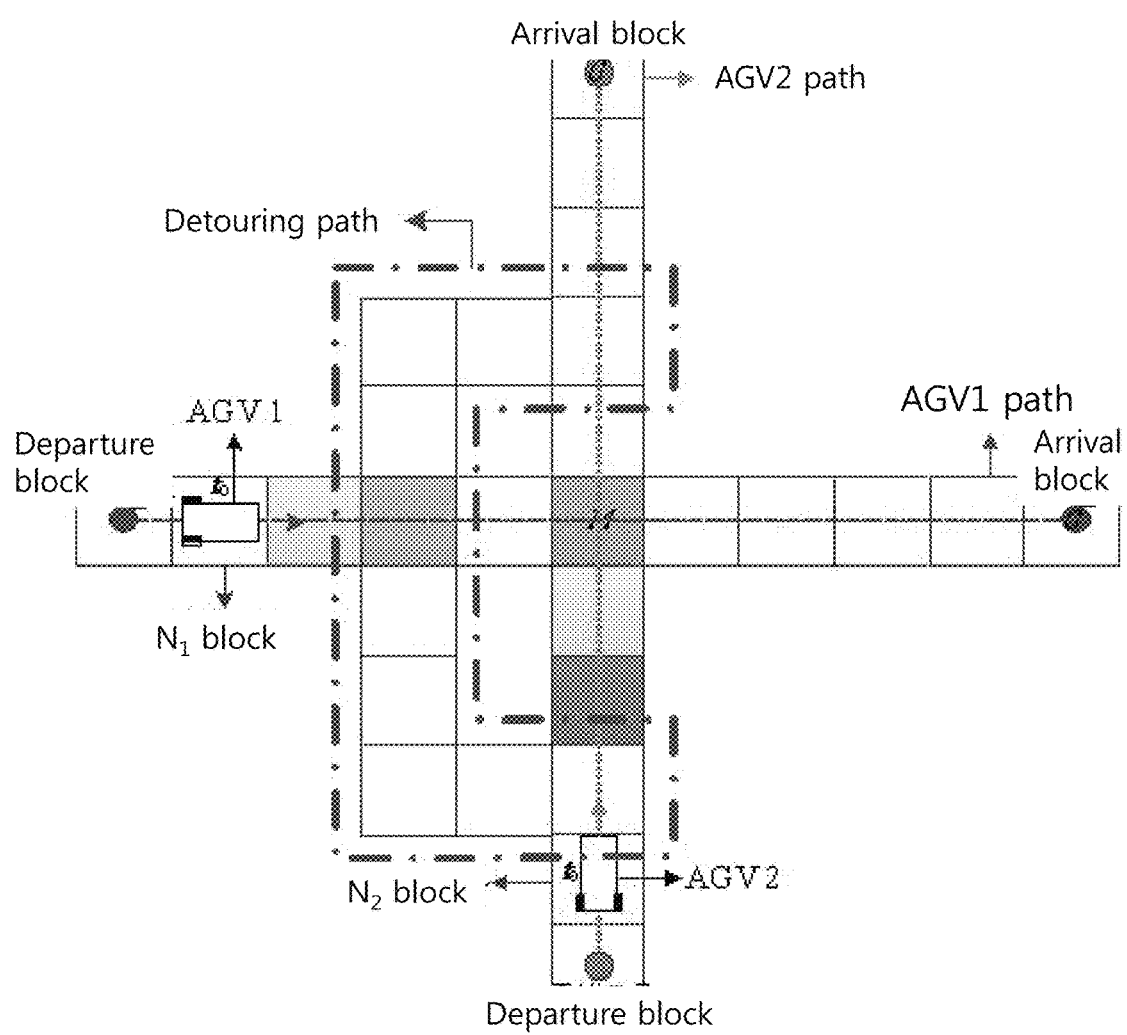
FIG. 28 is a state diagram illustrating a detour path traveling process using a mobile path block of an automated guided vehicle of an autonomous mobile-based automated guided vehicle system according to an embodiment of the present invention.

In the detour path presence confirmation step S355, the system control unit 20 confirms whether or not a detour path of the autonomous mobile-based automated guided vehicles 10 is present based on the travel information. The travel information includes a mobile path forming the movement of the autonomous mobile-based automated guided vehicles 10. The system control unit 20 confirms the presence of a detour path through which the autonomous mobile-based automated guided vehicles 10 pass without passing through the collision prediction block (Bcol; M) in a progress order of the mobile path block from a departure point to an end point using the travel information of the mobile path (see FIG. 28). In other words, in the case where a collision prediction block M is disposed between a mobile path block as a departure point and another mobile path block as an arrival point, it is found that mobile path blocks are branched off forwards and backwards with the collision prediction block M interposed therebetween on any one mobile path, and the branched corresponding mobile path blocks are connected by other mobile path blocks besides the mobile path blocks on the mobile path. If another detour mobile path around which the autonomous mobile-based automated guided vehicles 10 detour at the collision prediction block (Bcol, M), the system control unit 20 derives a corresponding detour mobile path and generates a detour path presence flag signal indicating the presence of the detour mobile path through the detour path presence confirmation step S355. If the detour mobile path is not confirmed, the system control unit 20 generates a detour path absence flag signal indicating the absence of a separate detour mobile path. In addition, in this embodiment, in the detour path presence confirmation step, the system control unit 20 confirms a travel priority from data previously stored in the system storage unit 30 to determine the travel priorities of two autonomous mobile-based automated guided vehicles 10 positioned on a mobile path including an intersection point, and performs a process of checking whether or not there is a detour path for a mobile path having a lower travel priority. Various modifications are possible, such as taking a method of confirming all the detour paths and finding the shortest time depending on the situations.

In the detouring determination step S357, the system control unit 20 determines whether or not there is the detour path confirmed in the detour path presence confirmation step and the autonomous mobile-based automated guided vehicle 10 is allowed to detour. In the detour path presence confirmation step S355, a confirmed detour path presence/absence flag signal can be used depending on whether or not there is the detour path.

More specifically, the detouring determination step S357 includes a detour path presence determination step S3571, a virtual travel time confirmation step S3573, and a detouring decision step S3575. In the detour path presence determination step S3571, the system control unit 20 determines whether or not there is a detour path depending on an execution result in the detour path presence confirmation step S355. In this case, the system control unit 20 may determine whether or not there is the detour path through the detour path presence/absence flag calculated in the detour path presence determination step S3571. In other words, the system control unit 20 may determine whether or not a detour path presence flag is 0, but various modifications are possible, such as determining whether or not the number of the detour paths is 0.

If it is determines in step S3571 that there currently is a detour path for the collision prediction block of a plurality of mobile paths, the system control unit 20 performs a step of re-confirming whether or not a detour travel is preferable before the control program proceeds to step the collision mode execution step S359. In other words, the control program proceeds to the virtual travel time confirmation step S3573 where the system control unit 20 confirms a virtual velocity control travel time $TP_t$ and a virtual detour control travel time $DP_t$. The virtual velocity control travel time $TP_t$ represents a virtual time spent for the autonomous mobile-based automated guided vehicle 10 to travel through the reduction of the travel velocity at a preset reduction ratio on a scheduled path of the autonomous mobile-based automated guided vehicle 10, and the virtual detour control travel time $DP_t$ represents a virtual time spent for the autonomous mobile-based automated guided vehicle 10 to travel on a detour path of the autonomous mobile-based automated guided vehicle 10.

The virtual velocity control travel time $TP_t$ and the virtual detour control travel time $DP_t$ are calculated and found as follows:

$$TP_t = \sum_{n=N_2}^{G} \frac{SP_G}{R_v} \cdot P_{vG}$$

$$DP_{t1} = \sum_{n=N}^{G} \frac{SP_G}{R_v} \cdot P_{vG}$$

where G denotes a mobile path block of an arrival point of a first mobile path (vertically arranged) which is formed to intersect the horizontally arranged mobile path and includes the detour path. The virtual velocity control travel time $TP_t$ denotes the time spent for the autonomous mobile-based automated guided vehicle 10 to move to the mobile path block G as a final arrival point from a mobile path block where the autonomous mobile-based automated guided vehicle 10 is currently positioned when the autonomous mobile-based automated guided vehicle 10 moves along an originally set mobile path without moving along the detour path, and the virtual detour control travel time $DP_t$ denotes the time spent for the autonomous mobile-based automated guided vehicle 10 to move to the mobile path block G as a final end point from the mobile path block where the autonomous mobile-based automated guided vehicle 10 is currently positioned when the autonomous mobile-based automated guided vehicle 10 moves along the detour path.

The above equations of calculating the virtual velocity control travel time $TP_t$ and the virtual detour control travel time $DP_t$ will be described hereinafter. In all both cases, the time spent for the autonomous mobile-based automated guided vehicle 10 to move to the mobile path block G as the end point from the current position of the autonomous mobile-based automated guided vehicle 10 is calculated, but the virtual velocity control travel time $TP_t$ is the spent time when the autonomous mobile-based automated guided vehicle 10 travels in a deceleration state along the original mobile path and the virtual detour control travel time $DP_t$ is the spent time when the autonomous mobile-based automated guided vehicle 10 detours while maintaining a velocity set to the mobile path block.

Thereafter, the system control unit 20 performs the detouring decision step S3575 of deciding whether or not the autonomous mobile-based automated guided vehicle 10 detours through a comparison between the virtual velocity control travel time $TP_t$ and the virtual detour control travel time $DP_t$.

$$TP_t + SP_{th} < DP_t$$

The system control unit 20 decides whether or not the autonomous mobile-based automated guided vehicle 10 detours along the detour path in such a manner as to select the case where the shortest time is spent from the above equation using the virtual velocity control travel time $TP_t$, the virtual detour control travel time $DP_t$, and the collision prediction reference time $SP_{th}$. In other words, if a difference between the virtual detour control travel time $DP_t$ and the virtual velocity control travel time $TP_t$ is greater than the collision prediction reference time $SP_{th}$, the system control unit 20 determines that the time spent for the autonomous mobile-based automated guided vehicle 10 to detour is longer than the time for the autonomous mobile-based automated guided vehicle 10 to travel in the deceleration state at a velocity control mode, and the control program proceeds to the collision mode execution step S359 which will be described later, where the system control unit 20 performs a velocity control mode execution step S3591.

On the contrary, if the difference between the virtual detour control travel time $DP_t$ and the virtual velocity control travel time $TP_t$ is smaller than or equal to the collision prediction reference time $SP_{th}$, the system control unit 20 determines that the time spent for the autonomous mobile-based automated guided vehicle 10 to detour is shorter than the time for the autonomous mobile-based automated guided vehicle 10 to travel in the deceleration state at the velocity control mode and thus the shortest time is spent, and the control program proceeds to the collision mode execution step S359 which will be described later, where the system control unit 20 performs a detouring mode execution step S3593.

In addition, if the system control unit 20 determines in step S3571 that there is no detour path for the collision prediction block of a plurality of mobile paths, the control program proceeds to step S359 where the system control unit 20 determines that a mode to be executed is the velocity control mode and performs the velocity control mode execution step S3591.

In this embodiment, steps S355 and S357 may further include a step of, if a plurality of detour paths is present, calculating and comparing the virtual velocity control travel time and the virtual detour control travel time for each corresponding detour path and selecting a path having the shortest time as a detour path.

Figure 29:
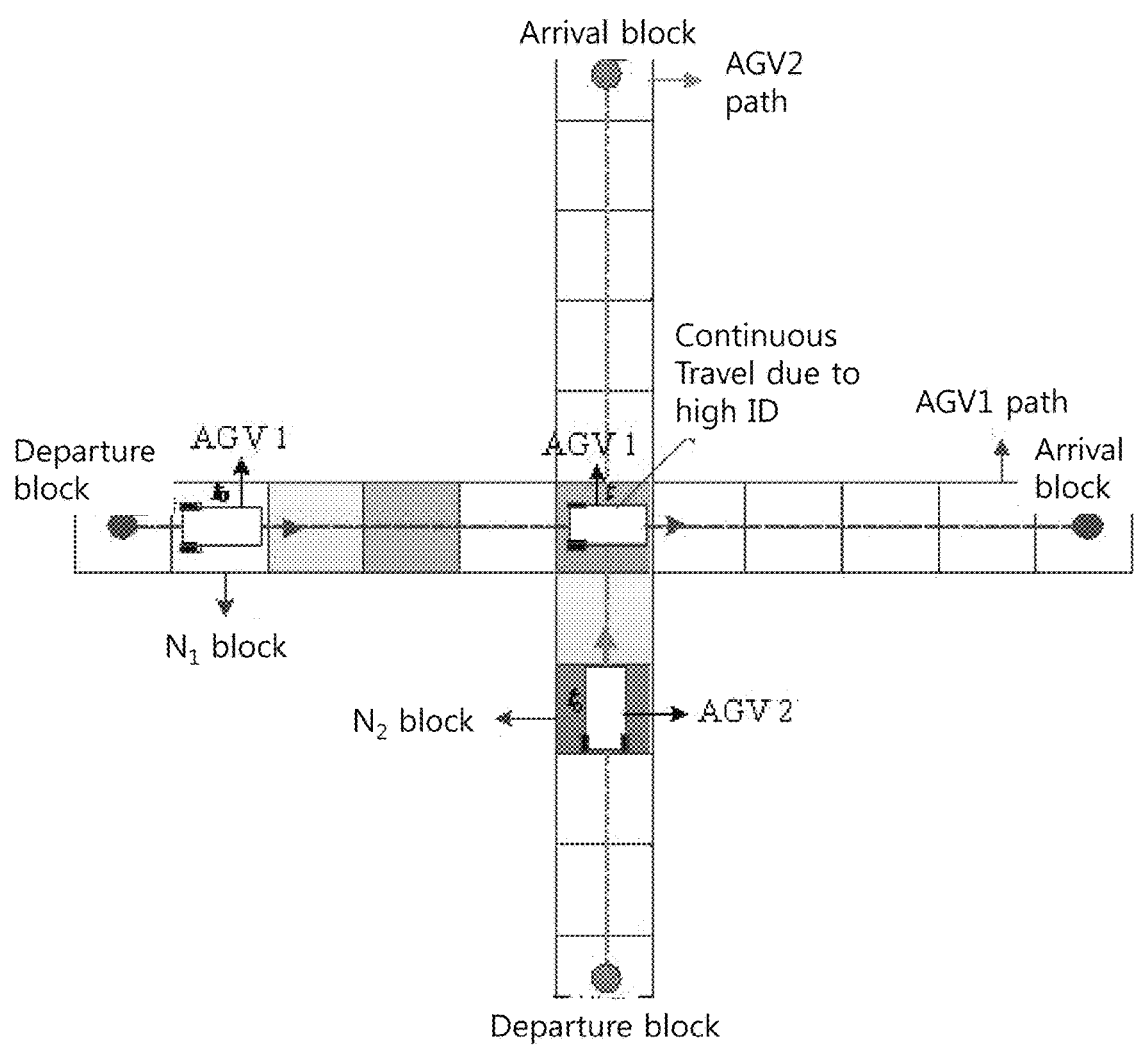
FIGS. 29 and 30 are state diagrams illustrating a velocity control mode execution step using a mobile path block of an automated guided vehicle of an autonomous mobile-based automated guided vehicle system according to an embodiment of the present invention.
Figure 30:
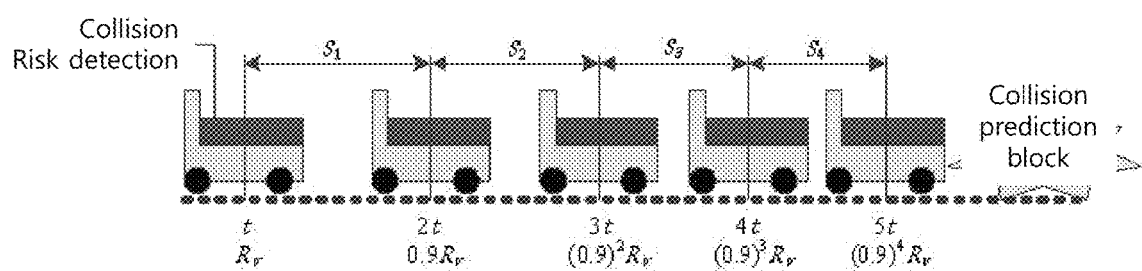

After the detouring determination step S357 has been completed, the system control unit 20 performs the collision mode execution step S359 where the system control unit 20 selects and controls a corresponding mode of the detouring mode execution step S3593 in which the autonomous mobile-based automated guided vehicle 10 travels along the detour path and the velocity control mode execution step S3591 in which the travel velocity of the autonomous mobile-based automated guided vehicle 10 is controlled based on a result of the determination in the detouring determination step S357. In the velocity control mode execution step S3591, the travel velocity of any one autonomous mobile-based automated guided vehicle 10 is reduced to prevent a collision between the two autonomous mobile-based automated guided vehicles 10. The velocity control mode execution step S3591 includes a velocity control priority confirmation step 35911 and a velocity reduction coefficient assignment step 35913. In the velocity control priority confirmation step S53911, confirms and selects the velocity reduction for the autonomous mobile-based automated guided vehicle 10 on a mobile path along which an autonomous mobile-based automated guided vehicle having a lower travel priority moves using a travel priority of the autonomous mobile-based automated guided vehicle 10, which is included in preset data that is previously stored in the system storage unit 30 (see FIGS. 29, 30 and 41).

In addition, the system control unit 20 performs the velocity reduction coefficient assignment step S35913 where the system control unit 20 assigns a velocity reduction coefficient for mobile path blocks extending from a current mobile path block on a current mobile path along which the confirmed and selected autonomous mobile-based automated guided vehicle moves to a collision prediction block or a mobile path block for which collision prediction is released, and reduces the travel velocity of the autonomous mobile-based automated guided vehicle 10 having a lower travel priority to thereby prevent a vehicle collision at the collision prediction block. In other words, in the case where an autonomous mobile-based automated guided vehicle indicated by AGV 1 has a higher priority, a corresponding vehicle travels without stopping on the mobile path bock. In this case, an autonomous mobile-based automated guided vehicle indicated by AGV 2 has a lower priority and thus the system control unit 20 performs the velocity reduction coefficient assignment step S35913 where the system control unit controls the autonomous mobile-based automated guided vehicle having the lower priority to travel in a deceleration state so that the AGV 2 can travel at a preset reduction ratio, for example, in a state in which its velocity is reduced by 10% from its current velocity, i.e., a velocity reduction coefficient of 0.9 is assigned.

$$R_v = R_v \times 0.9$$

The magnitude of such as velocity reduction coefficient can select a value which prevents collision and instability due to a sudden change in the velocity and minimize collision to achieve a safe travel. Such a deceleration travel as the movement process of the autonomous mobile-based automated guided vehicle is a method for allowing the autonomous mobile-based automated guided vehicle to continuously travel without stopping until a collision is predicted, and continues to be performed until no collision is predicted or the autonomous mobile-based automated guided vehicle arrives a collision prediction block (see FIG. 30).

Further, in the detouring mode execution step S3593, the system control unit 20 controls the corresponding autonomous mobile-based automated guided vehicle 10 to move along the detour path confirmed and selected in steps S355 and S357.

The system control unit 20 performs the velocity control mode execution step S3591 or the detouring mode execution step S3593 after the completion of the collision mode execution step S359, and the control programs returns to the typical travel control step, i.e., the travel basic control step S31 after the autonomous mobile-based automated guided vehicle 10 has moved to a collision prediction block or a mobile path block for which collision prediction is released, or to a mobile path block connected through the detour path.

Figure 31:
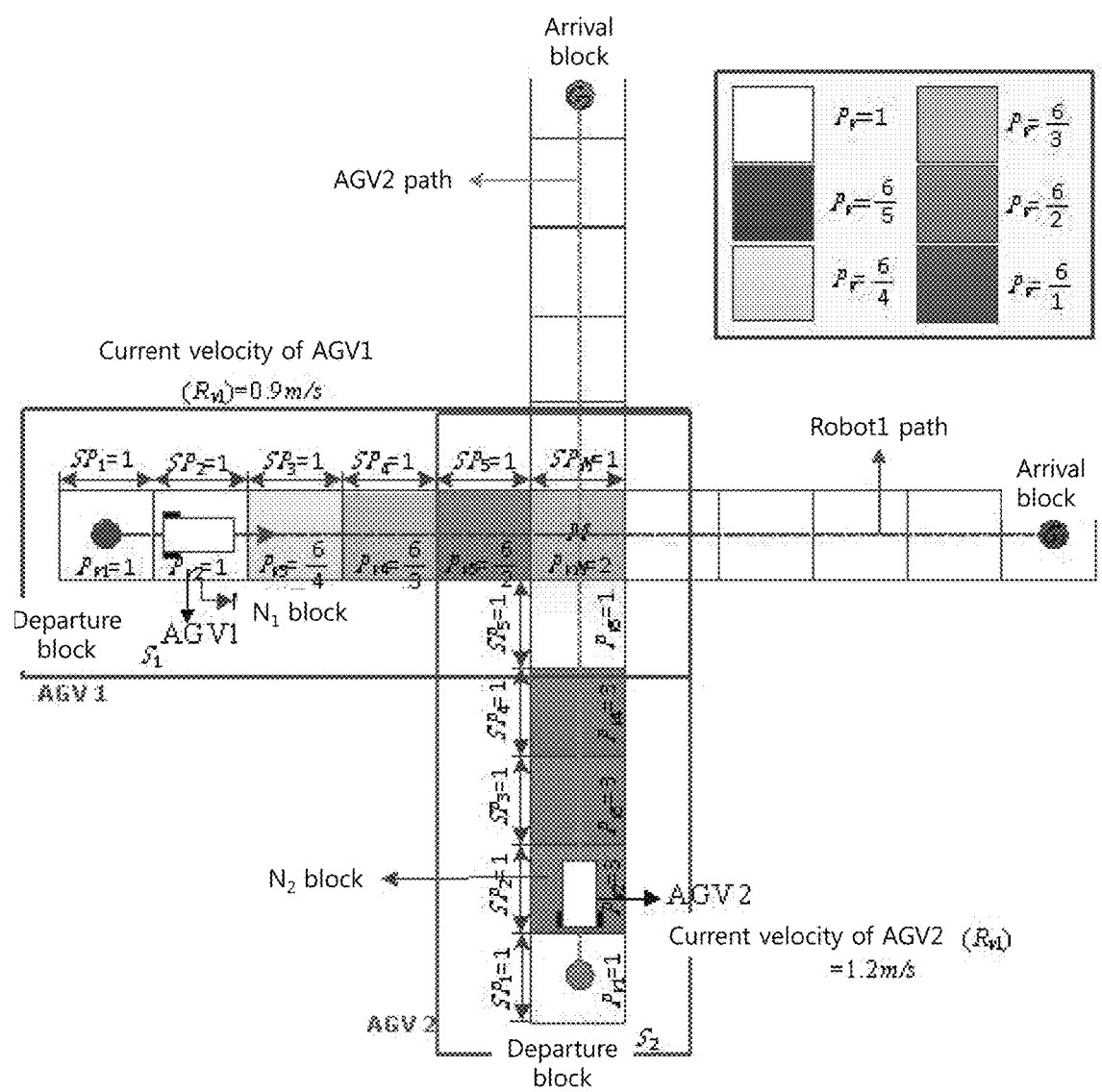
FIGS. 31 to 34 are state diagrams illustrating an execution process such as a detouring mode execution step using a mobile path block of an automated guided vehicle of an autonomous mobile-based automated guided vehicle system according to an embodiment of the present invention.

An example of the travel control step S30 including the collision control step S35 shown in FIG. 31. In the travel control step S30, it is determined that two autonomous mobile-based automated guided vehicles 10, i.e., AGV 1 and AGV 2 collide with each other at a collision prediction block M, and no detour path is present.

The autonomous mobile-based automated guided vehicle AGV 1 travels toward a mobile path block G1 as an arrival point at a mobile path block S1 as a departure point, and the autonomous mobile-based automated guided vehicle AGV 2 travels toward travels toward a mobile path block G2 as an arrival point at a mobile path block S2 as a departure point. In this case, the mobile paths forms the collision prediction block M.

A prediction arrival time $Col_t$ spent for AGV 1 and AGV 2 to travel to the collision prediction block from a current AGV position is calculated to determine whether or not AGV 1 and AGV 2 collide with each other at the collision prediction block M (S3531). When AGV 1 travels at 0.9 m/s, and AGV 2 travels at 1.2 m/s, the prediction arrival times of AGV 1 and AGV 2 are $Col_{t1}$ and $Col_{t2}$, respectively, and are calculated as follows:

$$Col_{t1} = \sum_{n=N_1}^{M} \frac{SP_n}{R_{v1}} \cdot P_{vn} = \frac{1}{0.9} \cdot 1 + \frac{1}{0.9} \cdot \frac{6}{4} + \frac{1}{0.9} \cdot 2 + \frac{1}{0.9} \cdot 3 + \frac{1}{0.9} \cdot 2 = 10.56$$

$$Col_{t2} = \sum_{n=N_2}^{M} \frac{SP_n}{R_{v2}} \cdot P_{vn} = \frac{1}{1.2} \cdot 3 + \frac{1}{1.2} \cdot 3 + \frac{1}{1.2} \cdot 3 + \frac{1}{1.2} \cdot 1 + \frac{1}{1.2} \cdot 2 = 10.0.$$

In addition, a prediction arrival time difference ($Col_{t1} - Col_{t2}$) is calculated from the prediction arrival times $Col_{t1}$ and $Col_{t2}$, and a collision prediction reference time $SP_{th}$ is calculated as follows in the collision prediction reference time calculation step S3533:

$$SP_{th} = \max\begin{pmatrix} \frac{SP_{M_1,2}}{R_{v1}} \cdot P_{vM_1} + \frac{SP_{(M_1-1)}}{R_{v1}} \cdot P_{v(M_1-1)} + \frac{SP_{(M_1+1)}}{R_{v1}} \cdot P_{v(M_1+1)}, \\ \frac{SP_{M_1,2}}{R_{v2}} \cdot P_{vM_2} + \frac{SP_{(M_2-1)}}{R_{v2}} \cdot P_{v(M_2-1)} + \frac{SP_{(M_2+1)}}{R_{v2}} \cdot P_{v(M_2+1)} \end{pmatrix}$$

$$= \max\left(\frac{1}{0.9} \cdot 3 + \frac{1}{0.9} \cdot 2 + \frac{1}{0.9} \cdot 1, \frac{1}{1.2} \cdot 1 + \frac{1}{1.2} \cdot 2 + \frac{1}{1.2} \cdot 1\right) = 6.67$$

Thereafter, the system control unit 20 compares the prediction arrival time difference ($Col_{t1} - Col_{t2}$) with the collision prediction reference time $SP_{th}$ as follows (S3535):

$$|10.56 - 10.0| < (SP_{th} = 6.67)$$

The system control unit 20 determines at step S3535 that AGV 1 and AGV 2 are predicted to collide with each other, and performs the detour path presence confirmation step S355, the detouring determination step S357, and the collision mode execution step S359. In this embodiment, the system control unit 20 confirms whether or not there is a detour path for an autonomous mobile-based automated guided vehicle having a lower travel priority on the mobile path by confirming the travel priority. The detour path is not present, and thus the velocity control mode execution step S3591 is performed in the collision mode execution step S359. The deceleration process in the velocity control mode execution step S3591 is as follows (see Table 1):

TABLE 1

| | Velocity of AGV 2 | Threshold value | Determination |
|---|---|---|---|
| Primary deceleration | 1.08 | max(6.67, 3.7) | \|10.56-10.0\| < 6.67 |
| Secondary deceleration | 0.97 | max (6.67, 4.12) | \|10.56-11.11\| < 6.67 |
| Tertiary deceleration | 0.87 | max (6.67, 4.56) | \|10.56-12.35\| < 6.67 |
| Quaternary deceleration | 0.79 | max (6.67, 5.06) | \|10.56-13.72\| < 6.67 |
| Quinary deceleration | 0.71 | max (6.67, 5.63) | \|10.56-15.24\| < 6.67 |
| Senary deceleration | 0.64 | max (6.67, 6.25) | \|10.56-16.94\| < 6.67 |
| Septenary deceleration | 0.57 | max (6.67, 6.95) | \|10.56-18.82\| > 6.95 |

In this embodiment, the autonomous mobile-based automated guided vehicle AGV 2 travels at a velocity of 0.57 m/s through a total of seven deceleration processes, and two autonomous mobile-based automated guided vehicles AGV 1 and AGV 2 arrive at the arrival point safely without colliding with each other.

Figure 32:
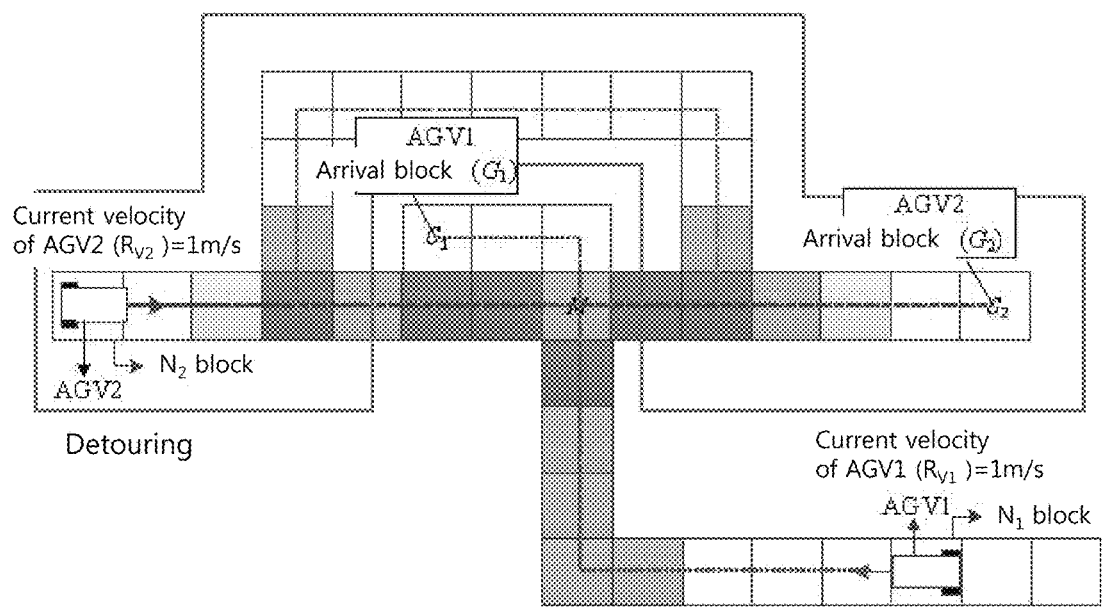

As another example of the travel control step S30 including the collision control step S35, the case where a detour path for AGV 2 is shown in FIG. 32. The autonomous mobile-based automated guided vehicle AGV 1 travels toward a mobile path block G1 as an arrival point, and the autonomous mobile-based automated guided vehicle AGV 2 travels toward travels toward a mobile path block G2 as an arrival point. In this case, the two mobile paths forms the collision prediction block M.

A prediction arrival time $Col_t$ spent for AGV 1 and AGV 2 to travel to the collision prediction block from a current AGV position is calculated to determine whether or not AGV 1 and AGV 2 collide with each other at the collision prediction block M (S3531). When AGV 1 and AGV 2 travel at the same velocity of 1.0 m/s, the prediction arrival times of AGV 1 and AGV 2 are $Col_{t1}$ and $Col_{t2}$, respectively, and are calculated as follows:

$$Col_{t1} = \sum_{n=N_1}^{M} \frac{SP_n}{R_{v1}} \cdot P_{vn} =$$

$$\left(\frac{1}{1.0} \cdot 1\right) \cdot 2 + \left(\frac{1}{1.0} \cdot 3\right) \cdot 3 + \left(\frac{1}{1.0} \cdot \frac{6}{4}\right) + \left(\frac{1}{1.0} \cdot 2\right) \cdot 2 = 16.5$$

$$Col_{t2} = \sum_{n=N_2}^{M} \frac{SP_n}{R_{v2}} \cdot P_{vn} = \left(\frac{1}{1.0} \cdot 1\right) \cdot 4 + \left(\frac{1}{1.0} \cdot 3\right) + \left(\frac{1}{1.0} \cdot 2\right) \cdot 5 = 17$$

In addition, a prediction arrival time difference ($Col_{t1}-Col_{t2}$) is calculated from the prediction arrival times $Col_{t1}$ and $Col_{t2}$, and a collision prediction reference time $SP_{th}$ is calculated as follows in the collision prediction reference time calculation step S3533:

$$SP_{th} = \max\left(\begin{array}{l}\frac{SP_{M_{1,2}}}{R_{v1}} \cdot P_{vM_1} + \frac{SP_{(M_1-1)}}{R_{v1}} \cdot P_{v(M_1-1)} + \frac{SP_{(M_1+1)}}{R_{v1}} \cdot P_{v(M_1+1)}, \\ \frac{SP_{M_{1,2}}}{R_{v2}} \cdot P_{vM_2} + \frac{SP_{(M_2-1)}}{R_{v2}} \cdot P_{v(M_2-1)} + \frac{SP_{(M_2+1)}}{R_{v2}} \cdot P_{v(M_2+1)}\end{array}\right)$$

$$= \max\left(\frac{1}{1.0} \cdot 1 + \frac{1}{1.0} \cdot 2 + \frac{1}{1.0} \cdot 3, \frac{1}{1.0} \cdot 3 + \frac{1}{1.0} \cdot 2 + \frac{1}{1.0} \cdot 3\right) = 8$$

Thereafter, the system control unit 20 compares the prediction arrival time difference ($Col_{t1}-Col_{t2}$) with the collision prediction reference time $SP_{th}$ as follows (S3535):

$$|17-16.5|<(SP_{th}=8)$$

The system control unit 20 determines at step S3535 that AGV 1 and AGV 2 are predicted to collide with each other, and performs the detour path presence confirmation step S355, the detouring determination step S357, and the collision mode execution step S359. In this embodiment, the system control unit 20 confirms whether or not there is a detour path for an autonomous mobile-based automated guided vehicle having a lower travel priority on the mobile path by confirming the travel priority. The detour path is not present, and thus the velocity control mode execution step S3591 is performed in the collision mode execution step S359. The deceleration process in the velocity control mode execution step S3591 is as follows (see Table 1).

More specifically, after a detour path has been confirmed in the detour path presence determination step S3571 of the detouring determination step S357, the system control unit 20 performs the virtual travel time confirmation step S3573 and the detouring decision step S3575. First, the virtual velocity control travel time $TP_t$ and the virtual detour control travel time $DP_t$ are confirmed. The virtual velocity control travel time $TP_t$ and the virtual detour control travel time $DP_t$) are calculated as follows:

$$TP_t = \sum_{n=N_2}^{G} \frac{SP_G}{R_v} \cdot P_{vG} =$$

$$\left(\frac{1}{1.0} \cdot 1\right) \cdot 4 + \left(\frac{1}{1.0} \cdot 3\right) \cdot 5 + \left(\frac{1}{1.0} \cdot \frac{6}{4}\right) \cdot 2 + \left(\frac{1}{1.0} \cdot 2\right) \cdot 3 = 28$$

$$DP_{t1} = \sum_{n=N}^{G} \frac{SP_G}{R_v} \cdot P_{vG} =$$

$$\left(\frac{1}{1.0} \cdot 1\right) \cdot 13 + \left(\frac{1}{1.0} \cdot 3\right) \cdot 2 + \left(\frac{1}{1.0} \cdot \frac{6}{4}\right) \cdot 2 + \left(\frac{1}{1.0} \cdot 2\right) \cdot 3 = 28$$

Thereafter, the system control unit 20 performs the detouring decision step S3575 of deciding whether or not the autonomous mobile-based automated guided vehicle 10 detours using the virtual velocity control travel time $TP_t$ and the virtual detour control travel time $DP_t$ as follows:

$$TP_t+SP_{th}=(28+8=36)>(DP_t=28)$$

If a difference between the virtual detour control travel time $DP_t$ and the virtual velocity control travel time $TP_t$ is smaller than or equal to the collision prediction reference time $SP_{th}$, the system control unit 20 determines that the time spent for the autonomous mobile-based automated guided vehicle 10 to detour is shorter than the time for the autonomous mobile-based automated guided vehicle 10 to travel in the deceleration state at the velocity control mode and thus the shortest time is spent, and the control program proceeds to the collision mode execution step S359 which will be described later, where the system control unit 20 performs the detouring mode execution step S3593.

Figure 33:
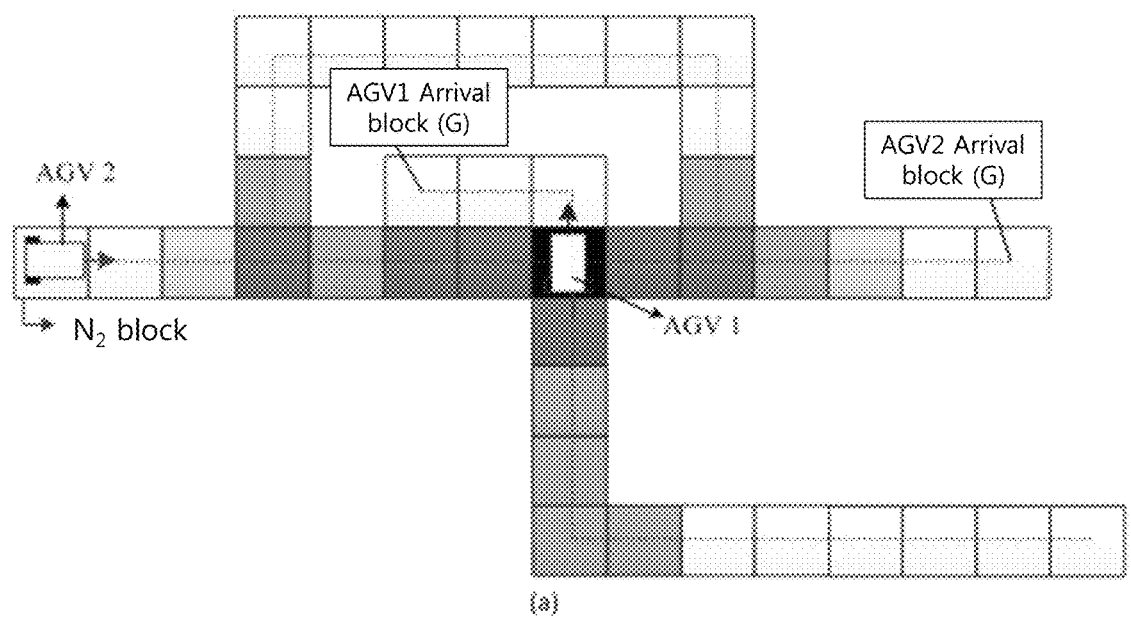
Figure 34:
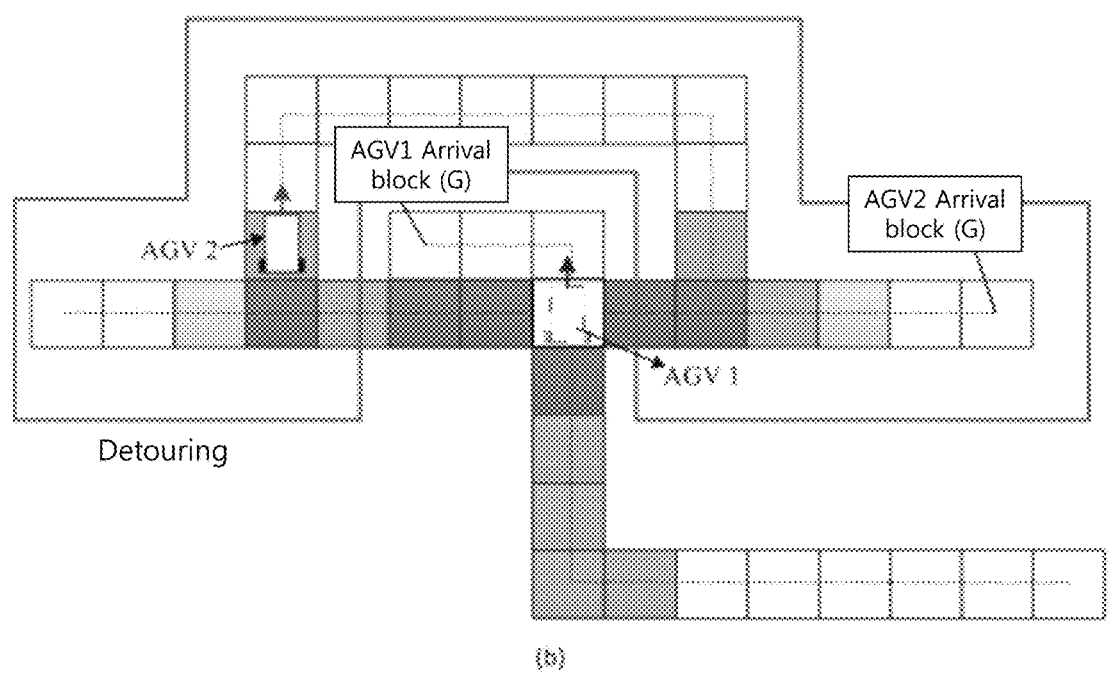
Figure 35:
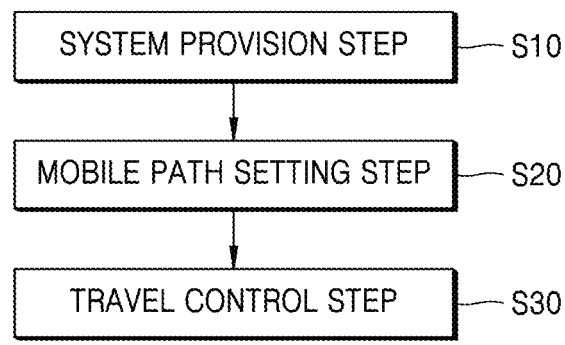
FIGS. 35 to 41 are control flow charts of an autonomous mobile-based automated guided vehicle system according to an embodiment of the present invention.
Figure 36:
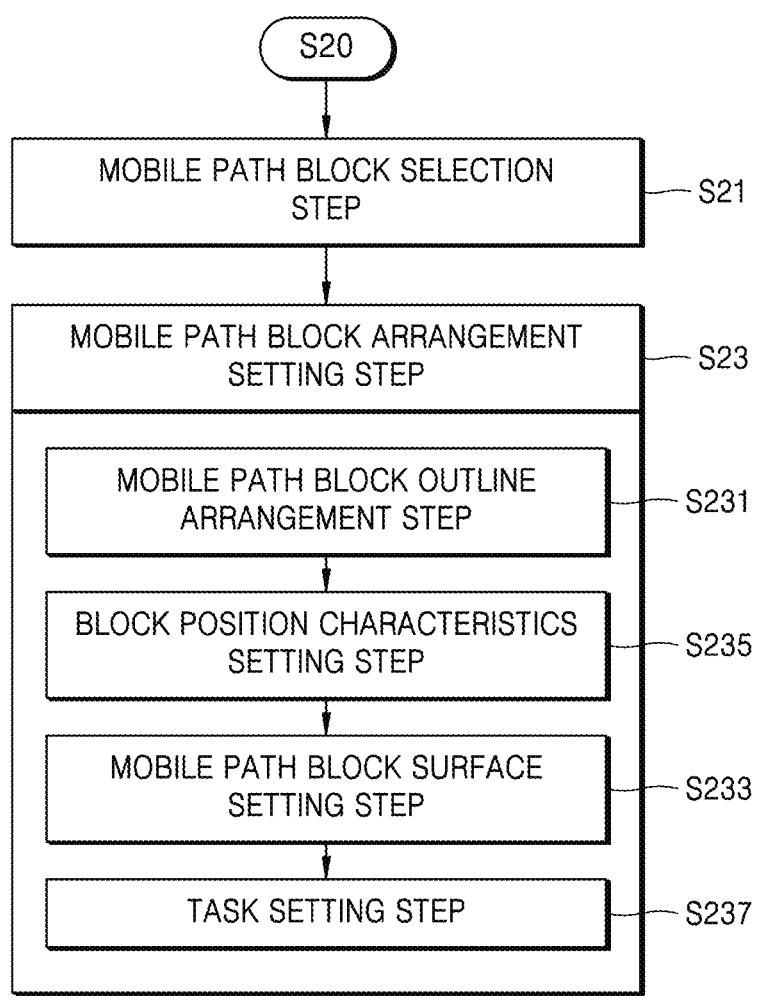
Figure 37:
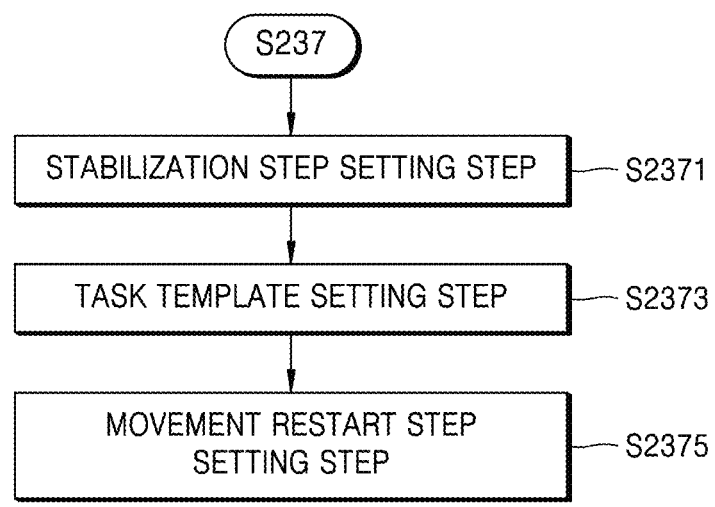
Figure 38:
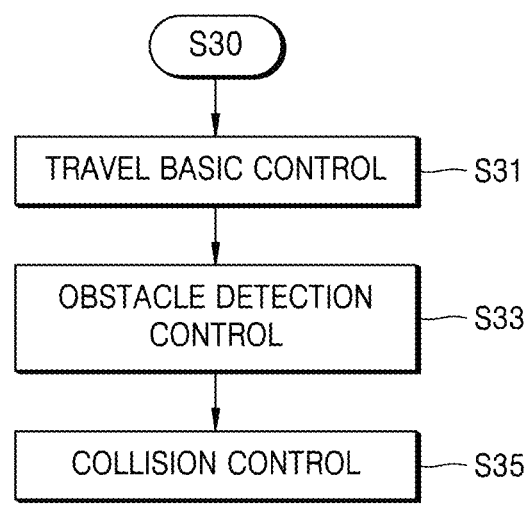
Figure 39:
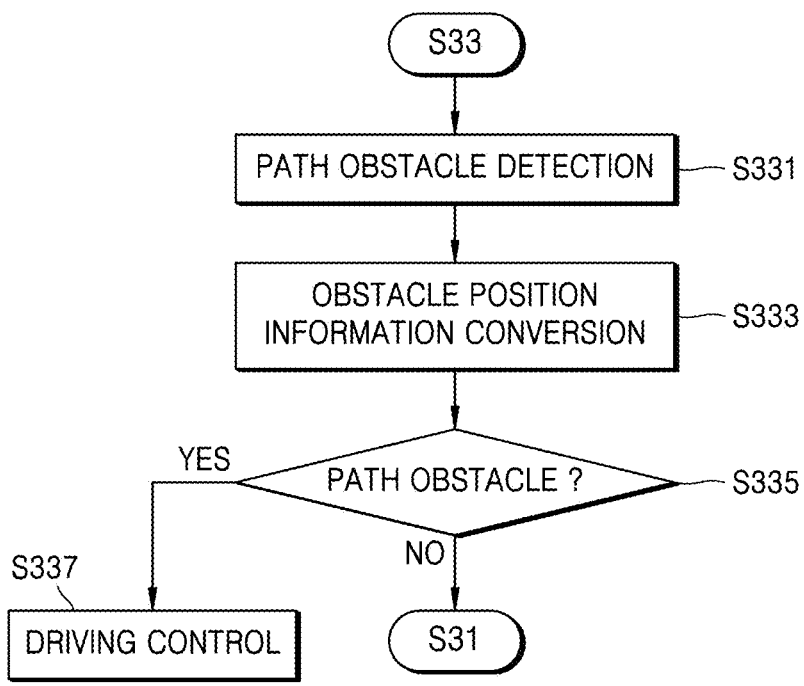
Figure 40:
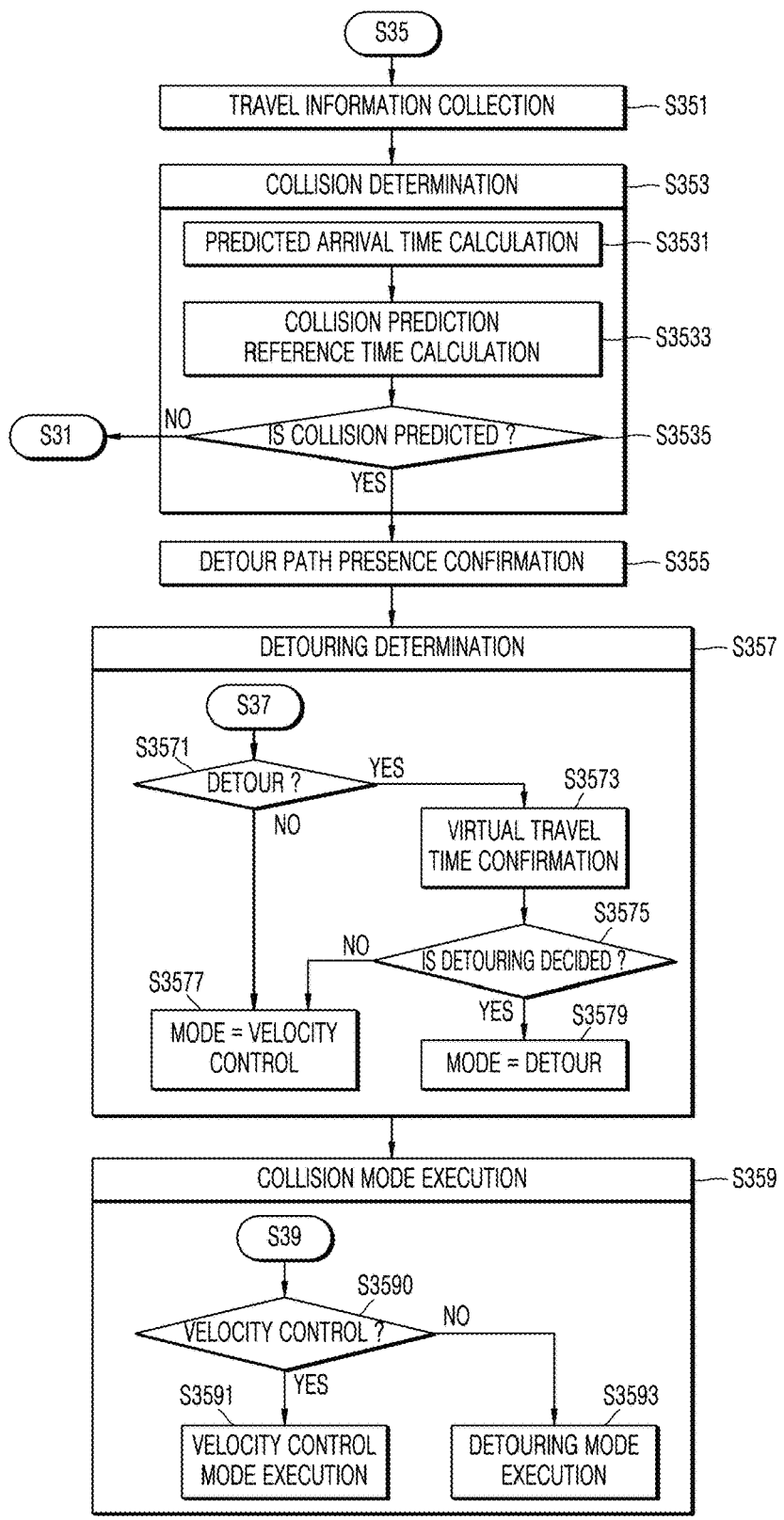
Figure 41:
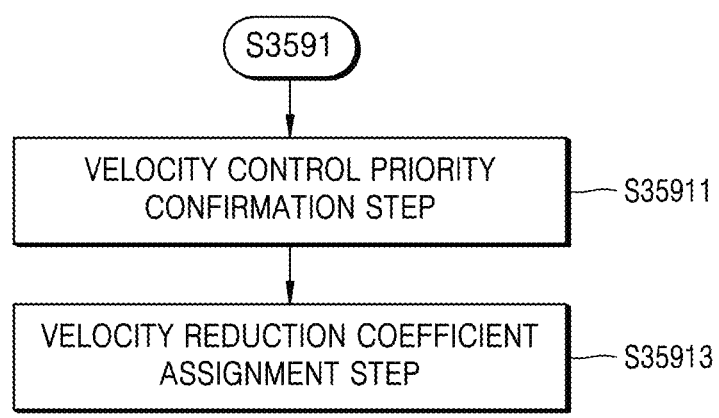

In addition, as shown in FIGS. 33 and 34, in the case where any one autonomous mobile-based automated guided vehicle is in a failure state, the system control unit 20 converts a mobile path block occupied by the autonomous mobile-based automated guided vehicle 10 in a failure state into a mobile path block of a vacant state so that the mobile path block is set as a mobile path block that is not present and a detour path of another autonomous mobile-based automated guided vehicle can be ensured by confirming and selecting a detour path.

In the meantime, although the travel basic control step, the obstacle detection control step, and the collision control step have been illustratively described in the above embodiments, these steps are performed in response to a control signal applied from the system control unit, and a specific control step may be performed preferentially and urgently through the generation of a signal in a specific state, i.e., the formation of an interrupt signal. In addition, it is obvious in the art that the obstacle detection and the switch control are implemented in a multi-thread control manner so that they may be substantially operated and controlled simultaneously.

Figure 42:
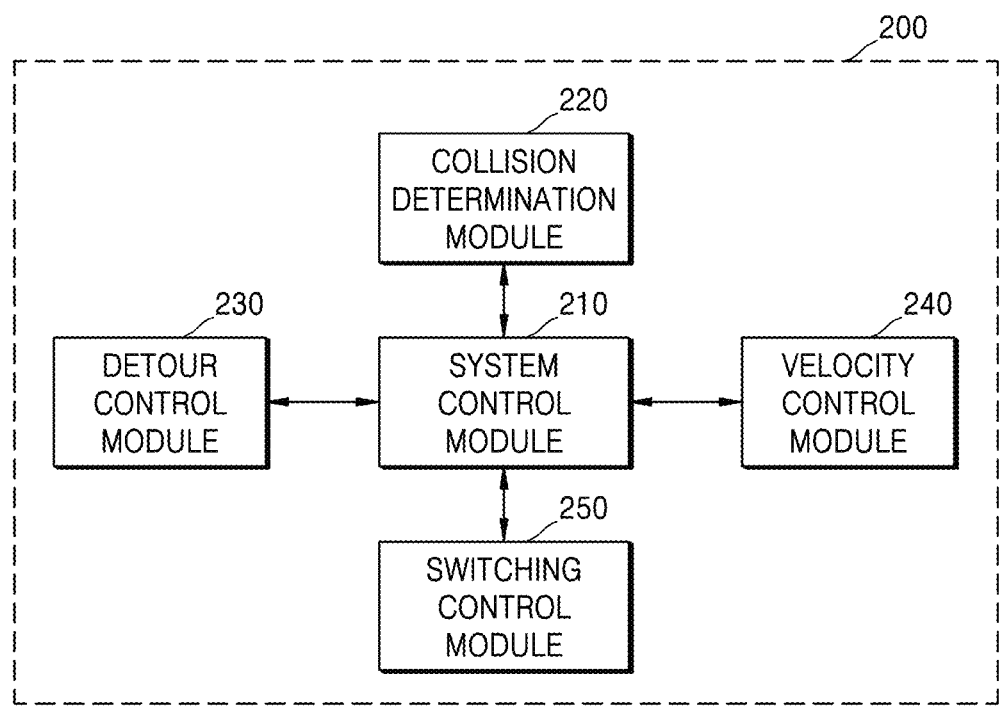
FIG. 42 is a block diagram illustrating a detailed configuration of an example of a system control unit of an autonomous mobile-based automated guided vehicle system according to an embodiment of the present invention.

In other words, as shown in FIG. 42, the system control unit 20 of the present invention is composed of one or more modules. The respective modules are connected to each other to perform a control process of the entire system, and perform works assigned thereto. In addition, when a preset specific state is reached, a control process corresponding to the specific state may be performed without performing the typical control flow by forming an interrupt. In this embodiment, the system control unit 20 may include a system control module 210, a collision determination module 220, a detour control module 230, and a velocity control module 240. The system control unit 20 may further include a switch block control module 250 serving to perform a switch block control process for a mobile path block on which a plurality of mobile travel paths overlap with each other.

The system control module 210 is connected to the collision determination module 220, the detour control module 230, the velocity control module 240, and the switch block control module 250 so that when the system control module 210 receives a predetermined thread signal, it interrupts the typical control flow and implements a control mode corresponding to the predetermined thread signal. The collision determination module 220 determines whether or not there is a collision between two autonomous mobile-based automated guided vehicles at a collision prediction block, i.e., an intersection block where two travel mobile paths overlap and intersect with each other, and the detour control module 230 confirms whether or not there is a detour path of the autonomous mobile-based automated guided vehicle based on the travel information, and determines whether or not to allow the autonomous mobile-based automated guided vehicles to detour by determining whether or not the confirmed detour path is present In addition, the velocity control module 240 confirms the travel priorities of the autonomous mobile-based automated guided vehicles, which are included in preset data that is previously stored in the system storage unit 30, and confirms and selects the velocity reduction for an autonomous mobile-based automated guided vehicle having a lower travel priority. Then, the velocity control module 240 assigns a velocity reduction coefficient for a mobile path block on a current mobile path of the selected autonomous mobile-based automated guided vehicle for which the velocity reduction is confirmed and selected to perform a deceleration control. The switch block control module 250 confirms whether or not the autonomous mobile-based automated guided vehicle approaches a preset distance with respect to the switch block and controls the travel of the autonomous mobile-based automated guided vehicle at the switch block.

The configuration of the present invention is not limited thereto, and various implementations are possible. The path block system-based AGV control is performed based on the Tcp/Ip-based XML communication between the system control unit formed as a central monitoring system structure and the AGV. The system control unit functioning as the central monitoring system designs all the settings of path blocks where AGVs is to travel, and is formed of the specific modules as shown in FIG. 42 so that the system control unit can perform each work in the multi-thread manner and carry out a function with each AGV through the XML communication. The multiple AGV control through the system control unit implemented as the central monitoring system performs a collision prevention control, an optimal path setting and a task setting, which are in turn executed by each specific module. The travel management of the system control unit as the central monitoring system includes the setting of a mobile path block on which AGV is to travel, the transmission of task-setting information and information on the number of AGVs which are to perform a task to each AGV, and the performance of the AGV travel based on the transmitted information, which are performed in this order as described above. In the case where information on the intersection block or the overlapping path block is included in the path block, the multiple AGV control, for example, the switch block control must be performed, and thus each AGV transmits its state and position block information as information necessary for the multiple AGV control travel to the system control unit as the central monitoring system through communication. Further, in the case where information of all the AGVs, which pertains to the mobile path block, is transmitted, a result of performing the multiple AGV control is transmitted to each AGV, and the result information of the multiple AGV control may perform a travel instruction of AGVs, a path block setting instruction, and the like.

Meanwhile, as described above, the system storage unit 30 has stored therein a travel mobile path of the autonomous mobile-based automated guided vehicle, which is composed of the formed mobile path blocks. The system storage unit 30 has also stored therein information in the case where the multiple AGV control is necessary, i.e., information of a switch block where the number of the entry and exit directions of the autonomous mobile-based automated guided vehicle is less than twice the number of the plurality of mobile paths among the intersection blocks, namely the mobile path blocks where a plurality of travel mobile paths of a plurality of autonomous mobile-based automated guided vehicles overlap with each other.

As such, the switch block control module 250 confirms whether or not the autonomous mobile-based automated guided vehicles approach the preset distance with respect to the switch block from current position information of the autonomous mobile-based automated guided vehicles, i.e., position information on the mobile path blocks where the autonomous mobile-based automated guided vehicles are currently positioned and information on the switch block based on the travel information collected from the autonomous mobile-based automated guided vehicles, and performs a predetermined switch block control process. In other words, the collision mode execution step S359 further includes a switch block control step S3595. In the switch block control step S3595, the switch block control module 250 of the system control unit 200 confirms whether or not the autonomous mobile-based automated guided vehicles approach the preset distance with respect to the switch block and controls the travel of the autonomous mobile-based automated guided vehicle at the switch block.

Figure 43:
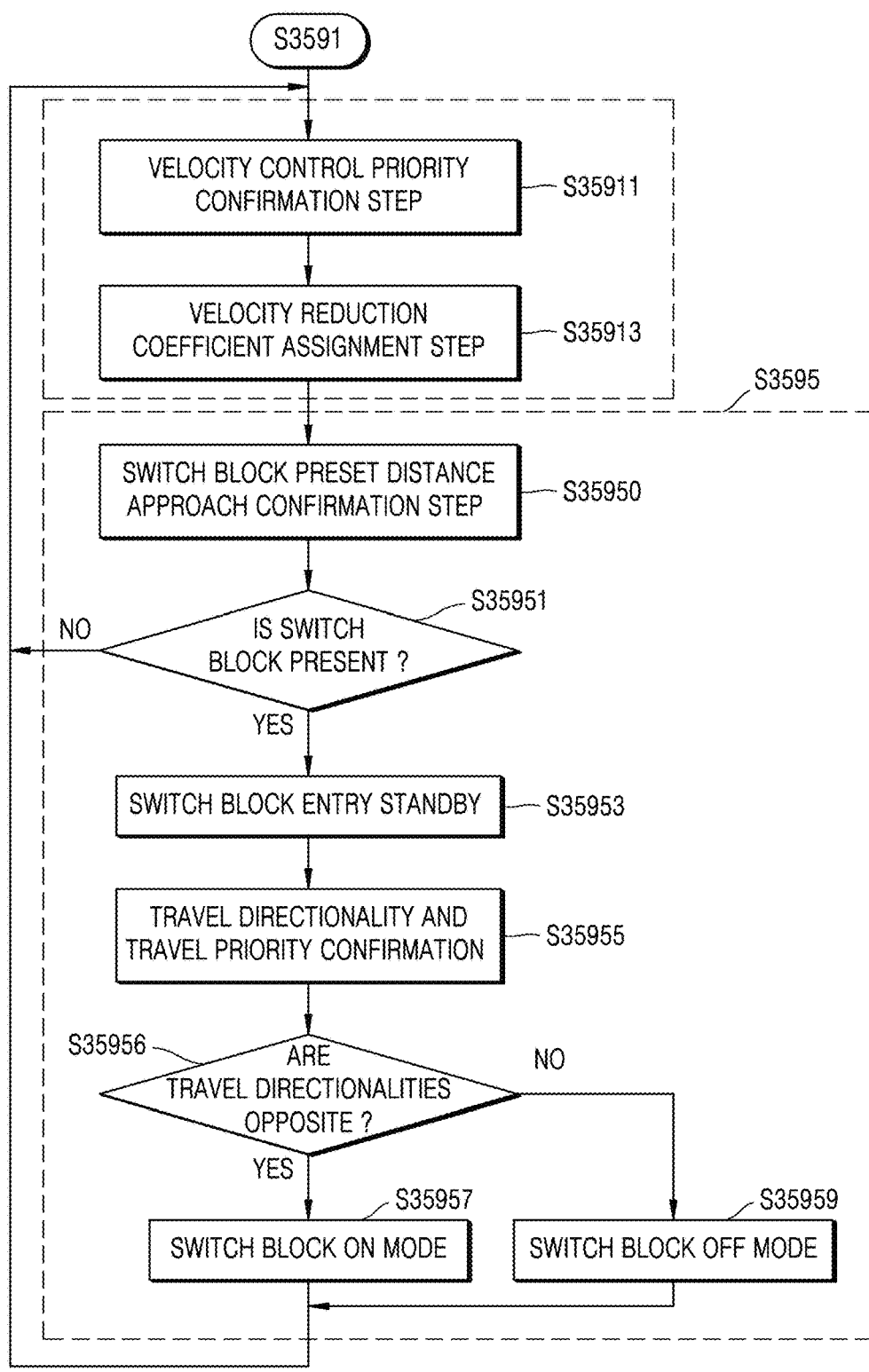
FIGS. 43 to 45 are control flow charts of other examples of an autonomous mobile-based automated guided vehicle system according to an embodiment of the present invention.
Figure 44:
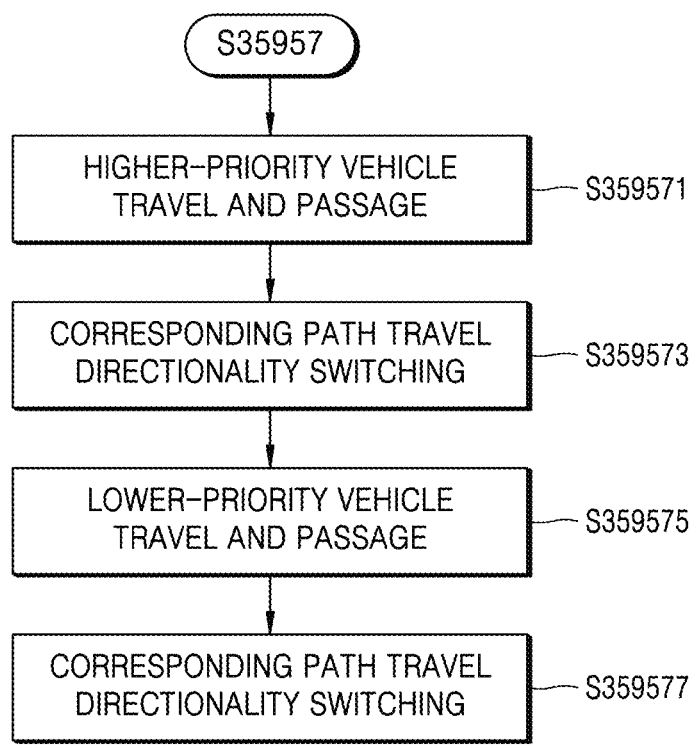
Figure 45:
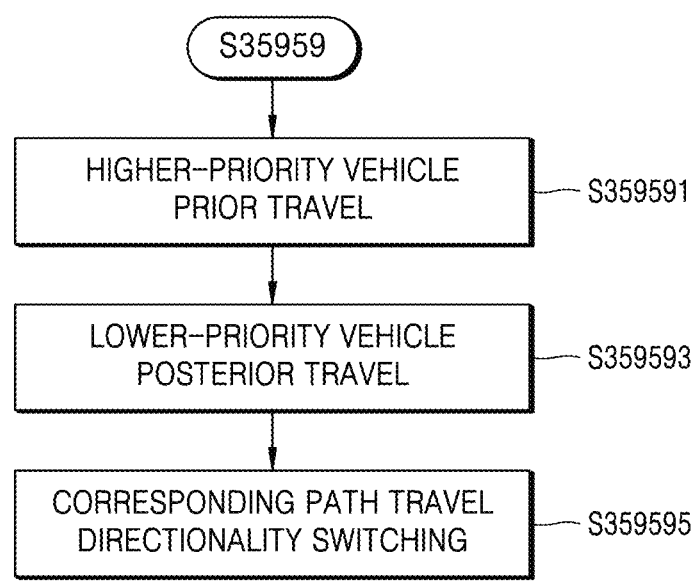

As shown in FIG. 43, the switch block control step S3595 includes a switch block preset distance approach confirmation step S35950 and a switch block distance entry determination step S35951.

In the switch block preset distance approach confirmation step S35950, the system control unit 20 confirms whether or not the autonomous mobile-based automated guided vehicles enter a preset number of mobile path block distances with respect to the switch block.

In the switch block distance entry determination step S35951, the system control unit 200 determines whether or not a distance between the autonomous mobile-based automated guided vehicle and the switch block is within the preset distance using a confirmation result in the switch block preset distance approach confirmation step S35950. Herein, the preset distance may be one of the preset data stored in the system storage unit 30, and may be the number of the mobile path blocks between a mobile path block where the autonomous mobile-based automated guided vehicle is currently positioned and a switch block. For example, in the case where the preset data is set as a distance formed by three mobile path blocks, when the autonomous mobile-based automated guided vehicle moves further by three mobile path blocks from the mobile path block where the autonomous mobile-based automated guided vehicle is currently positioned and the autonomous mobile-based automated guided vehicle enters the switch block or a region formed by the switch block, the switch block control module 250 of the system control unit 200 determines that autonomous mobile-based automated guided vehicle enters the preset distance and applies an interrupt signal to the system control module 210 to perform a subsequent control step so that the switch block control process is performed while maintaining the previous velocity control process.

After the switch block preset distance approach confirmation step S35950 and the switch block distance entry determination step S35951 have been performed, the system control unit 200 performs a switch block entry standby step S35953 and a travel directionality and travel priority confirmation step S35955 in the switch block control step S3595.

If it is determined in the switch block distance entry determination step S35951 that autonomous mobile-based automated guided vehicle enters the preset distance with respect to the switch block, the control program proceeds to the switch block entry standby step S35953 where the switch block control module 250 applies an entry standby signal to the autonomous mobile-based automated guided vehicle to control the autonomous mobile-based automated guided vehicle to stand by at a mobile path block in front of the switch block or a region formed by the switch block. In this embodiment, such a standby operation is applied at both ends of a switch block or a region formed by the switch block. In other words, if one autonomous mobile-based automated guided vehicle approaches from one end of the switch block or a region formed by the switch block to form an standby state, another autonomous mobile-based automated guided vehicle approaches from the other end of switch block or a region formed by the switch block so that the autonomous mobile-based automated guided vehicle forming the foregoing standby state maintains the standby state until a standby state is formed. Under the circumstances, if it is determined that the autonomous mobile-based automated guided vehicle that has first approached the switch block or a region formed by the switch block can deviate from the switch block or a region formed by the switch block before the other autonomous mobile-based automated guided vehicle approaching from the other end of the switch block or a region formed by the switch block approaches a corresponding switch block or a region formed by the switch block through the calculation of the time when the autonomous mobile-based automated guided vehicle that has first approached the switch block or a region formed by the switch block deviates from the switch block or a region formed by the switch block, the switch block control module 250 can release the standby state of the autonomous mobile-based automated guided vehicle that has first approached the switch block or a region formed by the switch block to allow the autonomous mobile-based automated guided vehicle to travel in a prior order. In this embodiment, the present invention takes a structure of forming all the standby states at both ends of the switch block or a region formed by the switch block to prevent the formation of an unnecessary deadlock state due to the travel priority assigned to the autonomous mobile-based automated guided vehicle and an increase in the number of the vehicles, but various modifications are possible.

Thereafter, the system control unit 200 performs the travel directionality and travel priority confirmation step S35955. The switch block control module 250 of the system control unit 200 confirms the travel directionality of the autonomous mobile-based automated guided vehicle and the travel priority of the autonomous mobile-based automated guided vehicle, which is included in the preset data. As used herein, the term "travel directionality" means the travel direction on a travel mobile path along which a corresponding autonomous mobile-based automated guided vehicle travels, which is formed by a separate flag signal with respect to a travel mobile path formed on the switch block, and the corresponding autonomous mobile-based automated guided vehicle travels and passes through the switch block and then the flag signal is changed to switch the corresponding travel directionality so that a travel mobile path along which the autonomous mobile-based automated guided vehicle travels subsequently can be formed. The travel priority is the preset data stored in the system storage unit 30 and the switch block control module 250 of the system control unit 200 can grasp the travel priority of the corresponding autonomous mobile-based automated guided vehicle from the system storage unit 30.

If the travel directionality and travel priority confirmation step S35955 has been performed to grasp the travel directionalities and the travel priorities, the system control unit 200 performs a travel directionality counter determination step S35956 of determining whether or not the travel directionalities of the autonomous mobile-based automated guided vehicles that stands by at both ends of the switch block, which are grasped in the travel directionality and travel priority confirmation step S35955, are different from or identical to each other.

If it is determined in the travel directionality counter determination step S35956 that the travel directionalities of the autonomous mobile-based automated guided vehicles that stands by at both ends of the switch block are different from each other, the system control unit 200 performs a switch block ON mode S35957.

In the switch block ON mode S35957, the system control unit 200 controls an autonomous mobile-based automated guided vehicle having a higher travel priority of the two autonomous mobile-based automated guided vehicles to travel in a prior order so that an autonomous mobile-based automated guided vehicle having a lower travel priority enters the switch block after escaping from a switch block or a region formed by the switch block. In this case, a switch ON/OFF signal as a flag signal formed at the switch block is set as a switch ON state if the travel directionalities are opposite to each other by 180 degrees, and is set as a switch OFF state if the travel directionalities are not opposite to each other by 180 degrees. The simultaneous entry of the autonomous mobile-based automated guided vehicles into a region is limited in the switch ON state, and the simultaneous entry of the autonomous mobile-based automated guided vehicles into a region is permitted in the switch OFF state.

More specifically, the switch block ON mode S35957 includes a higher-priority vehicle travel and passage step S359571, a corresponding path travel directionality switching step S359573, a lower-priority vehicle travel and passage step S359575, and a corresponding path travel directionality switching step S359577.

In the higher-priority vehicle travel and passage step S359571, the system control unit 200 allows the autonomous mobile-based automated guided vehicle having a higher travel priority of the autonomous mobile-based automated guided vehicles to travel in a prior order and pass through the region formed by the switch block.

Thereafter, in the corresponding path travel directionality switching step S359573, the system control unit 200 switches the travel directionality at the switch block for a mobile path along which the autonomous mobile-based automated guided vehicle having a higher travel priority travels, i.e., allows a switch signal as a flag signal at the corresponding switch block to be converted from a switch ON state in which the travel directionalities are opposite to each other into a switch OFF state in which the travel directionalities are not opposite to each other so that the entry and travel of another autonomous mobile-based automated guided vehicle having a travel lower priority is permitted.

Subsequently, in the lower-priority vehicle travel and passage step S359575, the system control unit 200 applies a control signal to allow the autonomous mobile-based automated guided vehicle having a lower travel priority to enter the switch block and pass through the region formed by the switch block.

In the corresponding path travel directionality switching step S359577, the system control unit 200 switches the travel directionality at the switch block for a mobile path along which the autonomous mobile-based automated guided vehicle having a lower travel priority travels. By doing so, a switch signal as a flag signal at the corresponding switch block is again converted into the switch ON state so that when the autonomous mobile-based automated guided vehicle enters the corresponding switch block, the switch block ON mode can be performed.

As such, a flag signal for switching the travel directionality for each corresponding travel path is applied so that when the corresponding autonomous mobile-based automated guided vehicle enters a corresponding travel mobile path from a corresponding switch block, the travel directionality can be formed to be opposite to that in the case where the corresponding autonomous mobile-based automated guided vehicle travels.

On the contrary, if it is determined in the travel directionality counter determination step S35956 that the travel directionalities of the autonomous mobile-based automated guided vehicles that stand by at both ends of the switch block are identical to each other, the system control unit 200 performs the switch block OFF mode S35959.

In the switch block OFF mode S35959, an autonomous mobile-based automated guided vehicle having a higher travel priority of the autonomous mobile-based automated guided vehicles that stand by at both ends of the switch block travels in a prior order so that the autonomous mobile-based automated guided vehicle enters a region formed by the switch block, and an autonomous mobile-based automated guided vehicle having a lower travel priority also enters the region formed by the switch block after a preset time has been lapsed. In other words, if the region formed by the switch block is somewhat long, i.e., if the switch block is arranged in a row in plural numbers, the respective autonomous mobile-based automated guided vehicles can enter the corresponding switch block simultaneously while maintaining uniform distances in a juxtaposed manner.

The switch block OFF mode S35959 includes a higher-priority vehicle prior travel step S359591, a lower-priority vehicle posterior travel step S359593, and a corresponding path travel directionality switching step S359595.

In the higher-priority vehicle prior travel step S359591, the switch block control module 250 and the system control module 210 of the system control unit 200 apply a travel control signal to the autonomous mobile-based automated guided vehicle having a higher travel priority of the autonomous mobile-based automated guided vehicles to allow the autonomous mobile-based automated guided vehicle having a higher travel priority to travels in a prior order so that the autonomous mobile-based automated guided vehicle enters the region formed by the switch block.

Thereafter, the system control unit 200 performs the lower-priority vehicle posterior travel step S359593 where the system control unit applies a travel control signal to the autonomous mobile-based automated guided vehicle having a lower travel priority to control the autonomous mobile-based automated guided vehicle having a lower travel priority to enter the switch block or the region formed by the switch block after the preset time has been lapsed.

Herein, the preset time in included in the preset data previously stored in the system control unit 30. Although the preset time is expressed herein, it may be defined as the distance between the autonomous mobile-based automated guided vehicles that enter the corresponding regions in a row, i.e., the number of the mobile path blocks disposed between the autonomous mobile-based automated guided vehicles.

Subsequently, the system control unit 200 performs the corresponding path travel directionality switching step S359595 of confirming whether or not the autonomous mobile-based automated guided vehicle having a lower travel priority deviates from the corresponding switch block, and switches the travel directionalities as flag signals assigned to the corresponding switch blocks for the corresponding mobile paths. In other words, it is determined that the autonomous mobile-based automated guided vehicle having a lower travel priority deviates from the region formed by the switch block based on the travel information and the mobile path information which are obtained by the communication with the autonomous mobile-based automated guided vehicles, the system control module 200 applies a flag signal to the autonomous mobile-based automated guided vehicle having a lower travel priority to switch the travel directionalities at the switch blocks for the mobile paths of the autonomous mobile-based automated guided vehicle having a higher travel priority and the autonomous mobile-based automated guided vehicle having a lower travel priority so that the travel directionalities are switched to form the same direction to allow a switch signal as a switch flag signal to be maintained in the switch OFF state, thereby accurately ensuring the travel direction when the autonomous mobile-based automated guided vehicle travels subsequently later.

Hereinafter, the multiple AGV control process, i.e., a switch block control process of preventing the travel deadlock of a series of a plurality of autonomous mobile-based automated guided vehicles will be described with reference to the accompanying drawings.

First, in the present invention, the following three rules are defined and controlled to increase the efficiency of the control of a plurality of autonomous mobile-based automated guided vehicles, i.e., the multiple AGVs and facilitate the control. These rules are obeyed by all the AGVs that travel using the path blocks, and IDs of the path blocks or the AGVs are set and used according to the following contents.

Rule 1: Only one AGV is present on one block.

Rule 2: All the AGVs are assigned with IDs which have priorities.

Rule 3: All the AGVs obey the characteristics set to the path blocks irrespective of their intrinsic features.

The multiple AGV control process is performed based on the above rules which will be described according to the sequence of the rules. In regard to an example related to the rules, as several AGVs are controlled, the number of all the cases will be described by way of an example of the AGV control from a collision control process in which the number of AGVs is more than two to a collision control process in which the number of AGVs is three. In addition, the performance and control method of the system control unit that is implemented as a central monitoring system will be described hereinafter.

Rule 1: Only one AGV is present on one block. Rule 1 is the most critical rule used to actually avoid a collision between multiple AGVs and maximize the performance efficiency of the tasks performed by the AGVs in a complex factory environment. The rule is established that only one AGV is present on one block to avoid a collision between the AGVs. A control process of avoiding the collision between the AGVs is performed based on such as rule.

Rule 2: All the AGVs are controlled according to the priorities based on IDs assigned thereto which have priorities. The central monitoring system assigns IDs to AGVs through the determination of the importance of a task allocated to each of the AGVs and the length of the mobile path. The multiple AGV control process is performed based on the assigned IDs, and the determination of the priorities is executed based on the IDs. The priority control method is performed in such a manner that as an ID number of an AGV is smaller, the AGV has a higher priority so that when the AGV having a higher priority encounters an AGV having a lower priority, it travels first as described above. By virtue of such a priority control method, the multiple AGV control process of preventing a collision between AGVs and ensuring safety is performed. In the case where this ordinary multiple AGV control process is performed as well as an AGV is required to abruptly perform a high importance task, the central monitoring system assigns a higher priority to a specific AGV so that the specific AGV can be controlled to first perform the task. This priority control method can have the effect of allowing the ambulance to travel toward a destination at a speed higher than that of other means of transportation as if other vehicles got out of the way of an ambulance.

Rule 3: All the AGVs obey the characteristics set to the path blocks irrespective of IDs which the AGVs have. The mobile path blocks forms a mobile path by the combination of several defined blocks as described above, and the formed mobile path blocks enable the efficient movement of AGVs through the several settings, if neccessary. As elements that can be set at the path blocks, a velocity control at a specific block according to the set colors and the setting of a block where a task of an AGV is to performed are possible. In addition, the multiple AGV control using the path blocks enables the collision preventive travel and the multiple AGV control when a detour path is present. Further, in the AGV control process used in the factory environment through the switch control method on the overlapping paths, a path block-based single and multiple AGV control process is performed to maximize the control efficiency of the AGV.

The most importance function in the multiple AGV control process is a solution to a task in which the collision preventive control and efficiency is maximized. The multiple AGV control process includes the calculation of the travel time spent for an AGV to travel to a deadlock block from a mobile path block where the AGV is currently positioned, the deceleration control, the determination of the detour path, etc., to achieve the collision preventive control as well as the switch block control to prevent a deadlock of AGVs. Several AGVs can perform the same task based on the IDs according to such a traveling capability-based control as well as the importance of a task.

Figure 51:
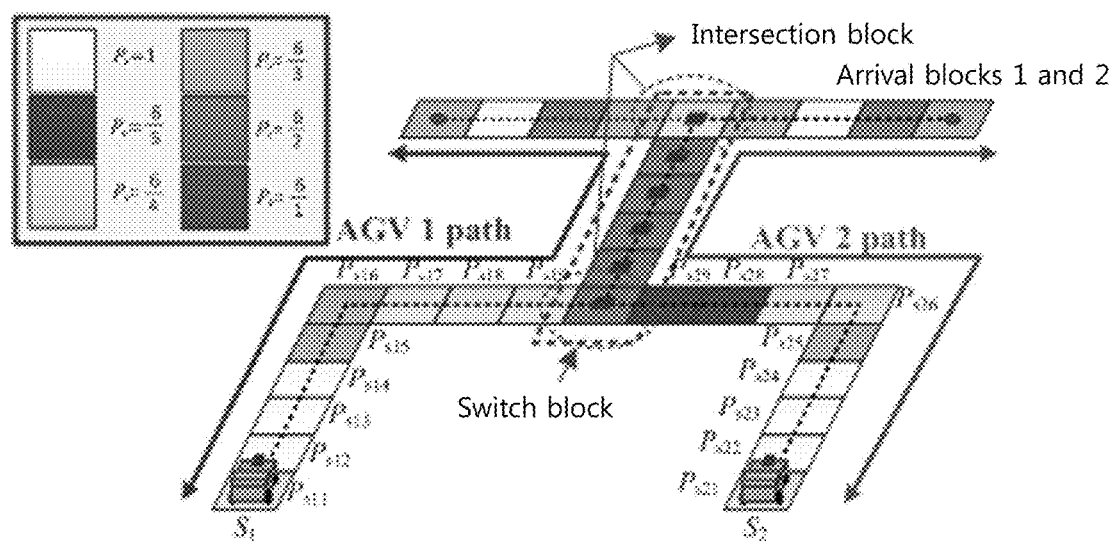

First, as shown in FIG. 51, in the case where two different AGVs travels at path blocks and an intersection block is included in the path blocks, a switch block control as the multiple AGV control is performed. FIG. 51 shows an example of a switch block control as the multiple AGV control, which is performed based on the switch block in the case where the number of collision prediction blocks is more than two.

Figure 52:
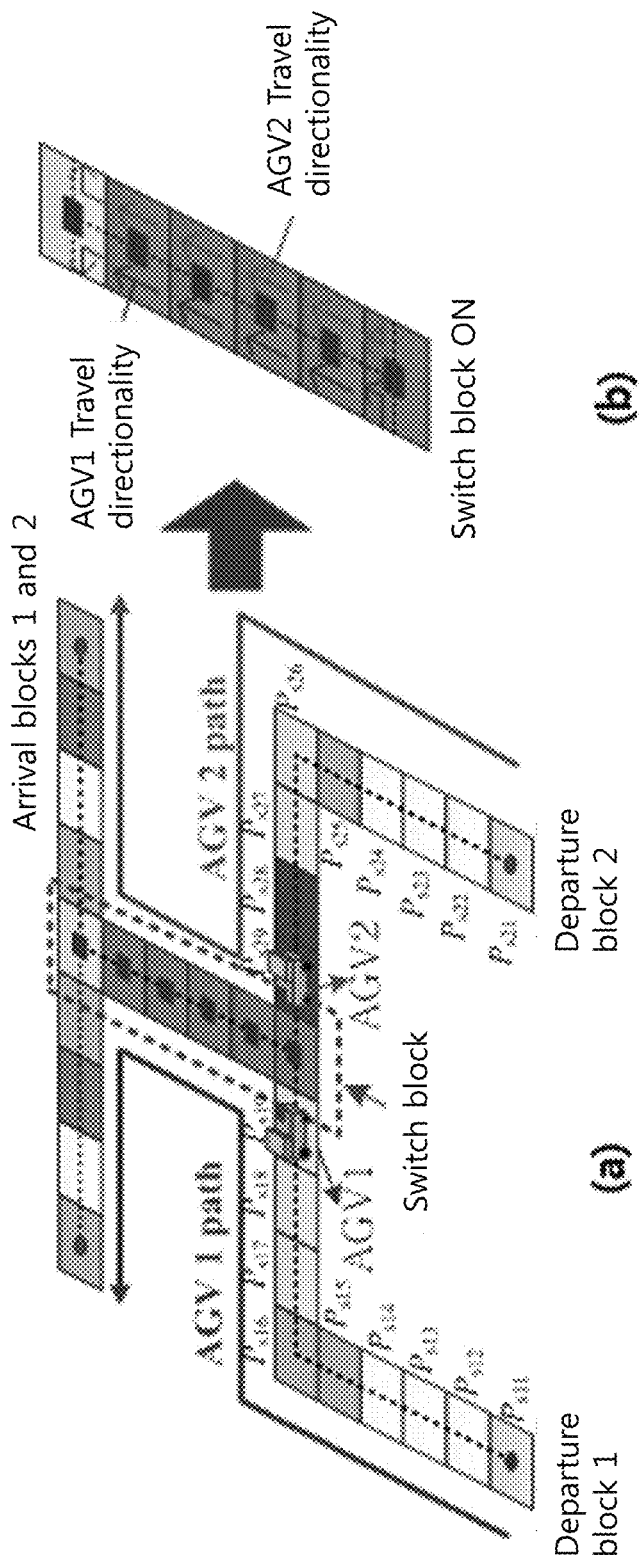
Figure 53:
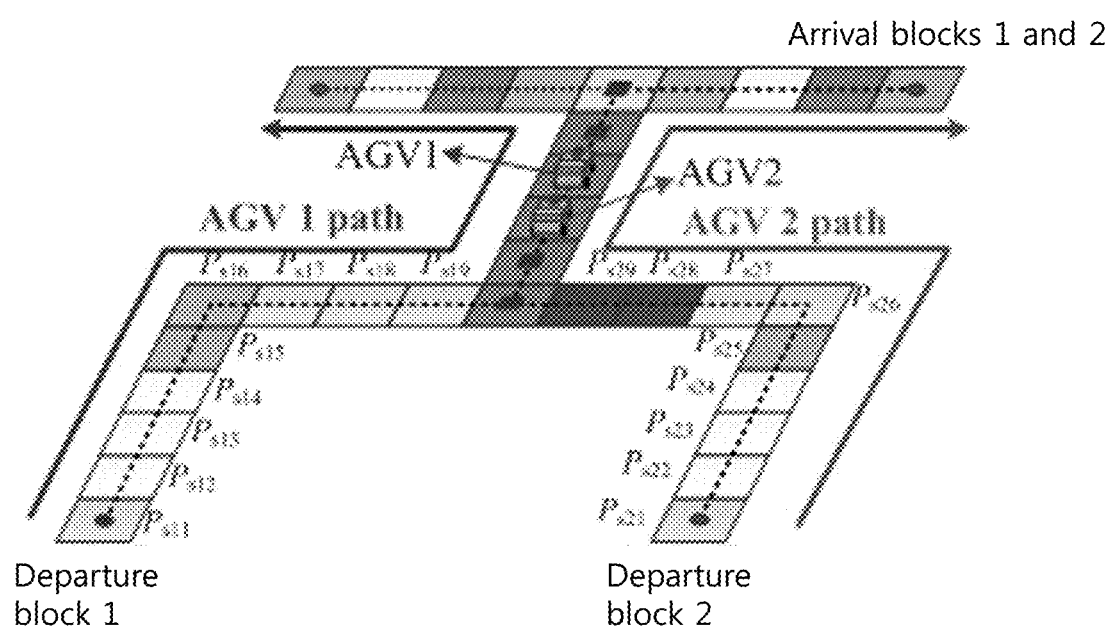

AGV 1 starts from a departure block S1 and travels toward an arrival block G1, and AGV 2 starts from a departure block S2 and travels toward an arrival block G2. When AGV 1 and AGV 2 travel in the above manner, a collision and a deadlock phenomenon may occur even at the intersection block M as well as overlapping path blocks. First, a deceleration control is performed through the comparison between the travel time of AGV 1 and AGV 2 and the path block threshold value at the collision prediction block. When AGV 1 arrives at a block $P_{s19}$ as a block immediately before the switch block and AGV 2 arrives at a block $P_{s29}$, steps S35950, S35951 and S35953 are performed so that the system control unit 200 confirms whether or not AGV 1 and AGV 2 arrive the switch block and then forms a standby state. Thereafter, as show in FIG. 52, the system control unit 200 checks the travel directionalities of the AGV 1 and AGV 2 for entering the switch block in step S35955. The travel directionalities of the AGV 1 and AGV 2 are identical to each other, and thus the switch mode at the switch block forms the switch block OFF state. Thus, in step S35956, the system control unit 200 performs the switch block OFF mode S35959 and both AGVs enter the switch block or a switch block region simultaneously while performing a velocity control therebetween. Thereafter, the system control unit 200 performs steps S359591 and S359593 as shown in FIG. 53 so that AGV 1 and AGV 2 travel in a row in a juxtaposed manner along the switch block region. In the case where AGV 1 and AGV 2 completely deviate from a corresponding mobile path block region, i.e., the switch block region, the travel directionalities of AGV 1 and AGV 2 at the switch block of a plurality of travel mobile paths are switched to maintain the switch block OFF state in which the travel directionalities are identical to each other.

Figure 54:
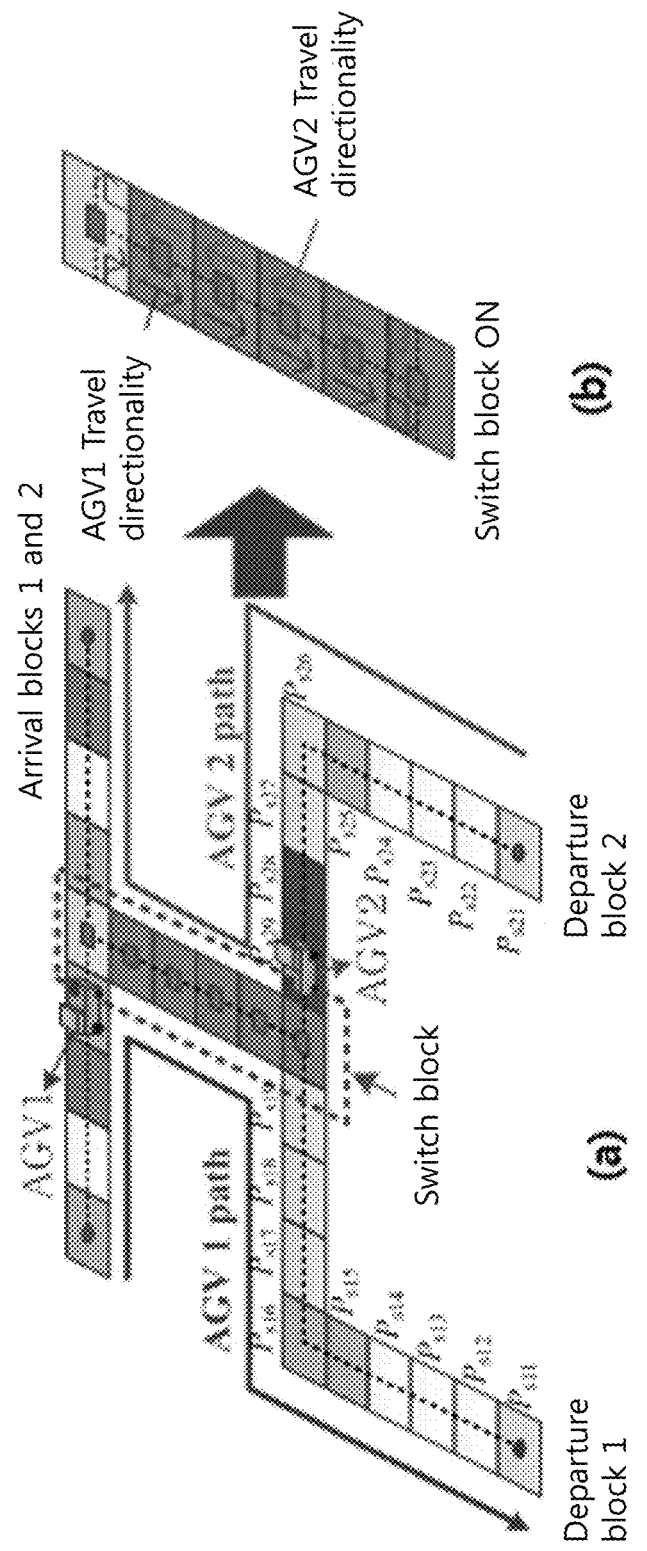
Figure 55:
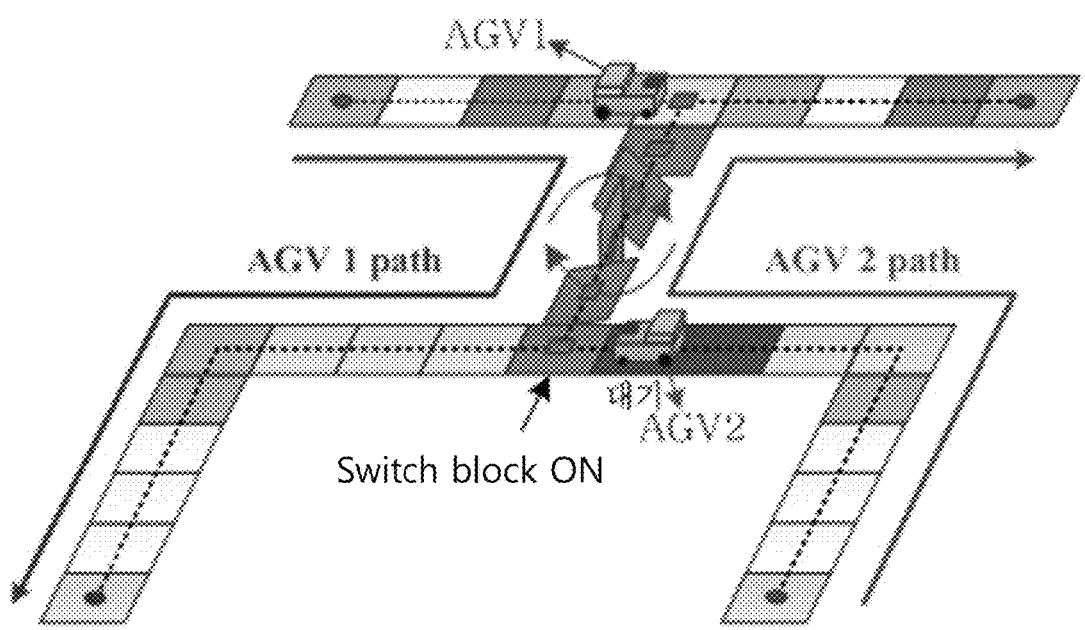
Figure 56:
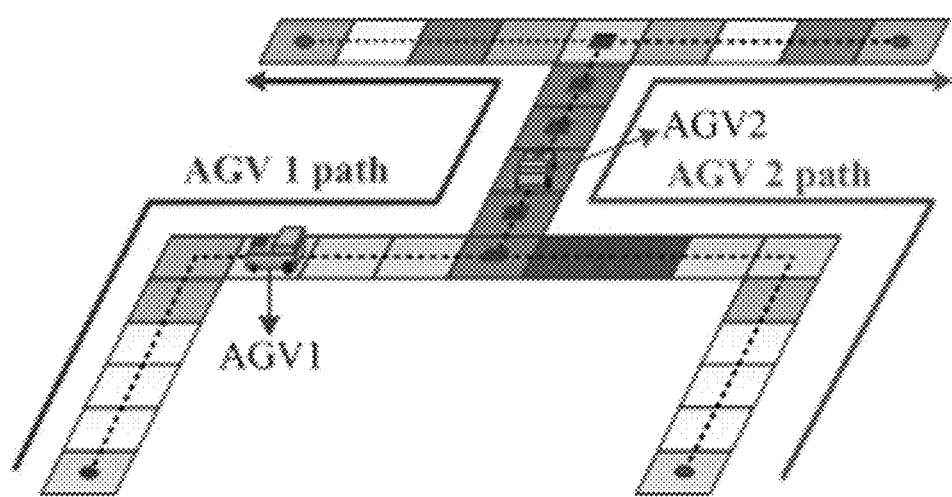

On the contrary, as show in FIG. 54, in the case where the travel directionalities of AGV 1 and AGV 2 are opposite to each other on a plurality of travel mobile paths assigned to the switch block, the switch block becomes the switch block ON state so that the system control unit 200 performs the switch block ON mode S35957. If the switch block becomes the switch block ON state, AGV 1 having a higher priority first passes through the switch block (S359571) and thus AGV 2 maintains a travel standby in a stationary state as shown in FIG. 55. After AGV 1 has passed through the switch block, step S359573 is performed so that the travel directionality of AGV 1 is switched inversely and thus the travel directionalities of AGV 1 and AGV 2 for a plurality of travel mobile paths at a corresponding switch block are identical to each other. Thus, a switch signal as a flag signal forms the switch block OFF state to permit a subsequent travel of AGV 2 having a lower priority so that AGV 2 passes through the switch block (S359575) as shown in FIG. 56. After AGV 2 has passed through the switch block, the travel directionality of AGV 2 having a lower priority at the corresponding switch block for the travel mobile path of AGV 2 is switched so that the travel directionality for a plurality of travel mobile paths on the corresponding switch block is again switched inversely to again form the switch block ON state. Thus, if AGV 2 travels in an opposite direction on the travel mobile paths later, the switch ON control step can be performed again.

Figure 57:
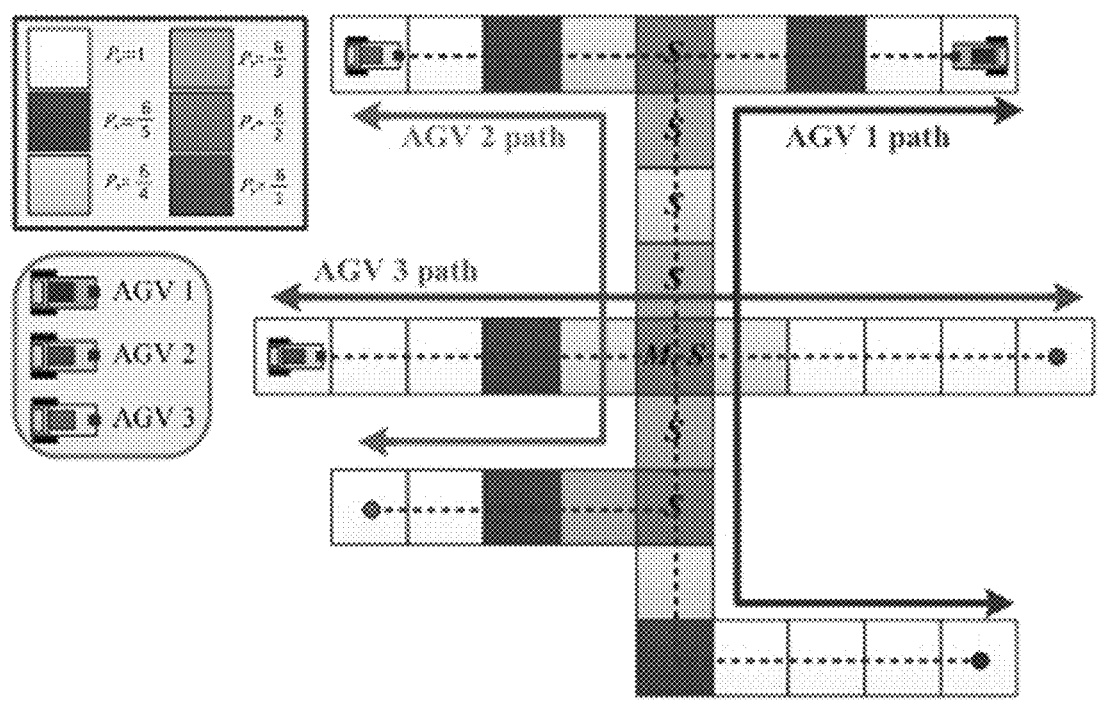
Figure 58:
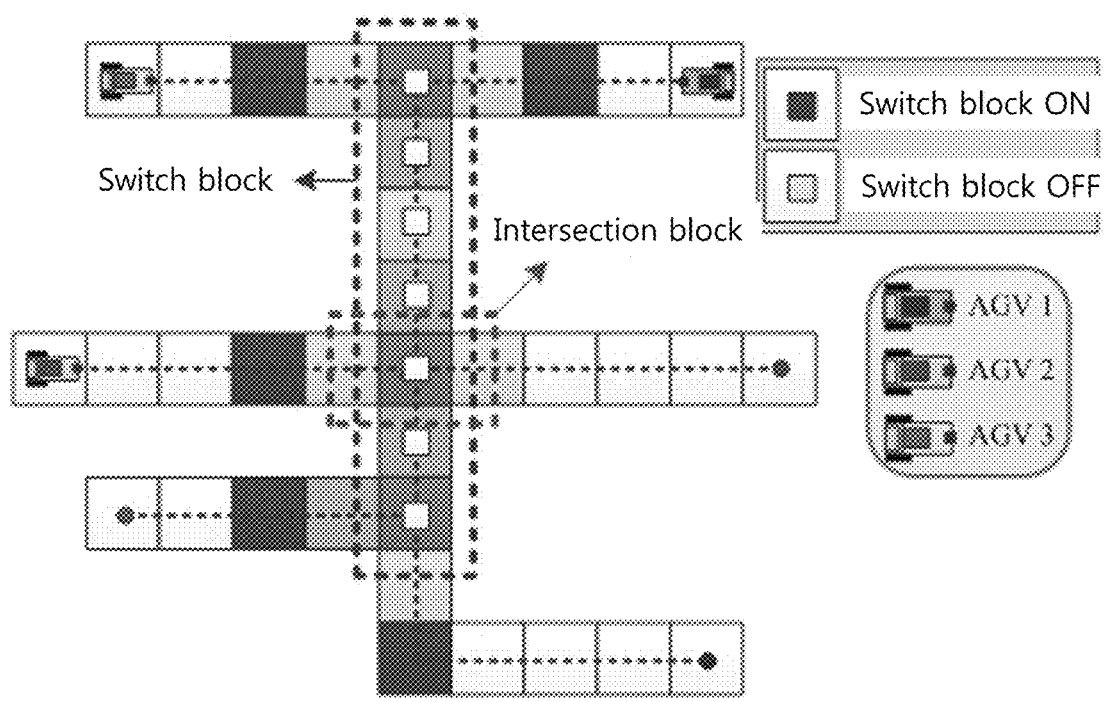

Another embodiment is shown in FIG. 57. An example of the case where a switch block and a single intersection block are present on path blocks will be described with reference to FIG. 57. As shown in FIG. 57, three different AGVs travel on one path block, and paths along which respective AGVs travel and the entire path block are illustrated. In this case, when AGVs performs a travel, a state as shown in FIG. 58 is formed. In other words, in the case of AGV 1 and AGV 2, a plurality of collision prediction blocks M are present and these blocks form a switch blocks S. Each of AGV 1, AGV 2 and AGV 3 travels along a path where only one collision prediction block M is present. Since the switch block is present in the case of AGV 1 and AGV 2, the system control unit must perform a switch block control in which directionality of the switch block is taken into consideration. In addition, since there is a collision risk at one collision prediction block in the case of AGV 1 and AGV 3, and AGV 2 and AGV 3, the system control unit performs a collision preventive control at a single intersection block as an existing method. In other words, the multiple AGV control in which a collision control at the single intersection block and a switch block control at the switch block are performed simultaneously will be described hereinafter by way of the following cases.

Case 1: The Multiple AGV Control Between AGV 1 & AGV 2

A collision prediction block is present on an AGV 1 path and an AGV 2 on the path blocks, a section where a deadlock phenomenon may occur is defined as a switch block. This definition is the same as that in the foregoing case. The travel directionalities of AGVs at each switch block are confirmed and a switch block control through the switch ON/OFF function according to the travel directionalities is performed to prevent such a deadlock phenomenon.

Since the intersection block is present in the AGV 1 path and the AGV 2 path, an AGV assigned with a lower priority ID performs the deceleration control based on the collision prediction time spent for AGV 1 and AGV 2 to move to the intersection block. In step S3595, if the switch block preset distance approach confirmation S35950 is performed and then it is confirmed whether or not a switch block is present, a standby state is formed (S35950).

Figure 59:
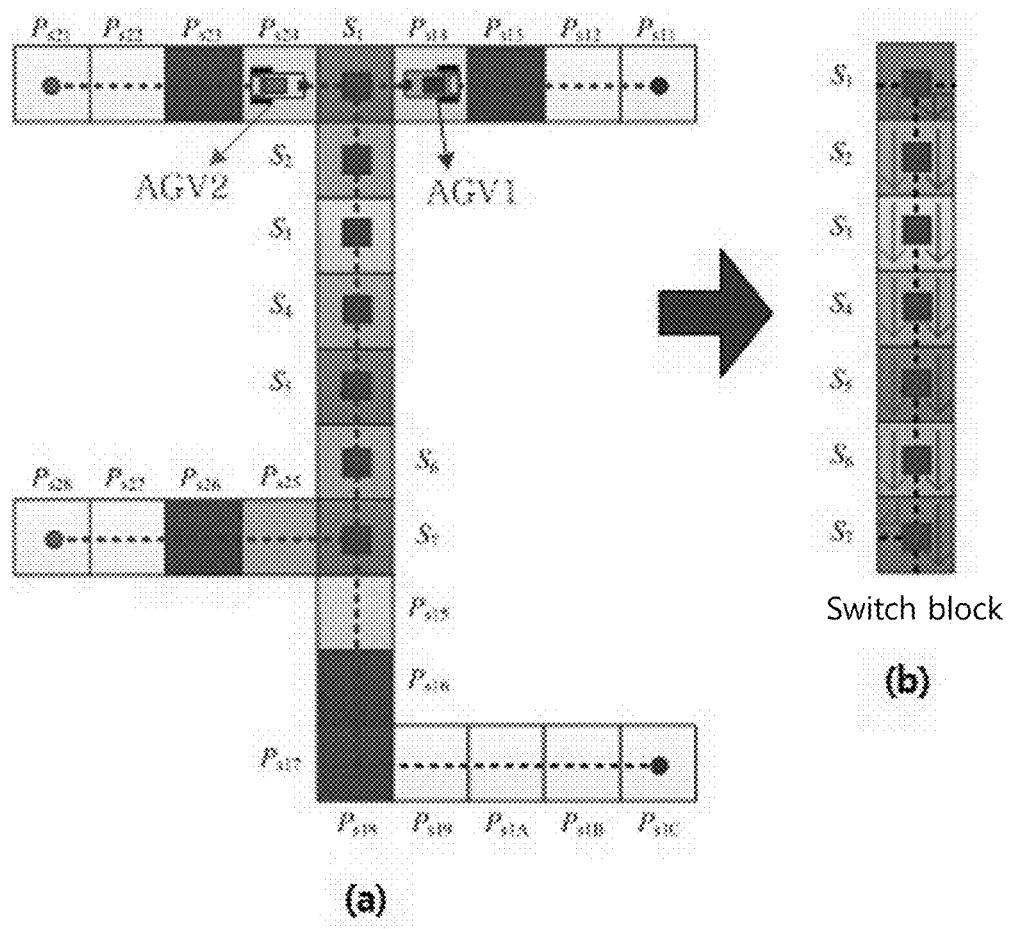
Figure 60:
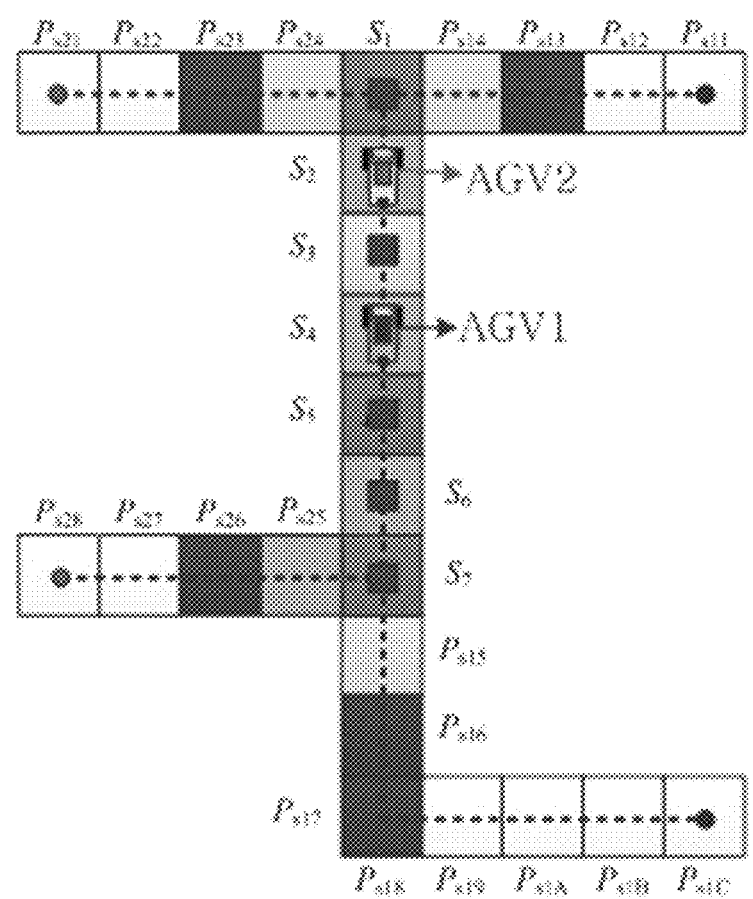

When AGV 1 and AGV 2 arrive at a first block $S_1$ as an intersection block in the switch block, the system control unit determines whether or to perform the switch block control. The system control unit confirms the travel directionalities and/or the travel priorities of AGV 1 and AGV 2 at the entire switch block ($S_1$-$S_7$), which is shown in FIG. 59. As shown in FIG. 59, if the travel directionalities of AGV 1 and AGV 2 at the switch block are not opposite to each other, i.e., are identical to each other or are not different from each other by 180 degrees, the switch block is maintained in an ON state (red color) and the system control unit performs only the multiple AGV control including an existing velocity control in which only the collision time between AGV 1 and AGV 2 is taken into consideration. As shown in FIG. 60, AGV 1 and AGV 2 perform a travel in such a manner that AGV 1 first travels at the first block $S_1$, and then AGV 2 travels behind AGV 1 (S35959).

Figure 61:
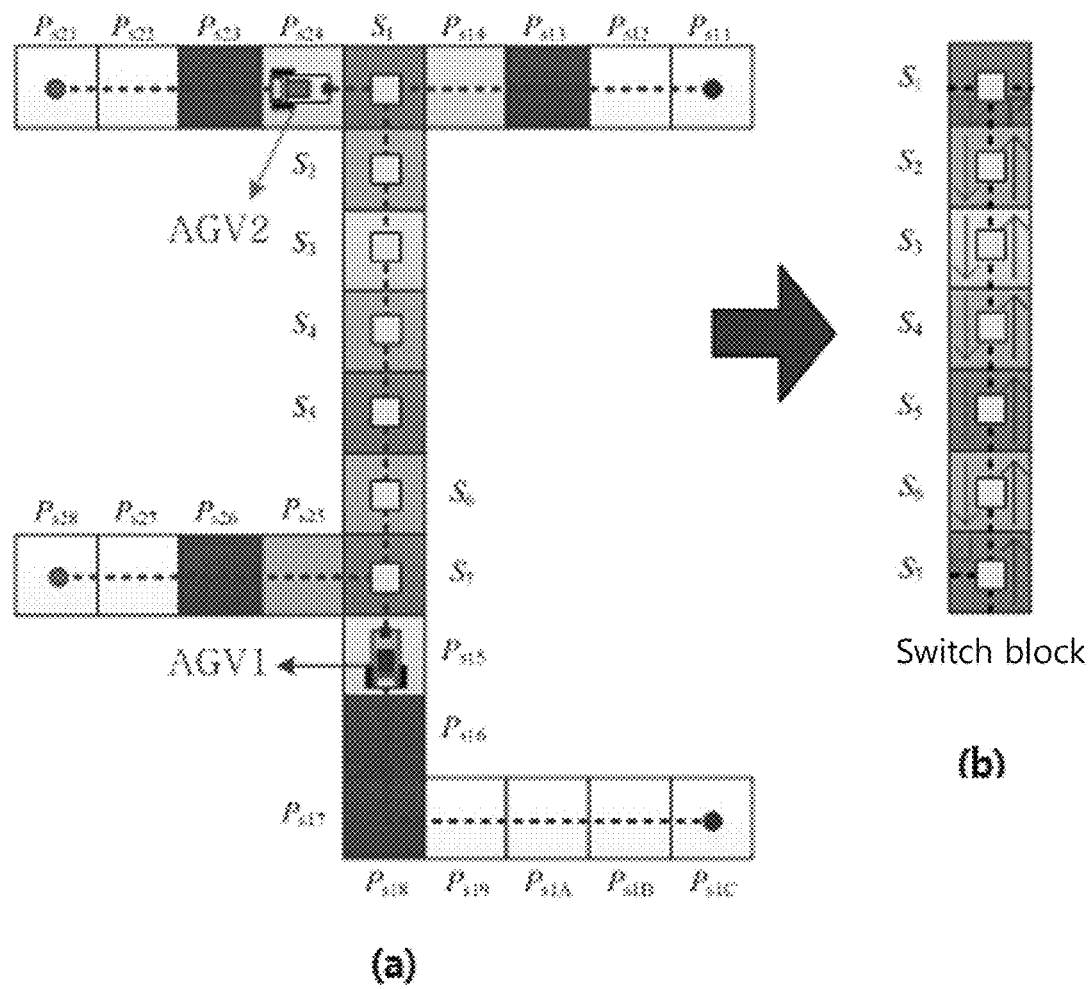

An AGV assigned with a lower priority ID performs the deceleration control based on the collision prediction time spent for AGV 1 and AGV 2 to move to the intersection block until AGV 1 and AGV 2 arrive at an intersection block. However, this case is different from the above case as shown in FIG. 49. As shown in FIG. 61, the confirmation of the switch block travel directionalities is performed immediately before AGV 1 enters a seventh block $S_7$ in the switch block and AGV 2 enters the first block $S_1$. In this case, as a result of confirmation of the travel directionalities of AGV 1 and AGV 2 at the switch block, AGV 1 and AGV 2 have opposite travel directionalities as indicated at the first to seventh blocks ($S_1$-$S_7$) in the switch block. In addition, since a deadlock may occur at the first to seventh blocks, the switch block becomes an ON state, and the switch block control is performed in which the switch block ON mode is executed.

Figure 62:
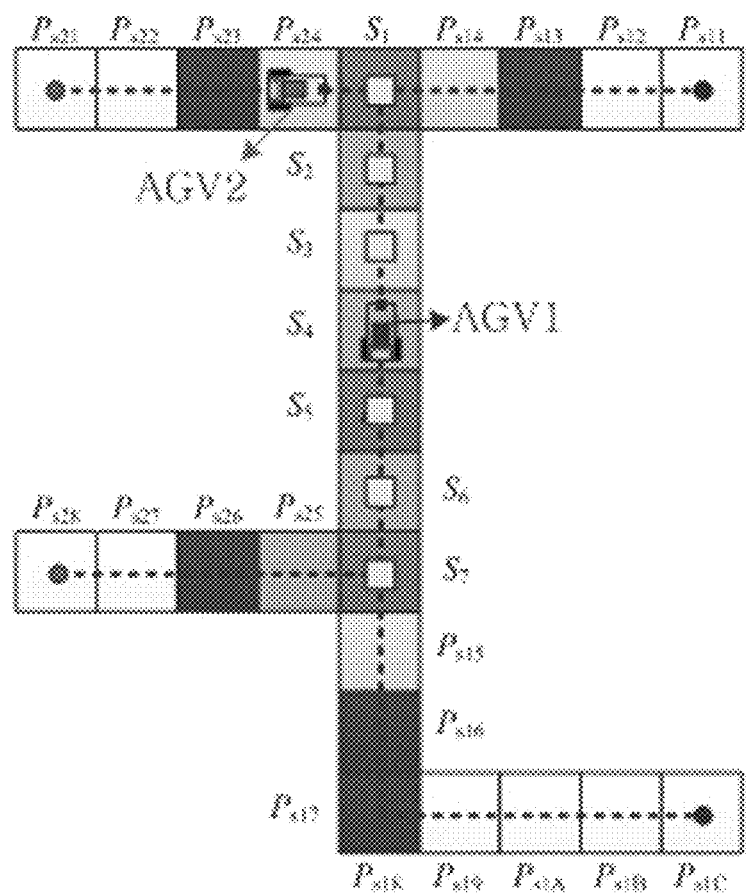
Figure 63:
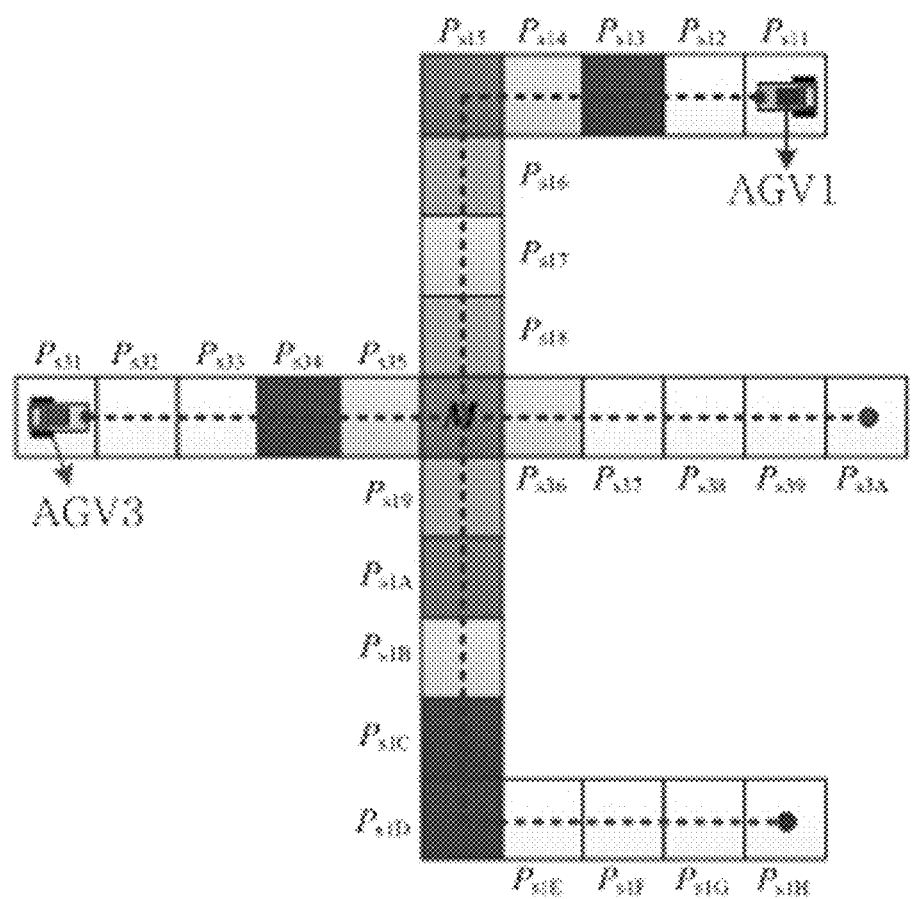

When the switch block becomes the ON state, AGV 2 is in a state in which it cannot enter the switch block so that AGV 2 stands by in a stationary state until the switch block becomes an OFF state and AGV 1 having a higher travel priority travels at the switch block (S359571) as shown in FIG. 62. In this case, the travel directionalities for a corresponding travel mobile path are switched to allow the travel directionalities of AGV 1 and AGV 2 at the switch block in a current state to be identical to each other to cause a switch flag signal of the switch block to become the OFF state (S359573) so that AGV 2 having a lower travel priority travels (S359575). After the completion of the travel of AGV 2 at the switch block, the travel directionalities for a corresponding path are switched and the travel directionalities of AGV 1 and AGV 2 for both travel mobile paths at a corresponding switch block are again formed to be opposite to each other so that the switch block control can be performed in which the switch block ON mode is executed in a subsequent deadlock prediction state.

Case 2: The Multiple AGV Control Between AGV 1 & AGV 3

In the meantime, the multiple AGV control between AGV 1 and AGV 3 is performed at a path block as shown in FIG.

63. A region where there may occur a collision between AGV 1 and AGV 3 is formed as one intersection block M, and thus the time $Col_t$ spent for AGV 1 and AGV 3 to travel from the mobile path blocks where they are positioned to the intersection block M is compared with the travel time $SP_{th}$ before and after the intersection block to perform the existing the multiple AGV control as a control method of preventing a collision between AGV 1 and AGV 3, which is the same as in the foregoing.

Case 3: The Multiple AGV Control Between AGV 2 & AGV 3

Figure 64:
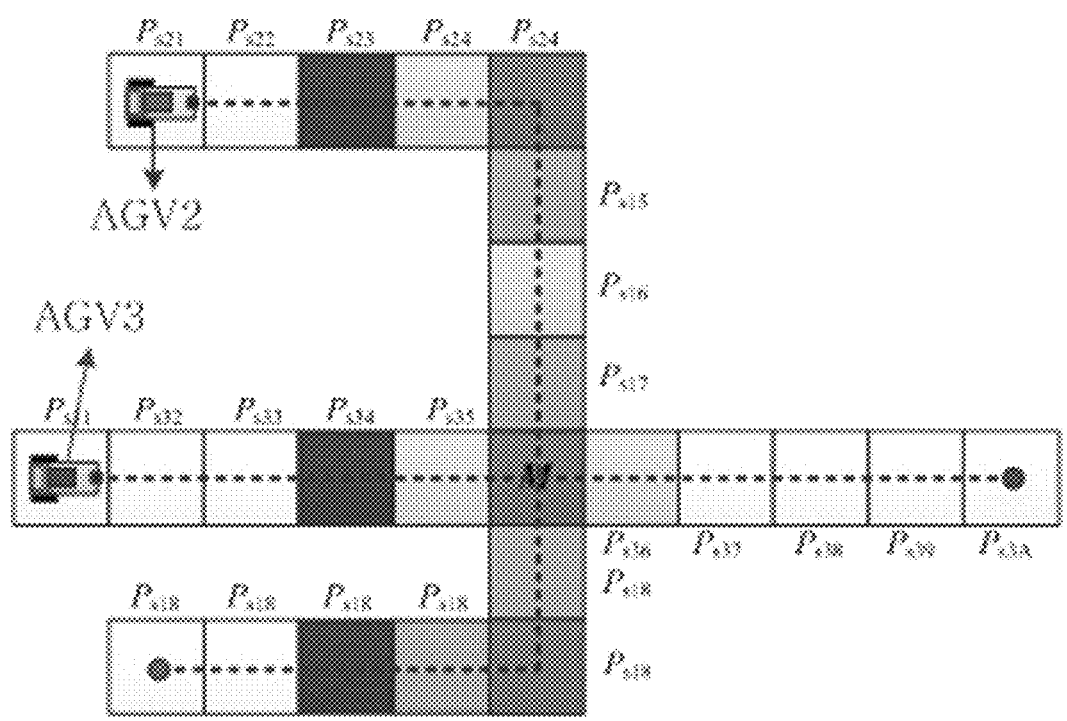

Also, in the meantime, the multiple AGV control between AGV 2 and AGV 3 is performed as shown in FIG. 64. In this case, there is a possibility of a collision between AGV 2 and AGV 3 as in the multiple AGV control between AGV 1 and AGV 3, and the existing multiple AGV control is performed to prevent the collision, which is the same as in the foregoing.

The above embodiments are examples for explaining the present invention. The present invention is not limited thereto, but may be configured in various manners within a range of achieving the control of the autonomous mobile-based automated guided vehicle.

The autonomous mobile-based automated guided vehicle system according to the embodiments of the present invention as constructed above have the following advantageous effects.

The autonomous mobile-based automated guided vehicle system and the control method thereof according to the present invention efficiently controls a plurality of AGVs, particularly autonomous mobile-based automated guided vehicles (AGVs) in various factories and industrial fields where complete automation is in progress so that the ratio of operation of a factory line can be enhanced.

In addition, the autonomous mobile-based automated guided vehicle system and the control method thereof according to the present invention proposes a method for controlling a plurality of AGVs using the mobile path blocks unlike a conventional AGV control in which the automated guided vehicles move along a fixed path and are controlled in travel by using only simple distance information between AGVs. Thus, the movement of AGVs to a desired designed path and place can be controlled by easily changing a path in an environment where a factory line is changed, and an additional optical tape can be installed or a separate work such as an additional repair can be excluded upon the deformation of the optical tape through this control.

In addition, the autonomous mobile-based automated guided vehicle system and the control method thereof according to the present invention can control the velocity and state of AGVs to prevent a collision between AGVs and enhance stability. Further, the present invention assigns the characteristics for each mobile path block so that when an autonomous mobile-based automated guided vehicle AGV arrives at a corresponding path block, various works can be performed, and the efficiency of preventing an abrupt collision between AGVs can be improved by detecting an obstacle within the mobile path block region, thereby increasing the work efficiency.

Besides, the autonomous mobile-based automated guided vehicle system and the control method thereof according to the present invention controls the velocity and state of AGVs so that a collision between AGVs can be prevented and stability can be improved, and simultaneously the formation of a deadlock can be prevented at a switch block where the travel mobile paths overlap with each other through the switch block control, thereby achieving a smooth travel.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

The invention claimed is:

1. A method for controlling an autonomous mobile-based automated guided vehicle system that controls at least one autonomous mobile-based automated guided vehicle comprising a vehicle sensor unit, a vehicle drive unit configured to drive a vehicle body having mounted thereon the vehicle sensor unit, and a vehicle control unit connected to the vehicle sensor unit and the vehicle drive unit and configured to control the drive of the drive unit, the method comprising:

a mobile path setting step of providing one or more mobile path blocks to an operator through a user interface of a system input unit, each mobile block including a preset path information, receiving instructions from the operator on selection and arrangement of the mobile path blocks through the user interface, and setting by the system input unit a mobile path of the at least one autonomous mobile-based automated guided vehicle as one or more mobile paths in the unit of a block based on the arrangement and selection of the mobile path blocks received through the system input unit;

storing in a system storage unit the mobile path in the unit of a block inputted through the system input unit;

transmitting a sensing signal and travel information from the autonomous mobile-based automated guided vehicle to the system control unit;

a travel control step including generating an autonomous travel control signal by a system control unit based on the mobile path and the sensing signal, and applying the autonomous travel control signal by the system control unit to the autonomous mobile-based automated guided vehicle to control the travel of the automated guided vehicle; and transmitting travel information of the autonomous mobile-based automated guided vehicle to the from a communication unit of the autonomous mobile-based automated guided vehicle to the system control unit;

wherein the autonomous mobile-based automated guided vehicle is provided in plural numbers, wherein the travel information comprises mobile path information and an actual travel velocity of the autonomous mobile-based automated guided vehicle, and wherein the travel control step further comprises a collision control step of controlling a vehicle collision between the autonomous mobile-based automated guided vehicles to prevent the vehicle collision therebetween using the travel information of the autonomous mobile-based automated guided vehicle, which is received through a communication between the system control unit and the autonomous mobile-based automated guided vehicle, the collision control step including determining by the system control unit whether or not a collision between the autonomous mobile-based automated guided vehicles is predicted at a collision prediction block as an intersection point of mobile path blocks of the autonomous mobile-based automated guided vehicles based on the travel information.

2. The method according to claim 1, wherein the collision control step comprising:
- a travel information collection step of collecting the travel information of the autonomous mobile-based automated guided vehicle through the communication between the system control unit and the autonomous mobile-based automated guided vehicle;
- a detour path presence confirmation step of allowing the system control unit to confirm whether or not there is a detour path of the autonomous mobile-based automated guided vehicles based on the travel information if it is determined in the collision determination step that the collision between the autonomous mobile-based automated guided vehicles is predicted;
- a detouring determination step of determining whether or not to perform a detouring operation if it is confirmed at the detour path presence confirmation step that there is the detour path of the autonomous mobile-based automated guided vehicles; and
- a collision mode execution step of selecting and controlling an corresponding mode of a detouring mode in which the autonomous mobile-based automated guided vehicles travel along the detour path and a velocity control mode in which the travel velocity of the autonomous mobile-based automated guided vehicles is controlled based on a result of the determination at the detouring determination step.

3. The method according to claim 2, wherein the detouring determination step comprises:
- a detour path presence determination step determining whether or not a detour path is present based on a result of the execution at the detour path presence confirmation step;
- a virtual travel time confirmation step of if it is determined in the detour path presence determination step that the detour path is present, confirming a virtual velocity control travel time spent for the autonomous mobile-based automated guided vehicle to travel through the reduction of the travel velocity at a preset reduction ratio on a scheduled path of the autonomous mobile-based automated guided vehicle, and a virtual detour control travel time spent for the autonomous mobile-based automated guided vehicle to travel on a detour path of the autonomous mobile-based automated guided vehicle; and
- a detouring decision step of deciding whether or not the autonomous mobile-based automated guided vehicle detours through a comparison between the virtual velocity control travel time and the virtual detour control travel time.

4. The method according to claim 3, wherein the collision mode execution step comprises:
- a detouring mode execution step performed if it is determined in the detouring decision step that the autonomous mobile-based automated guided vehicle detours along the confirmed detour path; and
- a velocity control mode execution step performed if it is determined in the detouring decision step that the autonomous mobile-based automated guided vehicle does not detour along the confirmed detour path.

5. The method according to claim 4, wherein if it is determined in the detour path presence determination step that the detour is not present, the velocity control mode execution step is performed in which the system control unit controls the travel velocity of the autonomous mobile-based automated guided vehicle using deceleration reference order data and a reduction ratio, which are stored in the system storage unit.

6. The method according to claim 2, wherein the collision determination step comprises:
- a prediction arrival time calculation step of calculating a prediction arrival time difference from a prediction arrival time of the autonomous mobile-based automated guided vehicle to a collision prediction block;
- a collision prediction reference time calculation step of calculating a collision prediction reference time for determining that the autonomous mobile-based automated guided vehicles are predicted to collide with each other at the collision prediction block; and
- a collision prediction determination step of determining whether or not a collision between the autonomous mobile-based automated guided vehicles is predicted at the collision prediction block using the prediction arrival time difference and the collision prediction reference time.

7. The method according to claim 4, wherein the velocity control mode execution step comprises:
- a velocity control priority confirmation step of allowing the system control unit to confirm the travel priorities of the autonomous mobile-based automated guided vehicles, which are included in preset data that is previously stored in the system storage unit, and confirming and selecting the velocity reduction for an autonomous mobile-based automated guided vehicle having a lower travel priority; and
- a velocity reduction coefficient assignment step of assigning a velocity reduction coefficient for a mobile path block on a current mobile path of the autonomous mobile-based automated guided vehicle for which the velocity reduction is confirmed and selected in the velocity control priority confirmation step, and reducing the travel velocity of the autonomous mobile-based automated guided vehicle.

8. The method according to claim 4, wherein a plurality of mobile paths is formed on the mobile path blocks, and the system storage unit has stored therein information of a switch block where the number of the entry and exit directions of the autonomous mobile-based automated guided vehicle is less than twice the number of the plurality of mobile paths among the mobile path blocks, and
wherein the collision mode execution step further comprises a switch block control step of allowing the system control unit to confirm whether or not the autonomous mobile-based automated guided vehicle approaches a preset distance with respect to the switch block and control the travel of the autonomous mobile-based automated guided vehicle at the switch block.

9. The method according to claim 8, wherein the switch block control step comprises:
- a switch block preset distance approach confirmation step of allowing the system control unit to confirm whether or not the autonomous mobile-based automated guided vehicles enter a preset number of mobile path block distances with respect to the switch block; and
- a switch block distance entry determination step of allowing the system control unit to determine whether or not a distance between the autonomous mobile-based automated guided vehicle and the switch block is within the preset distance using a confirmation result in the switch block preset distance approach confirmation step.

10. The method according to claim 9, wherein the switch block control step further comprises:

a switch block entry standby step of, if it is determined in the switch block distance entry determination step that autonomous mobile-based automated guided vehicle enters the preset distance with respect to the switch block, applying an entry standby signal to the autonomous mobile-based automated guided vehicle; and a travel directionality and travel priority confirmation step of confirming the travel directionality of the autonomous mobile-based automated guided vehicle and the travel priority of the autonomous mobile-based automated guided vehicle, which is included in the preset data.

11. The method according to claim 10, wherein the travel directionality and travel priority confirmation step comprise performing a switch block ON mode of, if the travel directionalities of the autonomous mobile-based automated guided vehicles that stand by at both ends of the switch block are different from each other, allowing an autonomous mobile-based automated guided vehicle having a higher travel priority of the autonomous mobile-based automated guided vehicles to travel in a prior order so that an autonomous mobile-based automated guided vehicle having a lower travel priority enters the switch block after escaping from the switch block or a region formed by the switch block.

12. The method according to claim 11, wherein the switch block ON mode comprises:
   a higher-priority vehicle travel and passage step of allowing the autonomous mobile-based automated guided vehicle having a higher travel priority of the autonomous mobile-based automated guided vehicles to travel in a prior order and pass through the region formed by the switch block;
   a corresponding path travel directionality switching step of switching the travel directionality at the switch block for a mobile path along which the autonomous mobile-based automated guided vehicle having a higher travel priority travels;
   a lower-priority vehicle travel and passage step of allowing the autonomous mobile-based automated guided vehicle having a lower travel priority to enter the switch block and pass through the region formed by the switch block; and
   a corresponding path travel directionality switching step of switching the travel directionality at the switch block for a mobile path along which the autonomous mobile-based automated guided vehicle having a lower travel priority travels.

13. The method according to claim 10, wherein the travel directionality and travel priority confirmation step comprises performing a switch block OFF mode of, if it is determined that the travel directionalities of the autonomous mobile-based automated guided vehicles that stand by at both ends of the switch block are identical to each other, allowing an autonomous mobile-based automated guided vehicle having a higher travel priority of the autonomous mobile-based automated guided vehicles to travel in a prior order so that the autonomous mobile-based automated guided vehicle enters a region formed by the switch block, and an autonomous mobile-based automated guided vehicle having a lower travel priority also enters the region formed by the switch block after a preset time has been lapsed.

14. The method according to claim 13, wherein the switch block OFF mode comprises:
   a higher-priority vehicle prior travel step of allowing the autonomous mobile-based automated guided vehicle having a higher travel priority to travels in a prior order so that the autonomous mobile-based automated guided vehicle enters the region formed by the switch block;
   a lower-priority vehicle posterior travel step of allowing the autonomous mobile-based automated guided vehicle having a lower travel priority to also enter the region formed by the switch block after the preset time has been lapsed;
   a corresponding path travel directionality switching step of, if the autonomous mobile-based automated guided vehicle having a lower travel priority deviates from the region formed by the switch block, switching the travel directionalities at the switch blocks for the mobile paths of the autonomous mobile-based automated guided vehicle having a higher travel priority and the autonomous mobile-based automated guided vehicle having a lower travel priority.

15. A combination of at least one autonomous mobile-based automated guided vehicle and a vehicle guiding system, wherein:
   the at least one autonomous mobile-based automated guided vehicle comprises a vehicle sensor unit, a vehicle drive unit configured to drive a vehicle body having mounted thereon the vehicle sensor unit, and a vehicle control unit connected to the vehicle sensor unit and the vehicle drive unit and configured to control the drive of the drive unit,
   the vehicle guiding system is spaced apart from the at least one autonomous mobile-based automated guided vehicle, the vehicle guiding system comprising:
   a system input unit configured to set and input a mobile path between a departure point and an end point of the autonomous mobile-based automated guided vehicle as one or more mobile path blocks in the unit of a block, each of the mobile blocks including a preset path information, wherein the system input unit provides the one or more mobile path blocks to an operator through a user interface and receives instructions from the operator on selection and arrangement of the mobile path blocks through the user interface,
   a system control unit configured to apply a control signal to a corresponding autonomous mobile-based automated guided vehicle based on one or more mobile paths in the unit of a block, which are inputted through the system input unit and a sensing signal detected by the vehicle sensor unit to control the path movement of the corresponding autonomous mobile-based automated guided vehicle, and
   a system storage unit configured to store the mobile paths in the unit of a block, which are inputted by a user through the system input unit.

* * * * *